(12) United States Patent
Yano et al.

(10) Patent No.: US 9,205,823 B2
(45) Date of Patent: Dec. 8, 2015

(54) BRAKE CYLINDER DEVICE AND DISK BRAKE DEVICE

(71) Applicant: NABTESCO CORPORATION, Tokyo (JP)

(72) Inventors: Masataka Yano, Hyogo (JP); Tomoya Ohno, Hyogo (JP)

(73) Assignee: NABTESCO CORPORATION, Tokyo (JP)

( * ) Notice: Subject to any disclaimer, the term of this patent is extended or adjusted under 35 U.S.C. 154(b) by 5 days.

(21) Appl. No.: 14/360,213

(22) PCT Filed: Nov. 16, 2012

(86) PCT No.: PCT/JP2012/079827
§ 371 (c)(1),
(2) Date: May 22, 2014

(87) PCT Pub. No.: WO2013/077273
PCT Pub. Date: May 30, 2013

(65) Prior Publication Data
US 2014/0326547 A1 Nov. 6, 2014

(30) Foreign Application Priority Data
Nov. 25, 2011 (JP) ................................ 2011-257010

(51) Int. Cl.
*F16D 55/22* (2006.01)
*B60T 13/58* (2006.01)
(Continued)

(52) U.S. Cl.
CPC ................ *B60T 13/588* (2013.01); *B61H 1/00* (2013.01); *B61H 5/00* (2013.01); *B61H 15/0028* (2013.01);
(Continued)

(58) Field of Classification Search
CPC ... B60T 13/588; F16D 55/22; F16D 55/2245; F16D 55/2255; F16D 65/14; F16D 65/18; F16D 65/56; F16D 2121/04; F16D 2125/64; B61H 1/00; B61H 5/00; B61H 15/00; B61H 15/0028; Y10T 74/20558
USPC ............ 188/72.2, 72.6, 28, 33, 56, 72.1, 166; 92/130 A, 130 D, 140; 74/516
See application file for complete search history.

(56) References Cited

U.S. PATENT DOCUMENTS 1,760,624 A * 5/1930 Badertscher .................... 92/140
3,838,571 A * 10/1974 Remillieux ...................... 60/400
(Continued)

FOREIGN PATENT DOCUMENTS

| EP | 1950448 A1 | 7/2008 |
| EP | 1950448 A4 | 4/2009 |

(Continued)

OTHER PUBLICATIONS

International Search Report; PCT/JP2012/079827; Feb. 19, 2013.

*Primary Examiner* — Thomas J Williams
(74) *Attorney, Agent, or Firm* — Studebaker & Brackett PC

(57) ABSTRACT

The present invention provides a small brake cylinder device that can increase braking force output from a brake output portion that moves along with a rod, while suppressing an increase in the device size. A piston defines a pressure chamber and surrounds the axis of the rod inside a cylinder body, and moves in a linear direction that is parallel to the movement direction of the rod. When pressure fluid is supplied to the pressure chamber, the piston moves in the backward movement direction relative to the cylinder body in resistance to biasing force from a rod biasing spring. Swinging members of a force amplifying mechanism swing due to being biased by the piston moving in the backward movement direction, and moves the rod by biasing it in the forward movement direction. The force amplifying mechanism amplifies the drive force generated by the piston and applies it to the rod.

15 Claims, 26 Drawing Sheets

(51) Int. Cl.
  *B61H 5/00* (2006.01)
  *F16D 55/2255* (2006.01)
  *F16D 65/14* (2006.01)
  *F16D 65/18* (2006.01)
  *F16D 65/56* (2006.01)
  *B61H 1/00* (2006.01)
  *F16D 55/224* (2006.01)
  *B61H 15/00* (2006.01)
  *F16D 121/04* (2012.01)
  *F16D 125/64* (2012.01)

(52) U.S. Cl.
  CPC ............ *F16D 55/22* (2013.01); *F16D 55/2245* (2013.01); *F16D 55/2255* (2013.01); *F16D 65/14* (2013.01); *F16D 65/18* (2013.01); *F16D 65/56* (2013.01); *B61H 15/00* (2013.01); *F16D 2121/04* (2013.01); *F16D 2125/64* (2013.01)

(56) References Cited

U.S. PATENT DOCUMENTS

| | | | | |
|---|---|---|---|---|
| 4,236,608 | A | * | 12/1980 | Kobelt .............................. 188/43 |
| 4,308,937 | A | * | 1/1982 | Johnson ........................... 188/43 |
| 4,453,455 | A | * | 6/1984 | Bergstrand ...................... 92/140 |
| 4,706,786 | A | | 11/1987 | Nadas |
| 8,006,816 | B2 | | 8/2011 | Kraus et al. |
| 2010/0144165 | A1 | | 6/2010 | Fowler et al. |
| 2010/0294601 | A1 | | 11/2010 | Kraus et al. |
| 2010/0307873 | A1 | | 12/2010 | Kraus et al. |

FOREIGN PATENT DOCUMENTS

| | | |
|---|---|---|
| EP | 1950448 B1 | 2/2010 |
| JP | 61-175330 A | 8/1986 |
| JP | 2007-131203 A | 5/2007 |
| JP | 2009-545712 A | 12/2009 |
| JP | 2011-505534 A | 2/2011 |

* cited by examiner

9,205,823 B2

BRAKE CYLINDER DEVICE AND DISK BRAKE DEVICE

TECHNICAL FIELD

The present invention relates to a brake cylinder device that moves a rod by operating using pressure fluid, and outputs braking force from a brake output portion that moves along with the rod, and relates to a disk brake device that includes this brake cylinder device.

BACKGROUND ART

A conventionally known example of a disk brake device for a railroad vehicle that includes a brake cylinder device is disclosed in Patent Document 1. The disk brake device disclosed in Patent Document 1 is configured such that a rod in the brake cylinder device is moved forward using air pressure. Also, in this disk brake device, a pair of brake levers are provided in a caliper body that is attached so as to be displaceable relative to the vehicle in the axle direction, and one end of each of the brake levers is connected to the rod side in the brake cylinder device and the cylindrical member side that configures the cylinder body. The pair of brake levers are driven by the brake cylinder device operating as described above. Furthermore, this disk brake device is configured such that braking force is generated by sandwiching an axle-side disk with brake shoes that are provided on the other ends of the pair of brake levers driven as described above.

Also, a known example of a brake cylinder device is disclosed in Patent Document 2. In the brake cylinder device disclosed in Patent Document 2, a piston is fixed to a rod provided as a push rod. In this configuration, the piston and the rod are moved forward when the piston is biased by compressed air that is supplied to a pressure chamber inside the cylinder body. Note that due to the rod moving forward, braking force is output from a brake output portion provided so as to be capable of moving along with the rod.

Also, a known example of a brake cylinder device and a disk brake device for a railroad vehicle that includes the brake cylinder device is disclosed in Patent Document 3. Similarly to Patent Document 1, the disk brake device disclosed in Patent Document 3 is configured such that a pair of brake levers are driven by operation of the brake cylinder device, and braking force is generated by sandwiching an axle-side disk with brake shoes.

Also, a regular-use brake cylinder and a spring force storing type of brake cylinder that are fixed to each other are provided in the brake cylinder device disclosed in Patent Document 3. The regular-use brake cylinder is provided as an active regular-use brake, and includes a regular-use brake piston that is operated by a pressure medium. The spring force storing type of brake cylinder is provided as a passive fixed brake, and is provided with a spring force storing type of brake piston that is operated by a pressure medium in resistance to the action of multiple accumulated force springs arranged inside a cylinder. During fixed braking, the spring force storing type of brake piston transmits the force of the accumulated force springs to a regular-use brake piston rod or a regular-use brake piston connected to the regular-use brake piston rod, via a transmission device. The transmission device has an angle lever, and is provided in plurality as devices that multiply or convert the force of the accumulated force springs. Also, inside the cylinder of the spring force storing type of brake cylinder, multiple accumulated force springs and multiple transmission devices are disposed in a line along the circumferential direction of the cylinder.

CITATION LIST

Patent Document

Patent Document 1: JP S61-175330A
Patent Document 2: JP 2007-131203A
Patent Document 3: JP 2011-505534A

DISCLOSURE OF THE INVENTION

Problem to be Solved by the Invention

In the disk brake device disclosed in Patent Document 1, the length of the brake levers is set such that necessary braking force is generated. However, in the case where a large braking force is necessary, the length of the brake levers increases and the size of the caliper body increases, thus leading to the problem of an increase in the overall size of the disk brake device.

In the brake cylinder device disclosed in Patent Document 2, the diameter of the cylinder body is determined so as to obtain braking force with a desired output magnitude. In this way, setting is also performed such that necessary braking force is generated by adjusting the diameter setting of the cylinder body. However, in the case where a large braking force is necessary, the diameter of the cylinder body increases, thus leading to the problem of an increase in the overall size of the brake cylinder device. Also, an increase in the size of the brake cylinder device leads to the problem of inviting an increase in the size of the disk brake device as well.

In the brake cylinder device and disk brake device disclosed in Patent Document 3, during operation of the spring force storing type of brake cylinder that is provided as a fixed brake that operates using the force of accumulated force springs, it is possible to output braking force obtained by the force of the accumulated force springs being increased by the transmission device. However, during operation of the regular-use brake cylinder provided as the active regular-use brake that is operated by a pressure medium, it is not possible for the output to be increased by the transmission device. For this reason, increasing the braking force during operation of the regular-use brake cylinder leads to the problem of inviting an increase in the device size similarly to the disk brake device and the brake cylinder device disclosed in Patent Document 1 and Patent Document 2. Also, with the brake cylinder device disclosed in Patent Document 3, in the cylinder of the spring force storing type of brake cylinder, multiple accumulated force springs and multiple transmission devices are disposed in a line along the circumferential direction of the cylinder, thus increasing the diameter of the cylinder body and leading to the problem of an increase in the overall size of the brake cylinder device.

The present invention has been achieved in light of the above circumstances, and an object thereof is to provide a small brake cylinder device that can increase braking force output from a brake output portion that moves along with a rod, while suppressing an increase in the device size. It is also an object of the invention to provide a disk brake device that includes this brake cylinder device.

Means for Solving the Problem

In order to achieve the above objects, a brake cylinder device according to a first aspect of the invention relates to a brake cylinder device that moves a rod by operating using pressure fluid, and outputs braking force from a brake output portion that moves along with the rod. The brake cylinder device according to the first aspect of the invention includes: a cylinder body having a hollow interior; the rod that is arranged inside the cylinder body and provided so as to be movable in a forward movement direction of moving forward from the cylinder body and in a backward movement direction of moving backward in a direction opposite to the forward movement direction, both of which are linear directions along a cylinder axial direction; a rod biasing spring capable of biasing the rod in the backward movement direction; a piston that is arranged in the cylinder body so as to define a pressure chamber and circumferentially surround an axis of the rod, is provided so as to be movable along a linear direction that is parallel to the movement direction of the rod, and moves in the backward movement direction relative to the cylinder body in resistance to biasing force from the rod biasing spring due to pressure fluid being supplied to the pressure chamber; a force amplifying mechanism that, when the piston moves in the backward movement direction, moves the rod in the forward movement direction, amplifies drive force from the piston, and applies the amplified drive force to the rod; and the brake output portion that is provided so as to be capable of moving along with the rod and can output braking force due to the rod moving in the forward movement direction, wherein the force amplifying mechanism includes a swinging member that swings due to being biased by the piston moving in the backward movement direction, so as to bias and move the rod in the forward movement direction.

According to this configuration, the rod and the piston are configured so as to perform a forward movement operation and a backward movement operation in a linear direction along the cylinder axial direction, and the piston is arranged so as to surround the axis of the rod. For this reason, it is possible to efficiently use the arrangement space for the piston and the rod inside the cylinder body, and in particular it is possible to significantly reduce the arrangement space for the piston and the rod in the cylinder axial direction. Furthermore, the force amplifying mechanism, which amplifies drive force from the piston moving in the backward movement direction via the swinging member and then applies the amplified drive force to the rod so as to move the rod in the forward movement direction, can be arranged in the region ensured by the efficient use of the arrangement space for the piston and the rod. Also, braking force is output from the brake output portion that moves along with the rod that is subjected to the amplified drive force. In this way, the efficient use of the arrangement space for the piston and the rod makes it possible to suppress an increase in the size of the brake cylinder device and achieve compactness, and also to increase the braking force using the force amplifying mechanism.

Accordingly, with the above configuration, it is possible to provide a small brake cylinder device that can increase braking force output from the brake output portion that moves along with the rod, while suppressing an increase in the device size.

A brake cylinder device according to a second aspect of the invention is the brake cylinder device according to the first aspect, wherein the swinging member is provided as a lever that is swingably supported at a fulcrum portion, the force amplifying mechanism further includes a bearing that is attached to the swinging member and is rotatable relative to the swinging member, and the bearing is attached to the swinging member at least one of a force point portion of the swinging member that is biased by the piston and an action point portion of the swinging member that biases the rod.

According to this configuration, a bearing is attached to at least one of the force point portion and the action point portion of the swinging member provided as a lever. This makes it possible to significantly reduce friction sliding resistance that occurs in the portions of the swinging member that are biased by the piston or the portions that bias the rod, and to improve the drive efficiency of the device.

A brake cylinder device according to a third aspect of the invention is the brake cylinder device according to the first aspect or the second aspect, wherein a plurality of the swinging members are disposed, and the plurality of swinging members are disposed at rotationally symmetrical positions centered about a central axis line of the cylinder body that passes through a central position in a diameter direction of the cylinder body.

According to this configuration, multiple swinging members are disposed at rotationally symmetrical positions centered about the central axis line of the cylinder body. For this reason, in the swinging member, the piston, the rod, and the cylinder including the cylinder body, load is distributed and supported so as to be more nearly uniform in the circumferential direction centered about the central axis line of the cylinder body. This makes it possible to efficiently suppress the occurrence of forcible rubbing between members in contact, and makes it possible to improve the drive efficiency of the device.

A brake cylinder device according to a fourth aspect of the invention is the brake cylinder device according to the third aspect, wherein three of the swinging members are disposed, and the three swinging members are disposed with angular intervals of 120° in a circumferential direction centered about the central axis line.

According to this configuration, three swinging members are disposed at rotationally symmetrical positions centered about the central axis line of the cylinder body, thus making it possible to stably support load with a three-point support structure that corresponds to a truss structure. Furthermore, since it is possible to stably support load with a three-point support structure that corresponds to a truss structure, the number of swinging members that are necessary can be minimized. This makes it possible to efficiently suppress the occurrence of forcible rubbing between members in contact, and makes it possible to reduce the manufacturing cost by reducing the number of swinging members that are provided. This also makes it possible to both further reduce the size of the device structure and further improve the drive efficiency of the device.

A brake cylinder device according to a fifth aspect of the invention is the brake cylinder device according to the fourth aspect, wherein the three swinging members are disposed on an inner side of a cylinder bottom portion that is fixed to an end of the cylinder body on the backward movement direction side, the inner side of the cylinder bottom portion is provided with a recessed region that is surrounded by an inner wall that has three inner wall faces formed so as to respectively extend in a curved manner or linearly along three sides of a triangle in a cross-section perpendicular to the cylinder axial direction, and the three swinging members are disposed so as to respectively extend along the three inner wall faces inside the recessed region.

According to this configuration, the three inner wall faces that define the recessed region of the cylinder bottom portion are formed so as to extend along three sides in a triangular shape. Also, the swinging members are disposed so as to extend along the inner wall faces. This makes it possible to reduce the size of the structure of the cylinder bottom portion for accommodating the three swinging members that are to be disposed rotationally symmetrically, reduce the amount of material necessary for manufacturing the cylinder bottom portion, and reduce the manufacturing cost.

A brake cylinder device according to a sixth aspect of the invention is the brake cylinder device according to any of the first aspect to the fifth aspect, wherein the force amplifying mechanism further includes a fulcrum shaft member that configures a fulcrum shaft of the swinging member provided as a lever, and is a member to which the swinging member is rotatably attached and that swingably supports the swinging member, two ends of the fulcrum shaft member are respectively supported to a cylinder bottom portion that is fixed to an end of the cylinder body on the backward movement direction side, and one end of the fulcrum shaft member is supported to a portion provided so as to rise up toward the cylinder body side on a central side of the inner side of the cylinder bottom portion, and another end of the fulcrum shaft member is supported to a portion provided so as to rise up toward the cylinder body side on an outer circumferential side on the inner side of the cylinder bottom portion.

According to this configuration, the two ends of the fulcrum shaft member to which the swinging member is rotatably attached are supported to portions rising up on the central side and outer circumferential side of the inner side of the cylinder bottom portion. Accordingly, the swinging members are disposed on the inner side of the cylinder bottom portion in a state of being stably supported at both ends so as to be swingable. Accordingly, with the above configuration, it is possible to very easily assemble the brake cylinder device with the force amplifying mechanism incorporated therein. This makes it possible to significantly reduce the work burden when assembling the brake cylinder device. Also, since the fulcrum shaft member to which the swinging members are rotatably attached is configured so as to be fixed to the cylinder bottom portion, the number of parts of the force amplifying mechanism can be reduced, and the manufacturing cost can be reduced.

A brake cylinder device according to a seventh aspect of the invention is the brake cylinder device according to the first aspect or the second aspect, wherein a plurality of the swinging members are disposed, and the plurality of swinging members are disposed at symmetrical positions with respect to a central axis line of the cylinder body that passes through a central position in a diameter direction of the cylinder body.

According to this configuration, multiple swinging members are disposed at symmetrical positions with respect to the central axis line of the cylinder body. For this reason, in the swinging member, the piston, the rod, and the cylinder including the cylinder body, load is distributed and supported so as to be more nearly uniform centered about the central axis line of the cylinder body. This makes it possible to efficiently suppress the occurrence of forcible rubbing between members in contact, and makes it possible to improve the drive efficiency of the device.

A brake cylinder device according to an eighth aspect of the invention is the brake cylinder device according to the seventh aspect, wherein two of the swinging members are disposed, and the two swinging members are provided with a total of three or more of at least one of a force point portion that is biased by the piston and an action point portion that biases the rod.

According to this configuration, the number of swinging members that are disposed at symmetrical positions with respect to the central axis line of the cylinder body can be set to at least two, and it is possible to provide three or more of at least one of the force point portion and the action point portion. This makes it possible to efficiently suppress the occurrence of forcible rubbing between members in contact, and makes it possible to both further reduce the size of the device structure and further improve the drive efficiency of the device.

A brake cylinder device according to a ninth aspect of the invention is the brake cylinder device according to any of the first aspect to the fifth aspect, the seventh aspect, and the eighth aspect, wherein the force amplifying mechanism further includes a support portion that swingably supports the swinging member at a fulcrum portion of the swinging member provided as a lever, the support portion includes a first block portion and a second block portion that are configured so as to be divided in the cylinder axial direction, and are integrally combined so as to rotatably hold the fulcrum portion, the first block portion is fixed to a cylinder bottom portion that is fixed to an end of the cylinder body on the backward movement direction side, and the second block portion is fixed to the cylinder body on an end side of the cylinder body on the backward movement direction side.

According to this configuration, the swinging members are held so as to be rotatably sandwiched between the first block portion and the second block portion, the first block portion is fixed to the cylinder bottom portion, and the second block portion is fixed to the cylinder body, thus making it possible to very easily assemble the brake cylinder device with the force amplifying mechanism incorporated therein. This makes it possible to significantly reduce the work burden when assembling the brake cylinder device.

A brake cylinder device according to a tenth aspect of the invention is the brake cylinder device according to any of the first aspect to the ninth aspect, further including: a parking brake mechanism used when parking a vehicle equipped with the brake cylinder device, the parking brake mechanism including: a plurality of parking brake springs arranged so as to be in a line along a circumferential direction of the cylinder body; and a parking brake piston that is arranged inside the cylinder body so as to define a second pressure chamber for parking brake release that is different from the pressure chamber and circumferentially surround an axis of the rod, is provided so as to be movable along a direction parallel to the movement direction of the rod, and biases the piston by moving in the backward movement direction relative to the cylinder body due to biasing force from the parking brake springs when pressure fluid is discharged from the second pressure chamber.

According to this configuration, the parking brake mechanism includes the parking brake springs that generate braking force for a parking brake, the parking brake piston that biases the piston due to being biased by the parking brake springs, and the second pressure chamber for parking brake release, and this parking brake mechanism can be incorporated in the brake cylinder device. Also, since the parking brake piston that moves parallel with the movement direction of the rod is arranged so as to surround the axis of the rod, it is possible to efficiently use the arrangement space for the parking brake piston as well, and in particular it is possible to significantly reduce the arrangement space for the parking brake piston in the cylinder axial direction. Also, according to the above configuration, even if a large amount of braking force is needed as braking force for the parking brake, the necessary braking force can be easily ensured by the multiple parking brake springs. Also, since the parking brake springs are arranged in a line along the circumferential direction of the cylinder body, it is possible to easily arrange the parking brake springs in a compact space while avoiding interference with other portions such as the brake output portion. This makes it possible to reduce the dimensions of the brake cylinder device in the axial direction and the diameter direction (i.e., achieve a shorter axis and compactness).

Note that in the case where one or two large coil springs arranged concentrically to the cylinder body are provided as the parking brake spring, ensuring the necessary braking force requires an increase in the wire diameter of the coil spring, and also an increase in the compression length. This has made it difficult to reduce the size of a brake cylinder device with a parking brake mechanism incorporated therein. Also, since the parking brake spring needs to be arranged so as to not interfere with other portions such as the brake output portion, when the above-described coil spring is provided, it is arranged outside of the cylinder body in the diameter direction, thus inviting an increase in size of the brake cylinder device and making it difficult to achieve compactness. In contrast, according to the above-described configuration, multiple parking brake springs are arranged so as to be in a line along the circumferential direction of the cylinder body, thus making it possible to easily arrange the parking brake springs in a compact space while avoiding interference with other portions such as the brake output portion, and making it possible to reduce the dimensions of the brake cylinder device in the axial direction and the diameter direction.

A brake cylinder device according to an eleventh aspect of the invention is the brake cylinder device according to the tenth aspect, wherein the plurality of parking brake springs are arranged outside the cylinder body.

According to this configuration, the parking brake springs are arranged outside the cylinder body, thus making it possible to suppress an increase in the size of the cylinder body. Also, since the parking brake springs are arranged in a line along the circumferential direction outside the cylinder body, the parking brake springs can be compactly arranged in the space that is more than necessary outside the cylinder body. This makes it possible to further reduce the size of the brake cylinder device. Note that the brake cylinder device according to the above configuration is configured such that during the braking operation, the piston and the parking brake piston move in the backward movement direction, and the rod moves in the forward movement direction, which is the opposite direction, thus making it possible to more easily realize a configuration in which the parking brake springs are arranged outside the cylinder body.

A brake cylinder device according to a twelfth aspect of the invention is the brake cylinder device according to the tenth aspect or the eleventh aspect, wherein the plurality of parking brake springs are arranged on two lateral sides of the brake output portion, and are aligned in a direction parallel to a diameter direction of the cylinder body.

According to this configuration, multiple parking brake springs are arranged along the diameter direction of the cylinder body on the two lateral sides of the brake output portion. This makes it possible to compactly arrange the parking brake springs with efficient use of space while avoiding interference with the brake output portion. Also, it is possible to effectively utilize dead space on the sides of the brake output portion and to efficiently arrange the parking brake springs partially along the circumference direction of the cylinder body. This makes it possible to reduce the dimensions of the brake cylinder device in the axial direction and the diameter direction (i.e., further achieve a shorter axis and compactness).

A brake cylinder device according to a thirteenth aspect of the invention is the brake cylinder device according to any of the first aspect to the twelfth aspect, further including: a threaded shaft that is connected to the brake output portion and has a thread formed on an outer circumference; a guide tube that is attached to the rod and has the threaded shaft arranged inside; a pusher spring arranged so as to be able to bias the threaded shaft in the forward movement direction relative to the cylinder body or a portion fixed to the cylinder body; a clutch nut that is threadably engaged to a tip side of the threaded shaft arranged on the brake output portion side relative to the cylinder body; a front stopper that is arranged so as to be capable of coming into contact with the clutch nut from a front side that is the brake output portion side so as to restrict movement of the clutch nut relative to the guide tube, and is capable of biasing the clutch nut and the threaded shaft in the backward movement direction along with movement of the guide tube in the backward movement direction; a first clutch arranged so as to be capable of coming into contact with the clutch nut with a predetermined interval from the front stopper from a rear side that is a side opposite to the brake output portion side with respect to the clutch nut; an adjustment stopper that is arranged so as to be movable relative to the clutch nut and the guide tube along an axial direction of the threaded shaft, and whose movable range is restricted with respect to the cylinder body or a member fixed to the cylinder body; a second clutch to which the adjustment stopper is fixed, and that is arranged so as to be able to come into contact with the clutch nut from the rear side; and an adjustment spring that, at one end side, is in contact with or connected to the adjustment stopper or the second clutch, and is capable of biasing the clutch nut in the backward movement direction.

According to this configuration, during the braking operation, due to compressed fluid being supplied to the pressure chamber, force from the piston resisting against the biasing force of the rod biasing spring is transmitted via the force amplifying mechanism to the rod to cause it to move, and the brake output portion moves in the forward movement direction via the guide tube, the first clutch, the clutch nut, and the threaded shaft, thus outputting braking force. On the other hand, due to compressed fluid being discharged from the pressure chamber, the rod moves in the backward movement direction due to biasing force from the rod biasing spring, and the brake output portion moves in the backward movement direction via the guide tube, the front stopper, the clutch nut, and the threaded shaft, and thus the brake is released. Also, if the clearance to the brake operating position in the brake-released state has increased due to wear of the brake pad or the like, this clearance is automatically adjusted by the clearance adjustment mechanism that is configured so as to include the clutch nut, the first and second clutches, the threaded shaft, the guide tube, the pusher spring, the front stopper, the adjustment stopper, the adjustment spring, and the like.

When performing clearance adjustment, first, during the braking operation, the range of movement of the adjustment stopper is restricted such that force for biasing the clutch nut in the backward movement direction is accumulated in the adjustment spring as accumulated force of the adjustment spring. Also, at this time, the contact between the clutch nut and the second clutch with the adjustment stopper fixed thereto is canceled, and a clearance is formed between the second clutch and the clutch nut. Also, during the brake releasing operation, when the guide tube starts to move in the backward movement direction, the threaded shaft and the brake output portion do not move in the backward movement direction due to the threaded shaft being biased in the forward movement direction by the pusher spring, and the clutch nut is biased in the backward movement direction by the accumulated force of the adjustment spring. At this time, the contact between the clutch nut and the first clutch is canceled, and the clutch nut is not in contact with the front stopper, and furthermore the clutch nut is not in contact with the second clutch either, thus making it possible for the clutch nut to rotate relative to the threaded shaft. Then, the clutch nut rotates relative to the threaded shaft so as to move in the backward movement direction due to the accumulated force of the adjustment spring. Then, the clearance between the clutch nut and the second clutch disappears, the clutch nut and the second clutch are in contact with each other, the clutch nut can no longer rotate, and as the guide tube moves in the backward movement direction, the brake output portion moves in the backward movement direction along with the front stopper, the clutch nut, and the threaded shaft, and the brake is released. Thus, the clutch nut moves relative to the threaded shaft in the backward movement direction in the middle of the brake releasing operation, and therefore, the brake releasing operation ends in a state in which the position of the threaded shaft has moved further in the forward movement direction than in the state before the brake releasing operation. That is, a transition is made to a state in which the threaded shaft and the brake output portion have moved to positions projecting with respect to the cylinder body, as compared to the state before the braking operation. Consequently, the clearance up to the brake operating position in the brake-released state is automatically adjusted.

As described above, the clearance adjustment mechanism is configured so as to include the clutch nut, the first and second clutches, the threaded shaft, the guide tube, the pusher spring, the front stopper, the adjustment stopper, and the adjustment spring. Accordingly, the clearance adjustment is not performed using elastic deformation of rubber or the like as with the brake cylinder device disclosed in Patent Document 2, and it is therefore possible to achieve a configuration that is less likely to be affected by the surrounding environment such as temperature and humidity at low cost.

Accordingly, with the above configuration, it is possible to provide a brake cylinder device that includes a clearance adjustment mechanism for automatically adjusting a clearance up to a brake operating position in a brake-released state at low cost, wherein the brake cylinder device is small and less likely to be affected by the surrounding environment such as temperature and humidity.

Note that with the brake cylinder device according to the above configuration, in the state in which the automatic clearance adjustment operation by the clearance adjustment mechanism is not performed, the state in which the second clutch and the clutch nut are in contact with each other is maintained regardless of whether it is during the braking operation or when the brake is released, and the contact between the second clutch and the clutch nut is prevented from being released. In other words, in the state in which the clearance adjustment operation is not performed, the clutch nut is biased in the backward movement direction by the adjustment spring in contact or connected at the first end thereof with the adjustment stopper or the second clutch, and thereby the state in which the second clutch and the clutch nut are in contact with each other is maintained. Accordingly, the clutch nut is prevented from rotating with respect to the threaded shaft at any time other than during the clearance adjustment operation, and the position of the clutch nut with respect to the threaded shaft is prevented from shifting due to vibration or the like.

It is also possible to configure a disk brake device that includes any of the above-mentioned brake cylinder devices. Specifically, a disk brake device according to a fourteenth aspect of the invention includes the brake cylinder device according to any of the first aspect to the thirteenth aspect, and a caliper body that is equipped with the brake cylinder device and is attached so as to be displaceable relative to a vehicle in an axle direction, wherein operation of the brake cylinder device causes a disk on an axle side to be sandwiched by a pair of brake pads attached to the caliper body, thereby generating braking force.

According to this configuration, it is possible to provide a small disk brake device that can increase braking force while suppressing an increase in the device size.

A disk brake device according to a fifteenth aspect of the invention is the disk brake device according to the fourteenth aspect, wherein the caliper body includes a pair of brake levers that are swingably disposed and respectively support the brake pads, the brake cylinder device further includes a parking brake mechanism used when parking a vehicle that is equipped with the brake cylinder device, the parking brake mechanism includes: a plurality of parking brake springs arranged so as to be in a line along a circumferential direction of the cylinder body; and a parking brake piston that is arranged inside the cylinder body so as to define a second pressure chamber for parking brake release that is different from the pressure chamber and circumferentially surround an axis of the rod, is provided so as to be movable along a direction parallel to the movement direction of the rod, and biases the piston by moving in the backward movement direction relative to the cylinder body due to biasing force from the parking brake springs when pressure fluid is discharged from the second pressure chamber, and the plurality of parking brake springs are arranged outside the cylinder body. Also, in the disk brake device according to the fifteenth aspect of the invention, an end of the parking brake spring arranged on an outer side in a vehicle width direction that is a width direction of the vehicle is arranged inward in the vehicle width direction relative to a portion located most outward in the vehicle width direction in a swing center portion of, among the pair of brake levers, the brake lever arranged on the outer side in the vehicle width direction.

According to this configuration, the end of the parking brake spring on the outer side in the vehicle width direction is arranged inward in the vehicle width direction relative to the portion that is the most outward in the vehicle width direction in the swing center portion of the brake lever on the outer side in the vehicle width direction. This makes it possible to reliably prevent the parking brake springs from interfering with the railroad vehicle or other devices disposed in the railroad vehicle.

Effects of the Invention

The present invention enables providing a small brake cylinder device that can increase braking force output from a brake output portion that moves along with a rod, while suppressing an increase in the device size. It is also possible to provide a disk brake device that includes this brake cylinder device.

DESCRIPTION OF EMBODIMENTS

Hereinafter, embodiments of the present invention will be described with reference to the drawings. The embodiments of the present invention relate to and are broadly applicable to a brake cylinder device that moves a rod by operating using pressure fluid, and outputs braking force from a brake output portion that moves along with the rod, and to a disk brake device that includes this brake cylinder device. Note that the following description takes the example of cases where the brake cylinder device and the disk brake device of the embodiments are used for a railroad vehicle. Further, the accuracy of the attached drawings approximates to that of engineering drawings.

First Embodiment

Disk Brake Device

Figure 1:
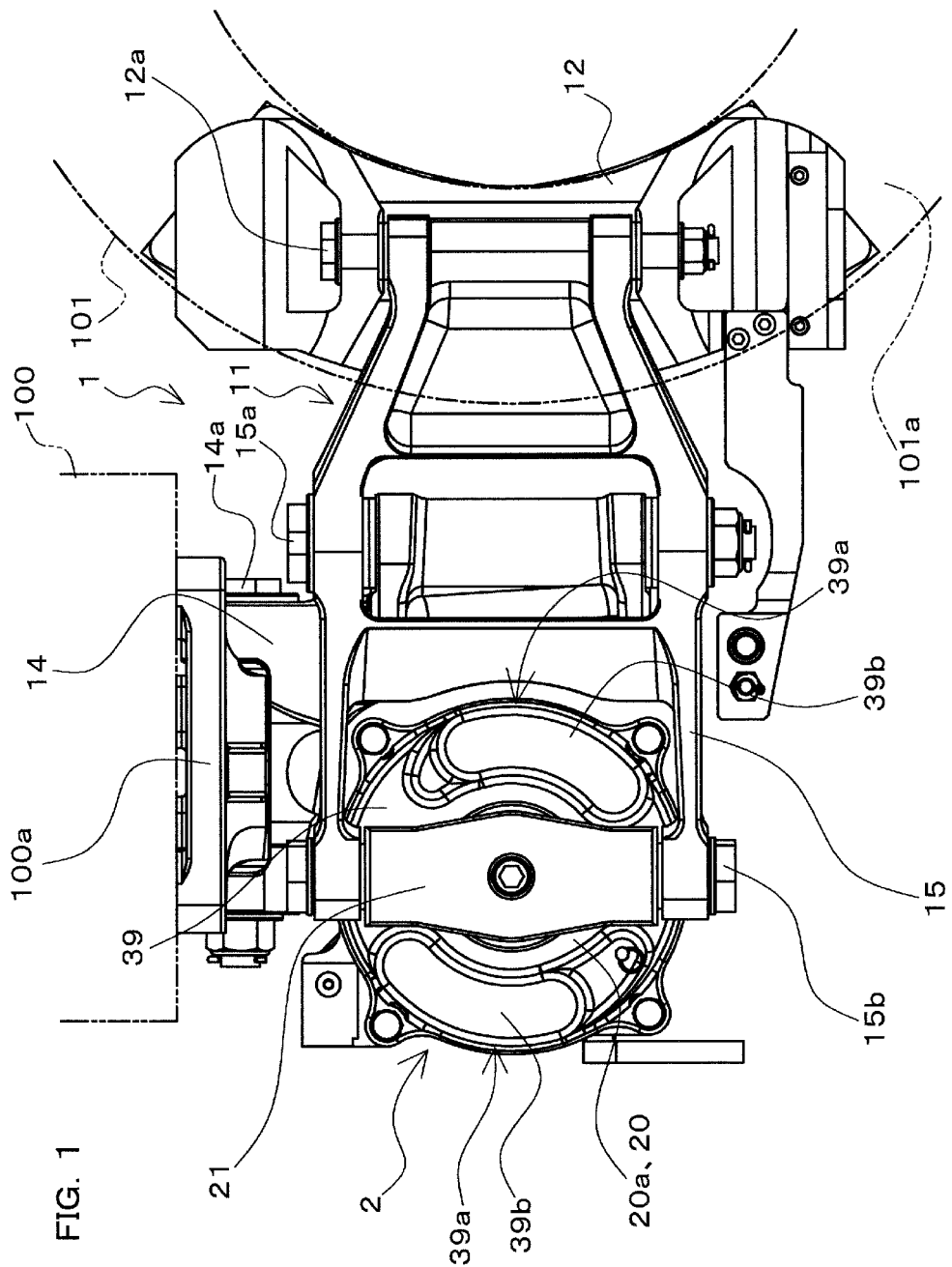
FIG. 1 is a side view of a disk brake device according to a first embodiment of the present invention.
Figure 2:
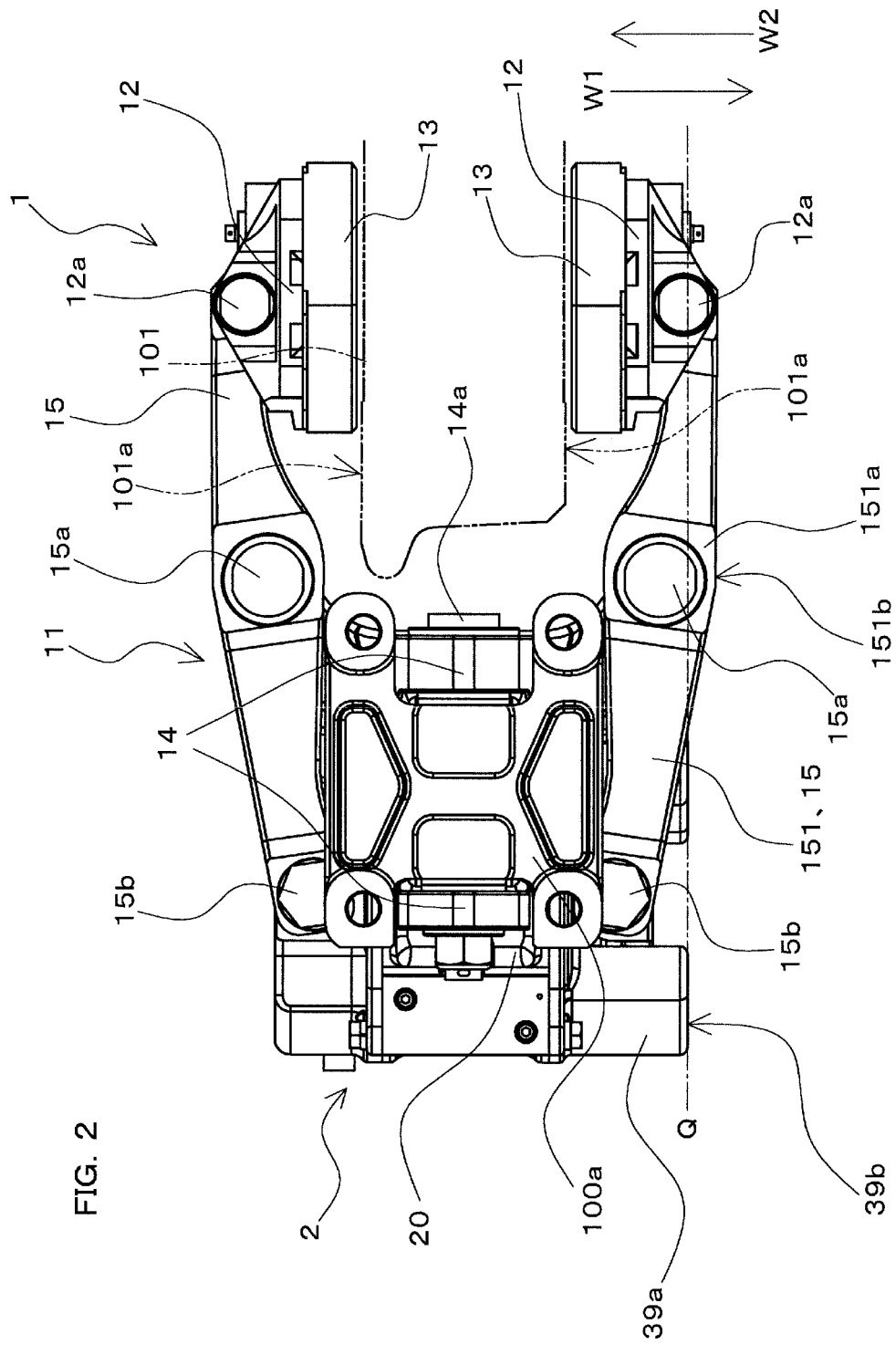
FIG. 2 is a plan view of the disk brake device shown in FIG. 1.

FIG. 1 is a side view of a disk brake device 1 according to a first embodiment of the present invention, as viewed from the axle direction. Also, FIG. 2 is a plan view of the disk brake device 1 shown in FIG. 1, as viewed from above. The disk brake device 1 shown in FIGS. 1 and 2 includes a brake cylinder device 2, a caliper body 11 equipped with the brake cylinder device 2 and attached so as to be displaceable relative to a vehicle body 100 in the axle direction, a pair of back plates (12, 12) serving as brake shoe holding portions for respectively holding a pair of brake pads (13, 13) serving as brake shoes, and so forth.

The pair of brake pads (13, 13) are attached to the caliper body 11 via the back plates 12. Also, the disk brake device 1 is configured such that operation of the brake cylinder device 2 causes the pair of brake pads (13, 13) to sandwich a disk-like brake disk 101 serving as a disk on the axle side that rotates in coordination with the rotation of a wheel (not shown) of a railroad vehicle, thus generating braking force. Note that the brake disk 101 is formed in the shape of a disk having braking surfaces (101*a*, 101*a*) on both sides that are formed so as to be orthogonal to the rotational axis. Then, operation of the brake cylinder device 2 causes the brake pads (13, 13) to be pressed against the braking surfaces (101*a*, 101*a*) so as to sandwich the brake disk 101 from opposite sides from a direction substantially parallel to the direction of the rotational axis of the brake disk 101.

The caliper body 11 includes a coupling member 14 and a pair of brake levers (15, 15). The coupling member 14 is attached via a swing pin 14*a* to a bracket 100*a* fixed to the bottom face of the vehicle body 100 such that the coupling member 14 is swingable about an axis parallel to the traveling direction of the vehicle. Also, the pair of brake levers (15, 15) are provided substantially symmetrical with respect to the coupling member 14 so as to be swingable via a pair of fulcrum pins 15*a*. The fulcrum pins 15*a* are provided so as to extend in a direction perpendicular to the axial direction of the swing pin 14*a*, as viewed from the direction of the rotational axis of the disk brake 101.

The pair of brake levers (15, 15) are each configured such that one end is attached to the brake cylinder device 2 via a cylinder support pin 15*b*, and that end is driven by the brake cylinder device 2. Also, the pair of back plates (12, 12) for holding the brake pads 13 are respectively attached to the other ends of the pair of brake levers (15, 15) via the fulcrum pins 15*a*, which are the ends opposite to the ends to which the brake cylinder device 2 is attached. The back plates 12 are swingably attached to the brake levers 15 via support pins 12*a* extending parallel to the fulcrum pins 15*a*. Accordingly, the pair of brake levers (15, 15) respectively support the brake pads 13 via the back plates 12.

In the above-described disk brake device 1, as will be described below, a cylinder body 20*a* or a cylinder bottom portion 20*b* of the cylinder 20 of the brake cylinder device 2 is attached to one of the brake levers 15, and the brake output portion 21 is attached to the other brake lever 15. Also, in the disk brake device 1, due to the operation of the brake cylinder device 2, the brake output portion 21 operates so as to move forward relative to the cylinder body 20*a* (operation of separating from the cylinder body 20a) or operates so as to move backward relative to it (operation of approaching the cylinder body 20a). Accordingly, the pair of brake levers (15, 15) are driven such that portions thereof that are in the vicinity of the cylinder support pins 15b move toward or away from each other.

Due to the above-described driving, the disk brake device 1 operates such that the pair of brake levers (15, 15) operate with the fulcrum pins 15a serving as the fulcrums and the brake disk 101 is sandwiched by the brake pads 13. Also, at this time, in the pair of brake levers (15, 15), one of the brake pads 13 that is provided on one of the brake levers 15 comes into contact with a braking surface 101a of the brake disk 101 first. Furthermore, the other brake lever 15 presses the other brake pad 13 against a braking surface 101a of the brake disk 101, using reaction force applied by the brake pad 13 that has come into contact with the braking surface 101a. Thereby, the brake disk 101 is sandwiched by the pair of brake pads (13, 13), and the frictional force generated between the brake pads (13, 13) and the braking surfaces (101a, 101a) brakes the rotation of the brake disk 101, thus braking the rotation of the wheel of the railroad vehicle that is provided coaxially with the brake disk 101.

Configuration of Brake Cylinder Device

Figure 3:
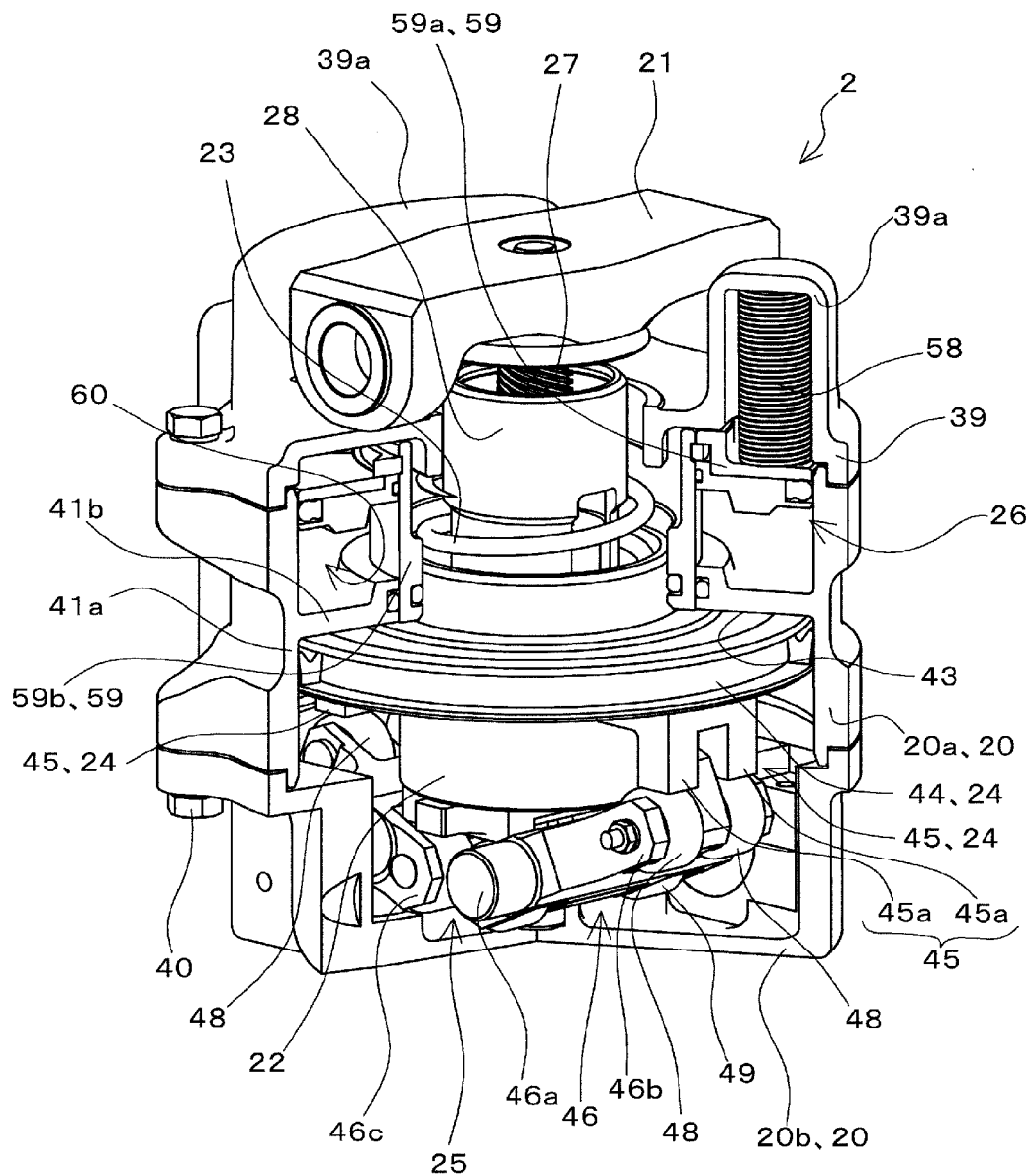
FIG. 3 is a perspective view of the brake cylinder device according to the first embodiment of the present invention, and shows the internal structure in a cutout cross-section.
Figure 4:
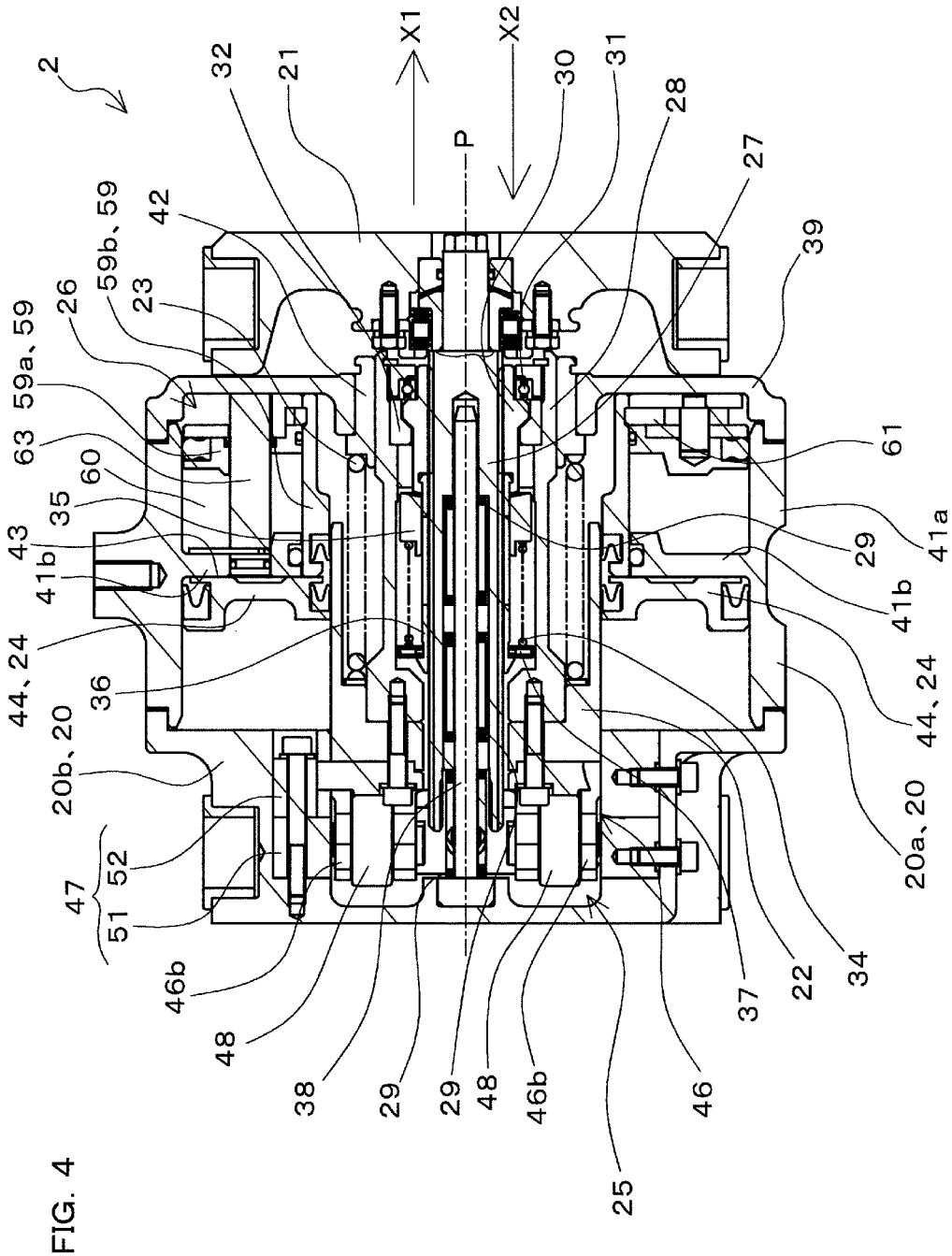
FIG. 4 is a cross-sectional view of the brake cylinder device shown in FIG. 3.
Figure 5:
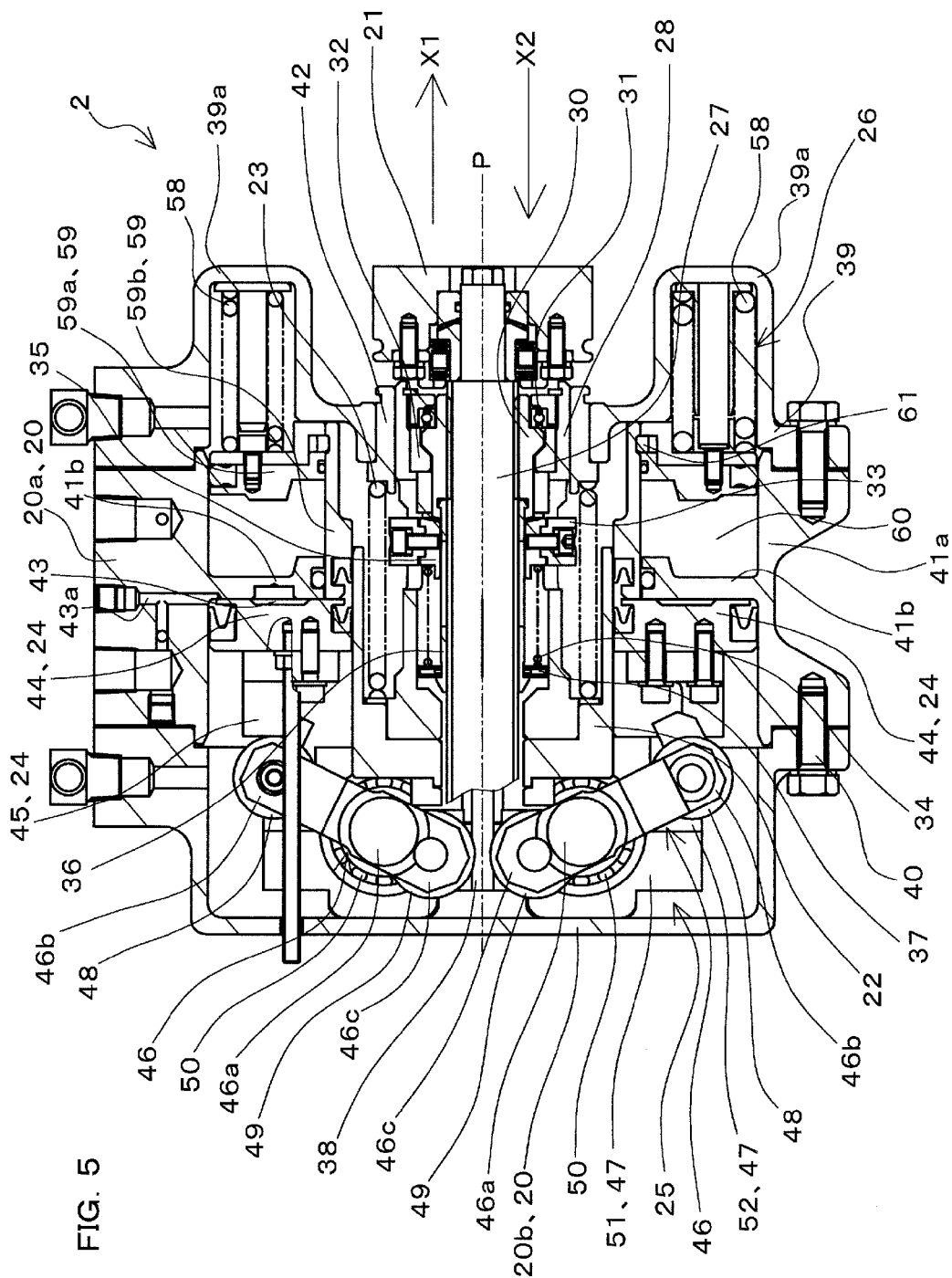
FIG. 5 is a cross-sectional view of the brake cylinder device shown in FIG. 3.

Next, the brake cylinder device 2 according to the first embodiment of the present invention will be described in detail. FIG. 3 is a perspective view of the brake cylinder device 2, and shows the internal structure in a cutout cross-section. Also, FIGS. 4 and 5 are cross-sectional views of the brake cylinder device 2. FIGS. 4 and 5 show cross-sections that are at different positions and include a central axis line P (central axis line indicated by the one-dot chain line P in FIGS. 4 and 5) in the brake cylinder device 2.

Opposite ends of the brake cylinder device 2 in the brake operating direction are respectively connected to the cylinder support pins 15b. This brake cylinder device 2 is configured so as to include the cylinder 20, the brake output portion 21, the rod 22, a rod biasing spring 23, a piston 24, a force amplifying mechanism 25, a parking brake mechanism 26, a threaded shaft 27, a guide tube 28, a pusher spring 29, a clutch nut 30, a front stopper 31, a first clutch 32, and adjustment stopper 33, an adjustment spring 34, a second clutch 35, an adjustment sleeve 36, a spring receiver 37, a pusher spring guide 38, a cover 39, and so on. Among the above-described components, those other than the adjustment sleeve 36 are formed of, for example, a metallic material such as an iron-based material, and the adjustment sleeve 36 is formed of, for example, a resin material. Note that FIGS. 4 and 5 show the outer shape, rather than the cross section, of some of the constituent elements. Also, FIG. 5 partially includes a cross-section at a different cross-sectional position, and shows a cutout cross-section. Furthermore, in view of clearly showing the configuration, diagonal hatching has been omitted in the cross-section in FIG. 3 (the same follows for FIGS. 13 to 15 as well).

The cylinder 20 is configured by a cylinder body 20a and a cylinder bottom portion 20b. Also, the rod 22, the rod biasing spring 23, the piston 24, the force amplifying mechanism 25, part of the threaded shaft 27, the guide tube 28, the pusher spring 29, the adjustment stopper 33, the adjustment spring 34, the second clutch 35, the adjustment sleeve 36, the spring receiver 37, the pusher spring guide 38, and so on are arranged inside the cylinder 20.

The cylinder body 20a is formed as a tube with a hollow interior. In contrast, the cylinder bottom portion 20b is formed such that one end is open, and the other end has a bottom so as to have a cavity-like space inside. This cylinder bottom portion 20b is fixed to the end of the cylinder body 20a on one side (the backward movement direction X2 side that will be described later). Note that the open-side end of the cylinder bottom portion 20b is fixed to the end of the cylinder body 20a using multiple bolts 40. Also, in the present embodiment, the end of the cylinder bottom portion 20b of the cylinder 20 is connected to one of the brake levers 15 by the cylinder support pins 15b.

Also, the cylinder body 20a is provided with a tubular portion 41a and a planar portion 41b. The tubular portion 41a is provided as a portion formed as a tube that is to be fixed to the end of the cylinder bottom portion 20b. The planar portion 41b is provided as a portion formed as a flange that protrudes inward on the inner side in the central portion in the axial direction of the tubular portion 41a, and extends along the circumferential direction of the tubular portion 41a. Note that the axial direction of the tubular portion 41a is the cylinder axial direction, which is the axial direction of the cylinder body 20a, and is a direction parallel to the central axis line P of the cylinder body 20a that passes through the central position in the diameter direction of the cylinder body 20a.

Also, a through hole that is arranged so as to be penetrated by the rod 22 and the like is formed in the central portion, with respect to the diameter direction, of the planar portion 41b. Also, a cover 39 that covers the opening of the tubular portion 41a on the side opposite to the cylinder bottom portion 20a side is provided as a plate-shaped lid-like member, and is fixed to the end of the cylinder body 20a on the side opposite to the side fixed to the cylinder bottom portion 20b of the tubular portion 41a. Note that a through hole arranged so as to be penetrated by the threaded shaft 27 and the guide tube 28 is formed in the central portion, with respect to the diameter direction, of the cover 39.

Figure 6:
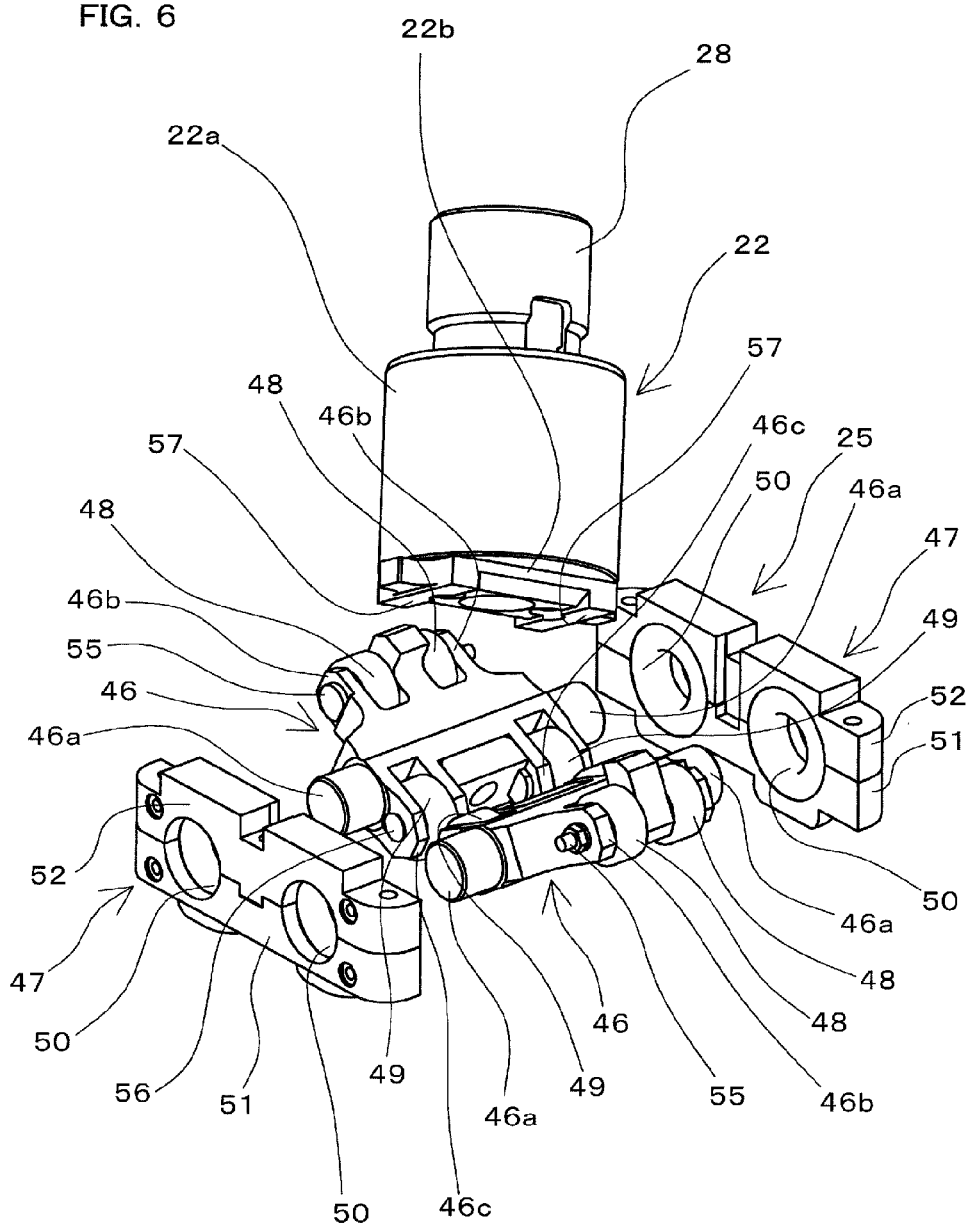
FIG. 6 is an exploded perspective view of a rod, a guide tube, and a force amplifying mechanism in the brake cylinder device shown in FIG. 3.

FIG. 6 is an exploded perspective view showing the rod 22, the guide tube 28, and the force amplifying mechanism 25. As shown in FIGS. 3 to 6, the rod 22 is provided as a tubular member arranged inside the cylinder 20. Also, the rod 22 is provided so as to be movable in a forward movement direction of moving forward from the cylinder body 20a and in a backward movement direction of moving backward in a direction opposite to the forward movement direction, both of which are linear directions along the cylinder axial direction, which is parallel to the central axis line P. Note that as shown in FIGS. 4 and 5, the forward movement direction will referred to as the "forward movement direction X1" (the direction indicated by an arrow X1 in the figures) in the following description, and the backward movement direction will be referred to as the "backward movement direction X2" (the direction indicated by an arrow X2 in the figures).

The rod 22 is provided with a rod body portion 22a shaped as a cylinder and a drive transmission portion 22b that is fixed to the rod body portion 22a. Two levels of stepped portions where the diameter decreases in steps toward the backward movement direction X2 side are formed on the inside of the rod body portion 22a (see FIGS. 4 and 5). Also, the end of the rod biasing spring 23 is arranged so as to come into contact with the stepped portion on the forward movement direction X1 side. Also, the end of the guide tube 28 on the backward movement direction X2 side is fixed by a bolt to the stepped portion on the backward movement direction X2 side so as to be fitted into this stepped portion.

The drive transmission portion 22b is provided in the rod 22 as a portion that is biased due to receiving drive force from the force amplifying mechanism 25. Also, the drive transmission portion 22b is fixed by the above-described bolt to the end of the rod body portion 22a on the backward movement direction X2 side. This bolt passes through the drive transmission portion 22b and the end of the rod body portion 22a on the backward movement direction X2 side, and is threadably engaged to the end of the guide tube 28 on the backward movement direction X2 side. Note that the drive transmission portion 22b and the rod body portion 22a may be formed integrally.

As shown in FIGS. 3 to 5, the rod biasing spring 23 is provided as a coil-shaped spring that is arranged around the guide tube 28 inside the rod 22. Also, the rod biasing spring 23 is arranged between a tubular support member 42 that is fixed to the edge portion of the through hole in the center of the cover 39 and the stepped portion of the rod 22 on the forward movement direction X1 side. Note that the tubular support member 42 shown in FIGS. 4 and 5 is not shown in FIG. 3.

Also, the end of the rod biasing spring 23 on the forward movement direction X1 side is formed as a tubular member and is supported due to coming into contact with the end of the tubular support member 42 on the backward movement direction X2 side where the side face of the guide tube 28 slides along the inner circumference. On the other hand, the end of the rod biasing spring 23 on the backward movement direction X2 side is supported due to coming into contact with the stepped portion of the rod 22 on the forward movement direction X1 side as previously described. Accordingly, the rod biasing spring 23 is configured so as to be able to bias the rod 22 in the backward movement direction X2 with respect to the cover 39 and the tubular support member 42, which are members that are fixed to the cylinder body 20a.

As shown in FIGS. 3 to 5, the piston 24 is arranged so as to partition the interior of the cylinder 20, and is provided so as to come into sliding contact with the inner circumferential face of the cylinder body 20a of the cylinder 20 in an air-tight manner, and so as to be slidable in the axial direction relative to the cylinder body 20a. The space defined by the piston 24 and the cylinder body 20a forms a pressure chamber 43 inside the cylinder body 20a of the cylinder 20. Compressed air serving as a pressure fluid is supplied to and discharged from the pressure chamber 43 via a communication passage 43a (see FIG. 5).

Also, the piston 24 is provided with a disk-like portion 44 and multiple projecting portions (45, 45). The disk-like portion 44 is provided as a disk-like portion that comes into sliding contact with the inner circumference of the cylinder body 20a in a sealing member fitted to the outer circumference. Also, a through hole is formed in the central portion of the disk-like portion 44. The disk-like portion 44 is arranged so as to come into sliding contact with the outer circumference of the rod 22 via the sealing member fitted to the inner circumference of the through hole in the central region. Accordingly, the piston 24 is arranged so as to circumferentially surround the axis of the rod 22 and is provided so as to be movable along a linear direction that is parallel to the movement direction of the rod 22.

Due to providing the disk-like portion 44 configured as described above, the piston 24 is configured such that when compressed air serving as a pressure fluid is supplied to the pressure chamber 43, the piston 24 moves in the backward movement direction X2 relative to the cylinder body 20a in resistance to the biasing force of the rod biasing spring 23 via the later-described force amplifying mechanism 25.

The number of projecting portions (45, 45) on the piston 24 corresponds to the number of swinging members 46 of the later-described force amplifying mechanism 25, and two projecting portions are provided in the present embodiment. Each projecting portion 45 is formed as a portion that projects from the disk-like portion 44 toward the backward movement direction X2 side, parallel to the cylinder axial direction.

Also, the projecting portions 45 are provided on the piston 24 as portions that transmit drive force from the piston 24 to the force amplifying mechanism 25 and bias the swinging members 46.

Various shapes may be selected for the projecting portions 45 that protrude from the disk-like portion 44. For example, it is possible to implement projecting portions 45 that protrude in various shapes such as protrusions, blocks, or columns. The present embodiment illustrates an aspect in which the number of projecting portions 45 corresponds to two bearings 48 provided on a force point portion 46b of each later-described swinging member 46, and the projecting portions 45 are provided with two protrusion portions 45a that come into contact with the bearings 48.

The brake output portion 21 is connected to the rod 22 via the threaded shaft 27, the guide tube 28, and so forth, which will be described below, and is provided so as to be movable together with the rod 22. Accordingly, the brake output portion 21 is provided so as to be movable in the forward movement direction X1 in which it moves forward from the cylinder body 20a and the backward movement direction X2 in which it moves backward so as to approach the cylinder body, and is configured so as to be able to output braking force when the rod 22 moves in the forward movement direction X1. Also, the brake output portion 21 is connected to the other brake lever 15 with the cylinder support pins 15b.

Figure 7:
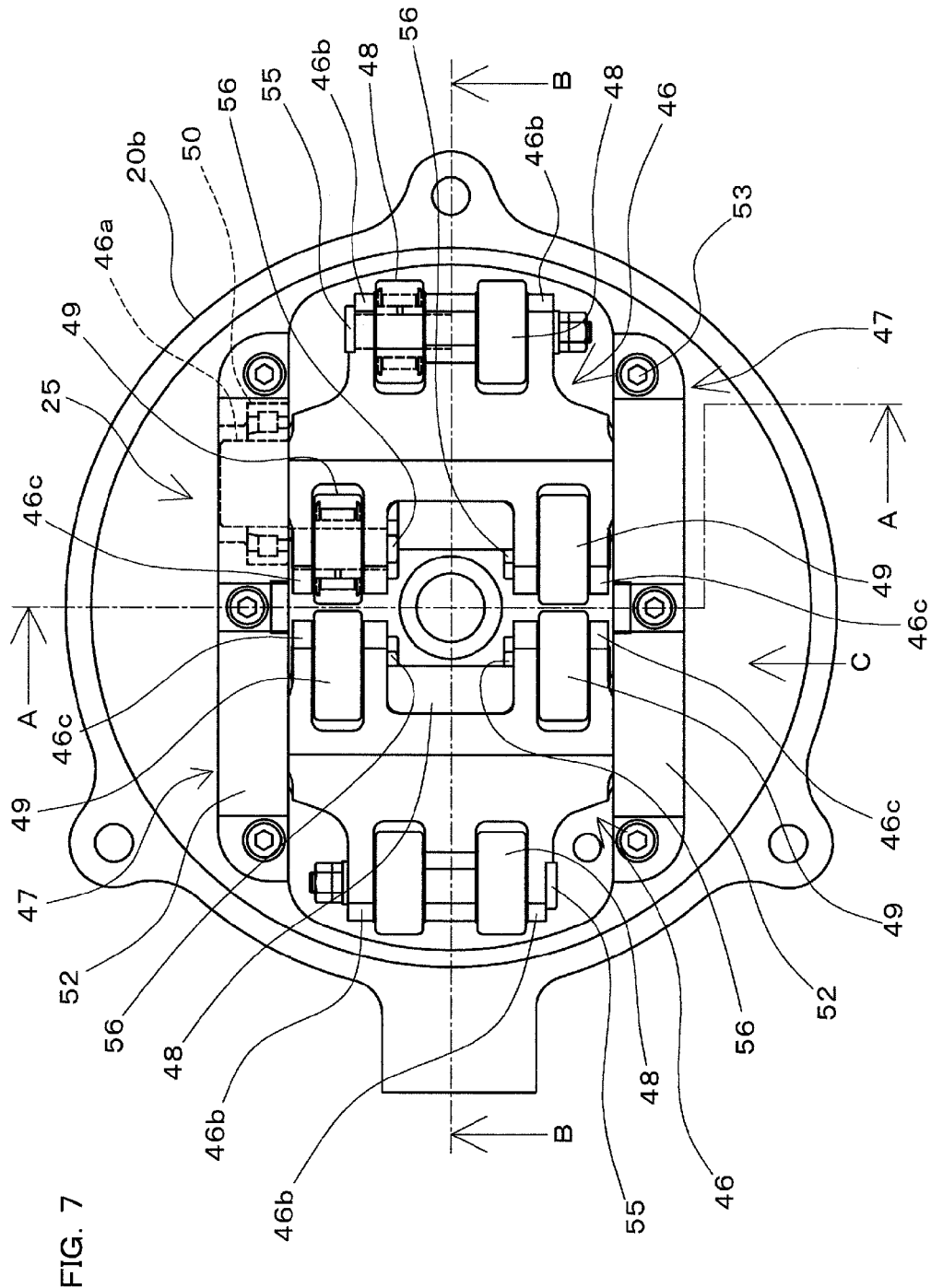
FIG. 7 is a diagram showing a cylinder bottom portion and the force amplifying mechanism in the brake cylinder device shown in FIG. 3.
Figure 8:
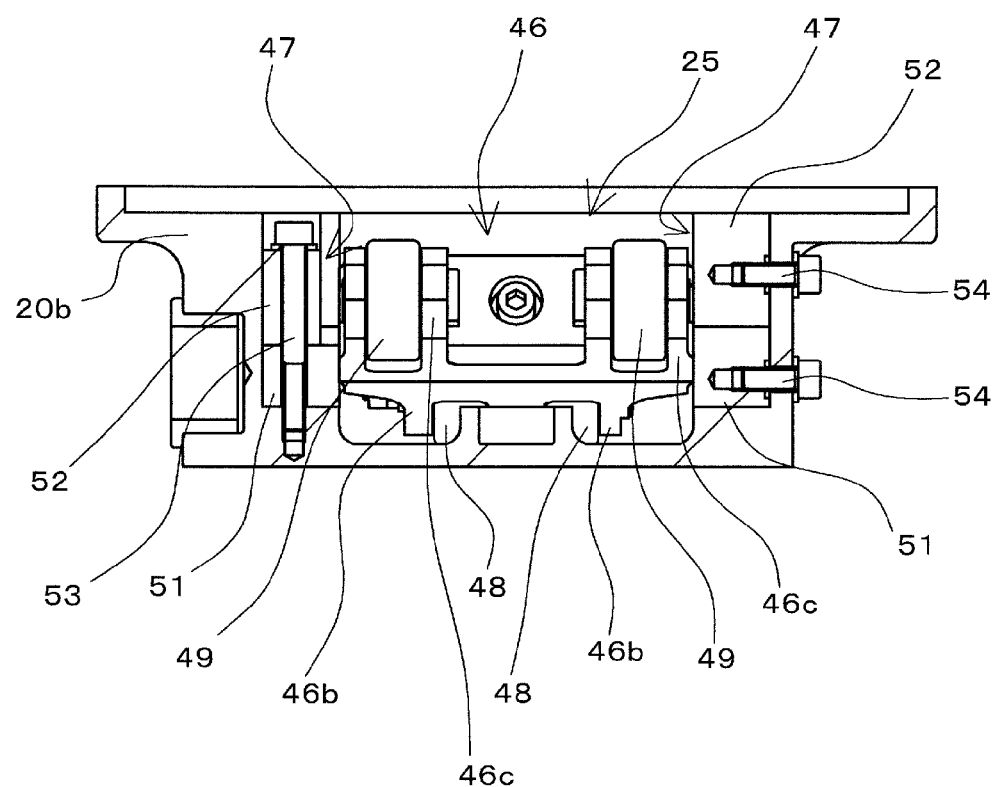
FIG. 8 is a cross-sectional view as seen from the positions of the arrows along line A-A in FIG. 7.
Figure 9:
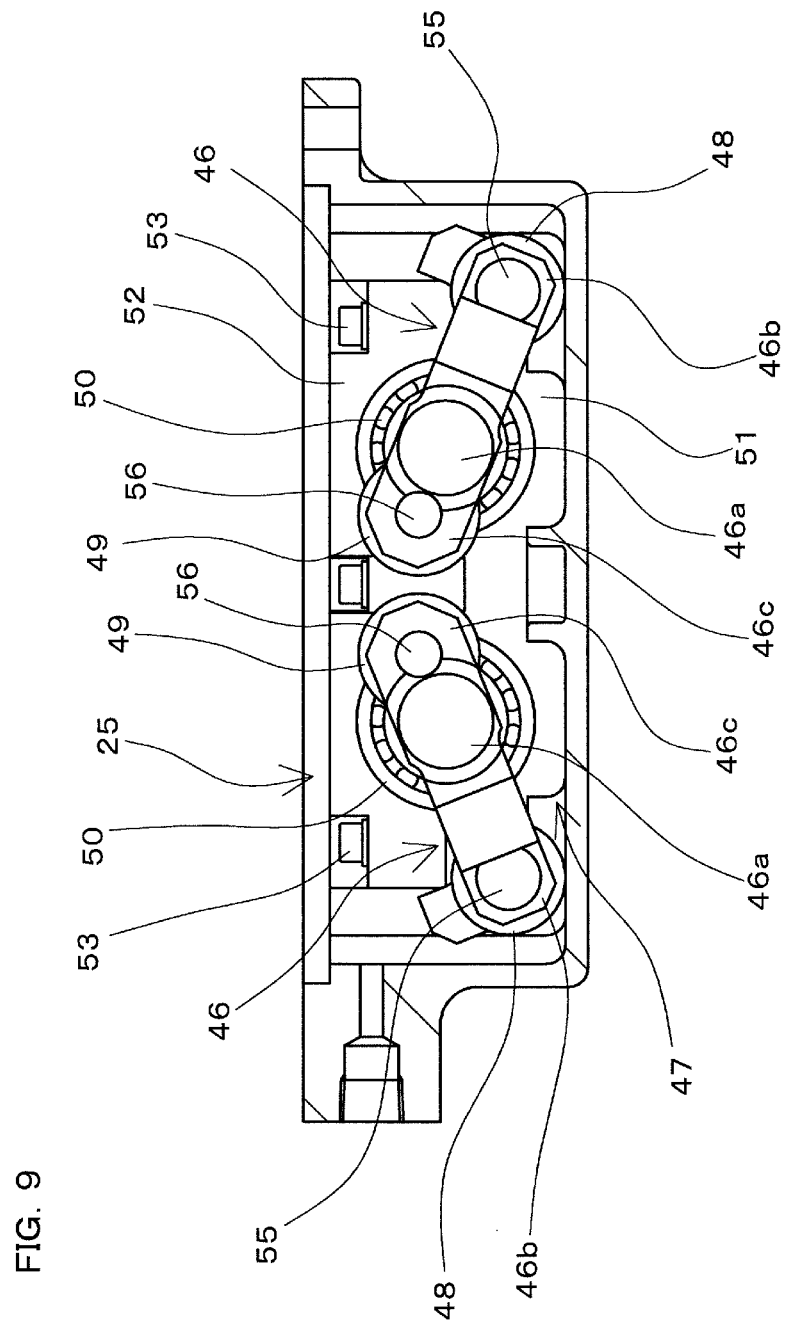
FIG. 9 shows a cross-sectional view of the cylinder bottom portion as seen from the positions of the arrows along line B-B in FIG. 7, and shows the outer shape of a portion of the force amplifying mechanism as seen from the direction of the arrow along line C in FIG. 7.

FIG. 7 shows the cylinder bottom portion 20b and the force amplifying mechanism 25 as viewed from the cylinder axial direction. FIG. 8 is a cross-sectional view as seen from the positions of the arrows along line A-A in FIG. 7. FIG. 9 shows a cross-sectional view of the cylinder bottom portion 20b as seen from the positions of the arrows along line B-B in FIG. 7, and shows the outer shape of a portion of the force amplifying mechanism 25 as seen from the direction of the arrow along line C in FIG. 7. The force amplifying mechanism 25 shown in FIGS. 3 to 9 is provided as a mechanism that, when the piston 24 moves in the backward movement direction X2, moves the rod 22 in the forward movement direction X1, amplifies the drive force from the piston 24, and applies the amplified drive force to the rod 22. Also, the force amplifying mechanism 25 is configured so as to include the swinging members 46, a support portion 47, the bearings 48, and bearings 49.

The swinging members 46 are provided as members that swing due to being biased by the piston 24 moving in the backward movement direction X2, and move the rod 22 by biasing it in the forward movement direction X1. Due to the provision of these swinging members 46, the force amplifying mechanism 25 is configured so as to convert drive force in a linear direction generated by the piston 24 into drive force in a linear direction in the parallel opposite direction.

Multiple swinging members 46 are disposed, and two of them are disposed in the present embodiment. Also, the multiple (two) swinging members (46, 46) are disposed at symmetrical positions with respect to the central axis line P. In the present embodiment, the two swinging members (46, 46) are disposed at positions that are point-symmetrical to the central axis line P and also line-symmetrical to the plane that includes the central axis line P.

Also, the swinging members 46 are provided as levers that are swingably supported at a fulcrum portion 46a. The swinging members 46 are each provided as a flat block-shaped member, and are provided with a force point portion 46b, the fulcrum portion 46a, and an action point portion 46c that are arranged in a line in the stated order from the outer side, with respect to the diameter direction, of the cylinder body 20a to the center side with respect to the diameter direction.

A pair of fulcrum portions 46a are provided for each swinging member 46. Also, the pair of fulcrum portions 46a are provided as shaft-like portions in the swinging member 46 that project outward toward both ends in a direction orthogonal to the direction in which the force point portion 46b, the fulcrum portions 46a, and the action point portion 46c are aligned. Each fulcrum portion 46a is rotatably held by a later-described support portion 47.

The force point portion 46b of each swinging member 46 is provided as a portion that is biased by the piston 24. Also, in the present embodiment, a pair of force point portions 46b are provided in a portion that projects into three portions at the end of the swinging member 46. Also, two later-described bearings (48, 48) are arranged between the three-branched projecting portions that configure the pair of force point portions (46b, 46b). The pair of force point portions (46b, 46b) are configured so as to each receive drive force from the piston 24 transmitted via the bearings 48.

The action point portion 46c of each swinging member 46 is provided as a portion that biases the rod 22. Also, in the present embodiment, a pair of action point portions 46c are provided at the end of the swinging member 46 on the side opposite to the force point portion 46b side. Also, the provided pair of action point portions 46c are configured to include two-branched projecting portions. The later-described bearings 49 are arranged between the two-branched projecting portions of the pair of action point portions 46c. Also, the action point portions 46c are configured so as to transmit drive force to the rod 22 via the bearings 49.

The bearings 48 and the bearings 49 are attached to the swinging members 46 and are provided so as to be able to rotate relative to the swinging members 46. Also, two bearings 48 are provided for each swinging member 46, and are attached at the pair of force point portions (46b, 46b). A rotation shaft 55 is disposed so as to pass through the three-branched projecting portions that configure the pair of force point portions (46b, 46b). Also, the bearings (48) are attached to the swinging members 46 via the rotation shafts 55 in the state in which the rotation shafts 55 pass through the interior of the force point portions 46b.

Also, the bearings (48, 48) attached to the swinging members 46 are arranged so as to come into contact with the projecting portions 45 of the piston 24. The ends of the two protrusion portions (45a, 45a) of the projecting portions 45 on one side come into contact with the bearings 48 disposed on one of the pair of force point portions (46b, 46b). Also, the ends of the two protrusion portions (45a, 45a) of the projecting portions 45 on the other side come into contact with the bearings 48 disposed on the other one of the pair of force point portions (46b, 46b). The outer wheels of the bearings 48 are biased by the protrusion portions 45a, and the inner wheels are held to the rotation shafts 55. Also, when the outer wheels of the bearings 48 are biased by the protrusion portions 45a, the inner wheels of the bearings 48 undergo relative rotation relative to the outer wheels, and the swinging members 46 swing about the fulcrum portions 46a.

Two bearings 49 are attached to each swinging member 46, and they are attached to the pair of action point portions 46c of each swinging member 46. The rotation shafts 56 are disposed so as to pass through the action point portions 46c. Also, the bearings 49 are attached to the swinging members 46 via the rotation shafts 56 in a state in which the rotation shafts 56 pass through the interior between the two-branched portions of the action point portions 46c.

Also, a pair of contact portions (57, 57) that are formed so as to project as protrusions toward the backward movement direction X2 side, which is the side opposite to the rod body portion 22a side, are provided on the drive transmission portion 22b of the rod 22. The contact portions 57 are provided as portions that come into contact with the bearings 49 attached to the swinging members 46, and are biased due to receiving drive force from the action point portions 46c transmitted via the bearings 49.

Also, the contact portions 57 are each provided so as to correspond to and come into contact with one bearing 49 attached to one of the two swinging members (46, 46) and one bearing 49 attached to the other one. The two bearings (49, 49) to which one contact portion 57 corresponds are arranged at positions that oppose each other on the two swinging members (46, 46). Accordingly, each contact portion 57 is configured so as to be biased from the action point portions 46c of the two swinging members 46 at the same time. Note that the contact portions 57 may be provided as two-branched projecting portions in correspondence with the bearings 49.

When the two swinging members (46, 46) swing due to being biased by the piston 24, the pair of contact portions (57, 57) on the drive transmission portion 22b are biased by the bearings 49 attached to the action point portions 46c of the two swinging members (46, 46). The outer wheels of the bearings 49 bias the contact portions 57, and the inner wheels are held to the rotation shafts 56. Also, when the outer wheels of the bearings 49 bias the contact portions 57, the inner wheels of the bearings 49 undergo relative rotation relative to the outer wheels. Accordingly, a smooth swinging operation is performed about the fulcrum portions 46a of the swinging members 46.

Note that as described above, in the force amplifying mechanism 25, a total of four force point portions 46b and a total of four action point portions are provided for the two swinging members (46, 46).

The support portions 47 are provided as members that rotatably support the swinging members (46, 46), which are provided as levers, at the fulcrum portions 46a. Also, in the present embodiment, a pair of support portions 47 are provided. The pair of support portions (47, 47) are arranged at the two ends of the two swinging members (46, 46) on the inner side of the cylinder bottom portion 20b. Out of the pair of support portions (47, 47), one support portion 47 rotatably holds the fulcrum portions 46a of one of the two swinging members (46, 46). Also, out of the pair of support portions (47, 47), the other support portion 47 rotatably holds the fulcrum portions 46a of the other one of the two swinging members (46, 46).

Also, each of the support portions 47 is provided as a block-shaped member, and includes a first block portion 51 and a second block portion 52 that are configured so as to be divided in the cylinder axial direction. Also, the support portions 47 are configured such that the first block portion 51 and the second block portion 52 are combined in the cylinder axial direction so as to rotatably support one or the other fulcrum portions 46a of the two swinging members (46, 46). Specifically, two holding holes, which are for rotatably holding the fulcrum portions 46a in the state in which the first block portions 51 and the second block portions 52 are combined, are formed in the support portions 47. Also, the two holding holes in each of the support portions 47 rotatably hold a corresponding fulcrum portion 46a via the bearing 50.

The first block portions 51 of the support portions 47 are fixed to the cylinder bottom portion 20b, which is fixed to the end of the cylinder body 20a on the backward movement direction X2 side. On the other hand, the second block portions 52 of the support portions 47 are fixed to the cylinder body 20a on the end side of the cylinder body 20a on the backward movement direction X2 side.

When disposing the force amplifying mechanism 25 inside the cylinder 20, first, the two first block portions (51, 51) are arranged on the inner side of the cylinder bottom portion 20b. Then, the two swinging members (46, 46) with the bearings 48, the bearings 49, and the bearings 50 attached thereto are disposed on the first block portions 51. At this time, the swinging members 46 are disposed on the first block portions 51 such that the bearings 50 attached to the swinging members 46 fit into half-structure portions of the holding holes in the first block portions 51.

Next, the two second block portions (52, 52) are combined with the two first block portions (51, 51). At this time, the second block portions 52 are integrally combined with the first block portions 51 such that the bearings 50 attached to the swinging members 46 fit into half-structure portions of the holding holes in the second block portions 52. Accordingly, the two swinging members (46, 46) are rotatably held to the two support portions (47, 47) at the fulcrum portions 46a.

Then, when the cylinder bottom portion 20b having the force amplifying mechanism 25 disposed thereon is fixed to the end of the cylinder body 20a by the bolt 40, the two support portions (47, 47) of the force amplifying mechanism 25 are fixed between the cylinder body 20a and the cylinder bottom portion 20b. Note that at this time, part of the end faces of the first block portions 51 on the side opposite to the sides that oppose the second block portion 52 side are in contact with the bottom wall on the inner side of the cylinder bottom portion 20b. Also, part of the end faces of the second block portions 52 on the side opposite to the sides that oppose the first block portion 51 side are in contact with the cylinder body 20a. Due to the cylinder body 20a and the cylinder bottom portion 20b being fastened and fixed by the bolt 40 in this state, the first block portions 51 and the second block portions 52 are fixed to the cylinder 20.

Note that the present embodiment illustrates an aspect in which the support portions 47 are fixed to the cylinder bottom portion 20b by bolts (53, 54) as well. Multiple bolts 53 are provided so as to pass through the second block portions 52 and the first block portions 51 and be threadably engaged to the cylinder bottom portion 20b. Multiple bolts 54 are provided so as to pass through the cylinder bottom portion 20b from the outer side of the side of the cylinder bottom portion 20b and be threadably engaged to the first block portions 51 and the second block portions 52.

Note that as previously described, the force amplifying mechanism 25 is configured so as to include the swinging members 46 provided as levers. Also, the distance from the force point portion 46a to the fulcrum portion 46b is set larger than the distance from the fulcrum portion 46a to the action point portion 46c. Accordingly, the force amplifying mechanism 25 is configured so as to be able to amplify the drive force generated by the piston 24 and output it from the rod 22.

Figure 10:
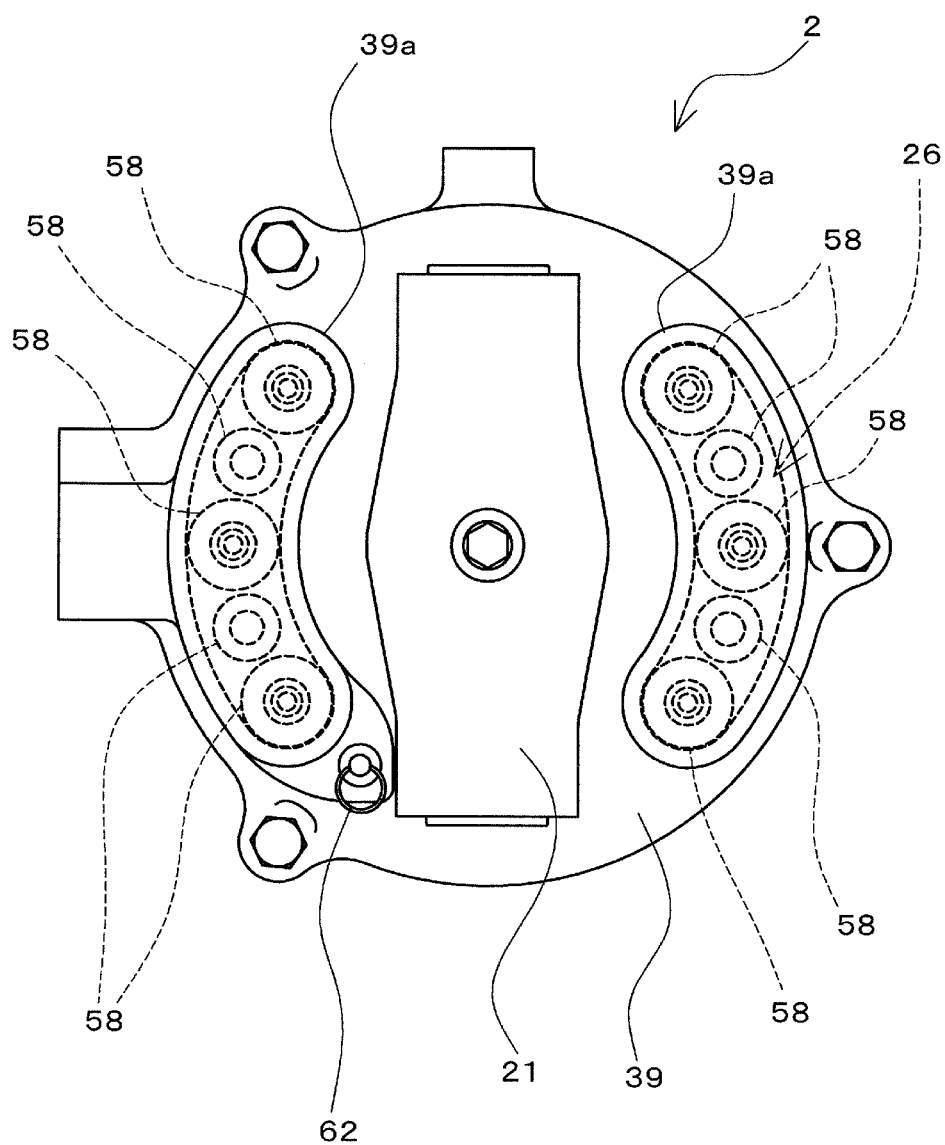
FIG. 10 is a diagram of the brake cylinder device shown in FIG. 3 as seen from the brake output portion side.

FIG. 10 is a diagram showing the brake cylinder device 2 from the brake output portion 21 side. In the brake mechanism used during normal running of the railroad vehicle, braking force is generated due to the piston 24, the force amplifying mechanism 25, the rod 22, and the like operating according to the supply of compressed air to the pressure chamber 43. In contrast, the parking brake mechanism 26 shown in FIGS. 3 to 5 and 10 is provided as a brake mechanism used when parking a railroad vehicle that is equipped with the brake cylinder device 2. Also, the parking brake mechanism 26 is configured so as to include multiple parking brake springs 58, a parking brake piston 59, and the like.

The multiple (10 in the present embodiment) parking brake springs 58 are provided as coil-shaped springs, and half (five) of them are arranged for each of two parking brake spring support portions 39a provided on the cover 39. Note that the present embodiment illustrates an aspect in which among the 10 parking brake springs 58, four of them are provided as small-diameter coil springs, and six of them are provided as large-diameter coil springs.

The two parking brake spring support portions 39a provided with the parking brake springs 58 are provided as portions that are formed so as to extend along the circumferential direction of the cover 39 fixed to the cylinder body 20a and protrude toward the forward movement direction X1 side, and are provided as portions that define the hollow region inside. Also, the multiple parking brake springs 58 are supported inside the parking brake spring support portions 39a. Accordingly, the multiple parking brake springs 58 are arranged so as to be in a line along the circumferential direction of the cylinder body 20a.

Also, inside the parking brake spring support portions 39a, ends of the parking brake springs 58 on the forward movement direction X1 side are in contact with and supported to inner walls of the parking brake spring support portions 39a. On the other hand, the ends of the parking brake springs 58 on the backward movement direction X2 side are in contact with and bias a later-described parking brake piston 59. Also, the multiple parking brake springs 58 are arranged on the parking brake spring support portions 39a of the cover 39, and are arranged outward relative to the cylinder body 20a. Also, the parking brake spring support portions 39a are arranged on the two lateral sides of the brake output portion 21, and are aligned in a direction parallel to the diameter direction of the cylinder body 20a. For this reason, the multiple parking brake springs 59 are also configured so as to be arranged on the two lateral sides of the brake output portion 21, and are also aligned in a direction parallel to the diameter direction of the cylinder body 20.

The parking brake piston 59 is arranged inside the cylinder 20, and is provided so as to come into sliding contact with the inner circumferential face of the cylinder body 20a of the cylinder 20 in an air-tight manner on the forward movement direction X1 side relative to the planar portion 41b, and is axially slidable relative to the cylinder body 20a. The space defined by this parking brake piston 59 and the cylinder body 20a forms a parking brake release pressure chamber 60 inside the cylinder 20. Also, compressed air serving as pressure fluid is supplied to and discharged from the parking brake release pressure chamber 60 via communication passages (not shown). Note that the parking brake release pressure chamber 60 is provided as a chamber for parking brake release unlike the pressure chamber 43, and configures a second pressure chamber in the present embodiment.

Also, the parking brake piston 59 is provided with a disk-like portion 59a and a tubular portion 59b. The disk-like portion 59a is provided as a disk-like member that comes into sliding contact with the inner circumference of the cylinder body 20a in a sealing member fitted to the outer circumference. Also, a through hole is formed in the central portion of the disk-like portion 59a. Also, the tubular portion 59b provided as a cylindrical member is connected to the edge portion of the through hole via a connection member 61 that is shaped as a ring. Specifically, the connection member 61 is provided so as to be able to engage with the inner circumference side of the disk-like portion 59a and the outer circumference side of the tubular portion 59b, and the disk-like portion 59a and the tubular portion 59b are integrally connected via the connection member 61 due to the connection member 61 engaging with the disk-like portion 59a and the tubular portion 59b.

Also, multiple guide shaft holes that are formed so as to pass through the disk-like portion 59a are provided around the through hole in the disk-like portion 59a. The guide shaft holes receive the guide shafts 63 that protrude from the planar portion 41b toward the forward movement direction X1 side (see FIG. 4). Also, in this configuration, the inner circumferences of the guide shaft holes of the disk-like portion 59a come into sliding contact with the outer circumferences of the guide shafts 63.

Also, the tubular portion 59b is arranged such that its outer circumference side comes into sliding contact with the planar portion 41b of the cylinder body 20a via the sealing member fitted to the edge portion of the through hole in the planar portion 41b. Also, the tubular portion 59b is arranged such that the inner circumference side, to which the sealing member is fitted, comes into sliding contact with the outer circumference of the rod 22. Furthermore, the end of the tubular portion 59b on the backward movement direction X2 side is arranged so as to come into contact with the end face of the piston 24 on the forward movement direction X1 side. Accordingly, the parking brake piston 59 is arranged so as to circumferentially surround the axis of the rod 22, is provided so as to be movable along a linear direction that is parallel to the movement direction of the rod 22, and can bias the piston 24 during movement in the backward movement direction X2.

Due to the parking brake mechanism 26 being configured as described above, the parking brake piston 59 is biased in the forward movement direction X1 in resistance to the biasing force of the parking brake springs 58 when compressed air is supplied to the parking brake release pressure chamber 60, and the state in which parking brake braking force is not generated by the parking brake springs 58 (the parking brake released state) is maintained. On the other hand, when compressed air is discharged from the parking brake release pressure chamber 60, the parking brake piston 59 moves in the backward movement direction X2 relative to the cylinder body 20a and biases the piston 24 due to the biasing force of the parking brake springs 58, and braking force serving as a parking brake is generated.

Note that as shown in FIG. 10, a parking brake release operation ring 62 is provided on the cover 39 side of the brake cylinder device 2. The parking brake release operation ring 62 is provided as an operation portion for releasing the parking brake through a manual operation. In the brake cylinder device 2, when this parking brake release operation ring 62 is pulled, a ring mechanism (not shown) is driven, and the connection member 61 shaped as a ring operates so as to expand in diameter in the diameter direction. Accordingly, in the parking brake piston 59, the tubular portion 59b and the connection member 61 are disengaged, and the connection between the disk-like portion 59a and the tubular portion 59b is released.

When the connection between the disk-like portion 59a and the tubular portion 59b is released as described above, biasing force from the rod biasing spring 23 that acts via the rod 22 and the force amplifying mechanism 25 causes the piston 24 to move in the forward movement direction X1, and causes the tubular portion 59b to move in the forward movement direction X1 along with the piston 24, without a change in the position of the disk-like portion 59a biased by the parking brake springs 58. Accordingly, the brake output portion 21 moves in the backward movement direction X2 along with the rod 22, and the parking brake is released. Accordingly, in the brake cylinder device 2, in the state in which the parking brake is operating by the action of the braking force generated by the parking brake springs 58, even if compressed air is not supplied to the parking brake release pressure chamber 60, the parking brake can be released by pulling the parking brake release operation ring 62.

Also, in the disk brake device 1, an end portion 39b of the parking brake spring support portion 39a of the parking brake mechanism 26 is arranged inward, with respect to the vehicle width direction, which is the width direction of the railroad vehicle, relative to the brake lever 15 on the outer side in the vehicle width direction (see FIGS. 1 and 2).

Note that in FIG. 2, an arrow W1 indicates the direction facing outward in the vehicle width direction, and an arrow W2 indicates the direction facing inward in the vehicle width direction. Also, in FIG. 2, out of the pair of brake levers (15, 15), the brake lever 15 on the outer side in the vehicle width direction is indicated as a brake lever 151 (i.e., is indicated by the reference numeral "151" as well). Furthermore, in FIG. 2, a one-dot chain line Q indicates the position where the end portion 39b of the parking brake spring support portion 39a is located, which is the position of a plane parallel to the traveling direction of the railroad vehicle.

As shown in FIG. 2, the brake lever 151 arranged on the outer side in the vehicle width direction has a portion 151b that is located most outward in the vehicle width direction in a swing center portion 151a, and the portion 151b is located outward in the vehicle width direction relative to the above-described plane indicated by the one-dot chain line Q. Specifically, the position of the end portion 39b of the parking brake spring support portion 39a is arranged inward in the vehicle width direction relative to the position of the portion 151b of the brake lever 151 that is most outward in the vehicle width direction in the swing center portion 151a. Accordingly, the position of the outward, with respect to the vehicle width direction, end portion of the parking brake spring 58 accommodated in the parking brake spring support portion 39a is also arranged inward in the vehicle width direction relative to the position of the portion 151b of the brake lever 151 that is most outward in the vehicle width direction in the swing center portion 151a. Note that the swing center portion 151a is configured as a portion of the brake lever 151 where the fulcrum pin 15a, which is the swing center of the swingably disposed brake lever 151, is mounted.

Figure 11:
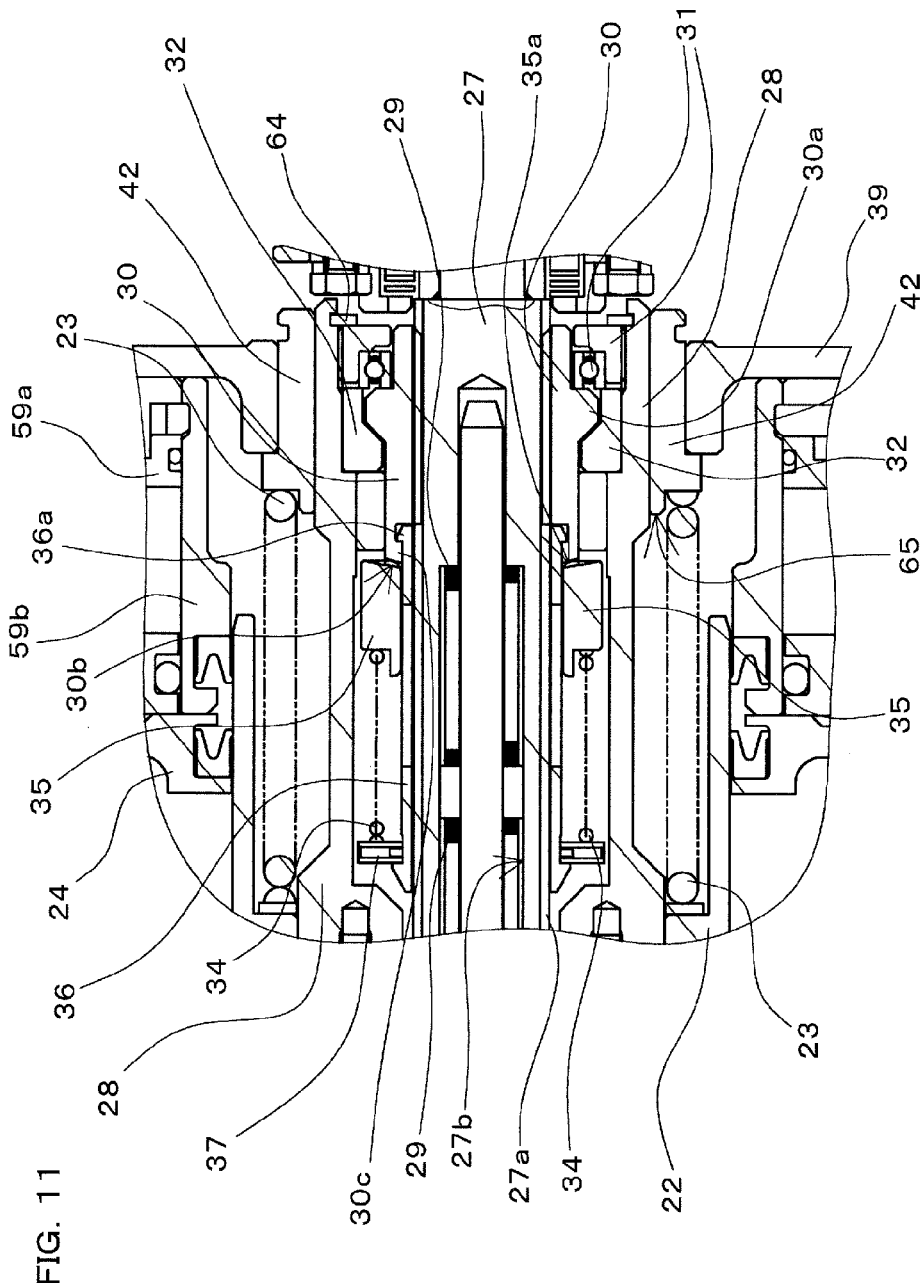
FIG. 11 is an enlarged cross-sectional view showing a part of FIG. 4 in enlargement.
Figure 12:
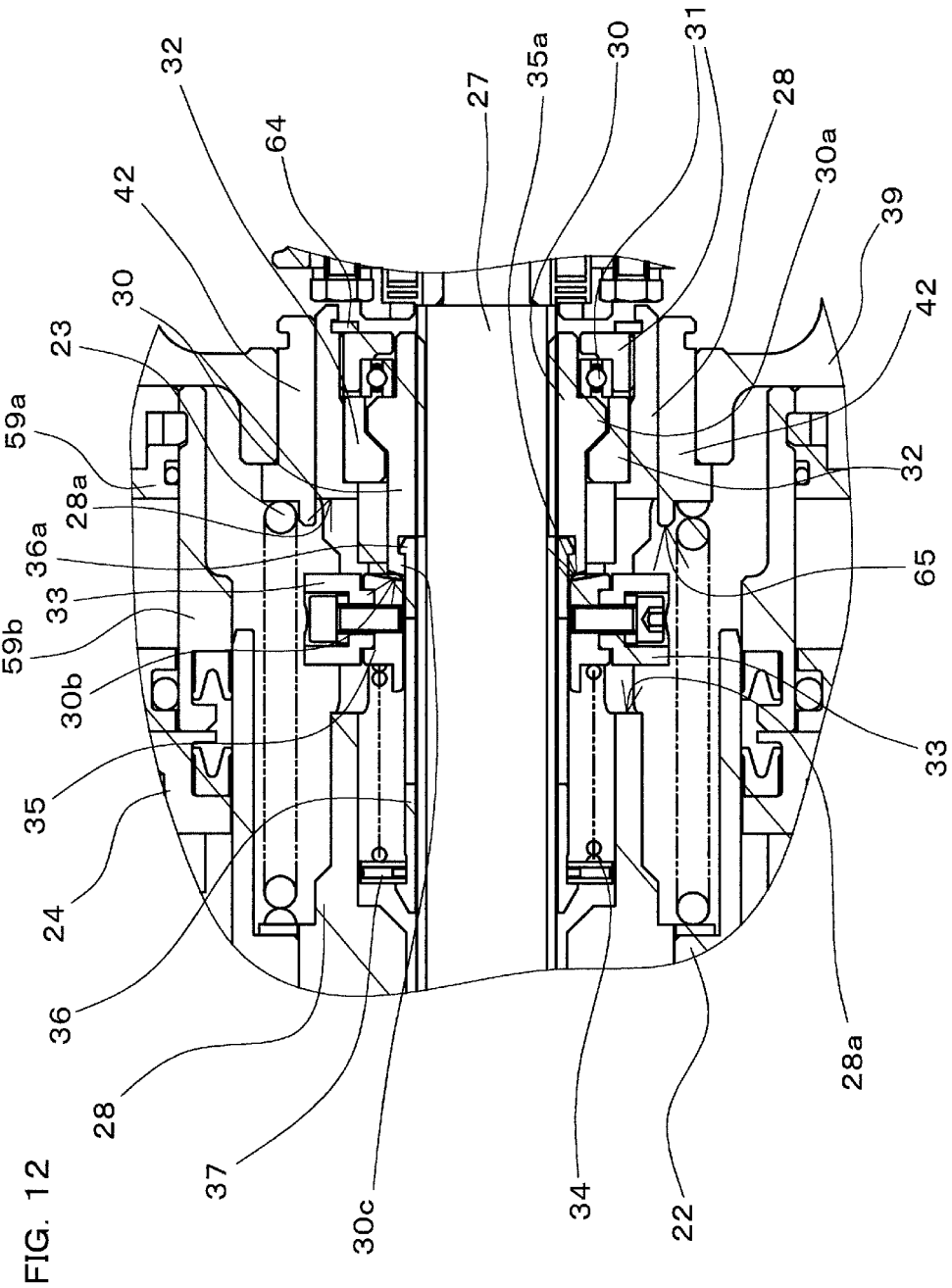
FIG. 12 is an enlarged cross-sectional view showing a part of FIG. 5 in enlargement.

The following describes a clearance adjustment mechanism of the brake cylinder device 2 with reference to FIGS. 4, 5, 11, and 12. Note that FIG. 11 is an enlarged cross-sectional view showing a part of FIG. 4 in enlargement, and shows an enlargement of relevant portions of the clearance adjustment mechanism. FIG. 12 is an enlarged cross-sectional view showing a part of FIG. 5 in enlargement, and shows an enlargement of relevant portions of the clearance adjustment mechanism. In the case where the clearance to the brake operating position in the brake-released state has increased due to wear of the brake pad 13 of the disk brake device 1 or the like, this clearance is automatically adjusted by the clearance adjustment mechanism that is configured so as to include the clutch nut 30, the first clutch 32, the second clutch 35, the threaded shaft 27, the guide tube 28, the pusher spring 29, the front stopper 31, the adjustment stopper 33, the adjustment spring 34, and the like.

The threaded shaft 27 is provided as a shaft-like member connected to the brake output portion 21 and having a thread 27a formed on the outer circumference thereof. Also, the threaded shaft 27 has a hollow interior formed so as to be open toward the side opposite to the brake output portion 21 (in the present embodiment, the force amplifying mechanism 25 side). That is, the interior hollow region of the threaded shaft 27 is provided as an axial bore 27b extending axially and is open only on the side opposite to the brake output portion 21 (backward movement direction X2 side).

The guide tube 28 is formed as a cylindrical member, and is disposed such that the end thereof on the backward movement direction X2 side is fixed and attached to the stepped portion on the inner side of the rod 22 and passes through the tubular support member 42. Also, the threaded shaft 27 is arranged in the interior space region of the guide tube 28. Further, the surrounding wall of the guide tube 28 is provided with, at an intermediate position in the direction of the cylinder axis, a pair of slit apertures (28a, 28a) that are formed therethrough in the form of slits. The pair of slit apertures (28a, 28a) are provided so as to be arranged at positions along the diameter direction of the cylindrical guide tube 28, and are formed as openings through which the adjustment stopper 33, which will be described below, passes from the inside toward the outside.

The pusher spring 29 is provided as a coil-shaped spring, and is disposed in the axial bore 27b of the threaded shaft 27. Note that the axial bore 27b is provided with a stepped portion whose diameter is reduced stepwise toward the inner side (forward movement direction X1 side). Multiple pusher springs 29 are provided as compression springs, and are arranged in a straight line in the axial bore 27b. A cylindrical spring seat member is arranged between adjacent pusher springs 29 that are arranged in a straight line. Also, among the pusher springs 29, the end on the forward movement direction X1 side of the pusher spring 29 arranged the farthest on the forward movement direction X1 side is in contact with the stepped portion of the axial bore 27b. On the other hand, among the pusher springs 29, the end on the backward movement direction X2 side of the pusher spring 29 arranged the farthest on the backward movement direction X2 side is arranged so as to be supported to the cylinder bottom portion 20b via a flange-shaped portion of the end of a later-described pusher spring guide 38 that is fitted to the cylinder bottom portion 20b. Accordingly, the pusher springs 29 are arranged so as to be able to bias the threaded shaft 27 from the inner side in the forward movement direction X1 relative to the cylinder bottom portion 20b, which is a portion fixed to the cylinder body 20a.

The pusher spring guide 38 is formed as a shaft-like portion that is fixed to the cylinder bottom portion 20b due to the flange-shaped portion at the end being fitted to the cylinder bottom portion 20b. Also, the pusher spring guide 38 is arranged so as to project toward the axial bore 27b of the threaded shaft 27, and is inserted inside the pusher springs 29 aligned in a straight line. Thereby, the pusher spring guide 38 is configured to restrict the deformation of the pusher springs 29 in the buckling direction. Further, the pusher spring guide 38 is inserted in a state in which the tip is in sliding contact with the inner (forward movement direction X1 side) bore portion with a reduced diameter of the axial bore 27b of the threaded shaft 27. Thereby, the pusher spring guide 38 is arranged such that the tip is slidable on the inside of the threaded shaft 27.

The clutch nut 30 is provided as a tubular member having an internally threaded portion formed on its inner circumference, and is configured so as to threadably engage with the tip of the threaded shaft 27 disposed on the brake output portion 21 side relative to the cylinder body 20a. Further, on the outer circumference of the clutch nut 30 at an axially intermediate position, a protrusion 30a is provided that is formed so as to extend across the circumferential direction and project radially outward and that is capable of coming into contact with the front stopper 31 and the first clutch 32, which will be described below. Note that due to the provision of the clutch nut 30 as described above, the pusher springs 29 are configured to bias the threaded shaft 27 from inside, thereby biasing the clutch nut 30 threadably engaged with the threaded shaft 27 toward the front stopper 31.

The front stopper 31 is configured so as to include a cylindrical member having an externally threaded portion formed on its outer circumference and having a short axial length, and a bearing integrally fitted inside this cylindrical member. Also, the front stopper 31 is threadably engaged, at its externally threaded portion, with an internally threaded portion formed on the inner circumference of the tip of the guide tube 28 that opposes the brake output portion 21. That is, the front stopper 31 is fixed to the inner circumference of the guide tube 28 by threaded coupling. Note that a circumferentially extending groove is formed on the inner circumference of the tip of the guide tube 28 on the brake output portion 21 side with respect to the front stopper 31. Then, a snap ring 64 for engaging with the end of the front stopper 31 on the brake output portion 21 side is fitted into the groove, thereby preventing withdrawal of the front stopper 31.

Further, the front stopper 31 is arranged outside and concentrically with respect to the end of the clutch nut 30 on the brake output portion 21 side and the threaded shaft 27 (such that the radial center positions coincide). Also, the front stopper 31 is arranged so as to be capable of coming into contact with the protrusion 30a from the front side, which is the brake output portion 21 side with respect to the clutch nut 30, so as to restrict movement of the clutch nut 30 relative to the guide tube 28. Thereby, the front stopper 31 is configured to be able to bias the clutch nut 30 and the threaded shaft 27 threadably engaged with the clutch nut 30 in the backward movement direction X2 together with the movement of the guide tube 28 in the backward movement direction X2.

The first clutch 32 is provided as a cylindrical member having a short axial length, and is formed as an integrated member separate from the front stopper 31. Also, the first clutch 32 is press-fitted inside the guide tube 28 and fixed to the guide tube 28. Note that an end of the first clutch 32 is positioned so as to be in contact with a stepped portion formed on the inner circumference of the guide tube 28. Further, the first clutch 32 is arranged outside and concentrically with respect to the clutch nut 30 and the threaded shaft 27 (such that the radial center positions coincide). Also, the first clutch 32 is arranged so as to be capable of coming into contact with the protrusion 30a of the clutch nut 30 with a predetermined interval from the front stopper 31 from the rear side, which is the side opposite to the brake output portion 21 side with respect to the clutch nut 30.

Two adjustment stoppers 33 are provided as a pair, and are fixed to the second clutch 35, which will be described below, formed as a ring-shaped member or a cylindrical member having a short axial length. Each adjustment stopper 33 is provided as a block-shaped member protruding outward in the diameter direction of the second clutch 35. Also, the pair of adjustment stoppers (33, 33) are fixed to the second clutch 35 so as to be arranged at positions along the diameter direction of the guide tube 28 and the threaded shaft 27. Further, the pair of adjustment stoppers (33, 33) are arranged so as to protrude to pass through a pair of slit portions (28b, 28b) in the guide tube 28.

Note that the end of the tubular support member 42, which is a member that is fixed to the cylinder body 20a via the cover 39, on the backward movement direction X2 side thereof is provided with a stopper stroke restriction portion 65 that is formed as a ring-shaped protrusion portion that extends in the circumferential direction. Also, the adjustment stoppers 33 are arranged such that when they have moved in the forward movement direction X1, their protruding ends can come into contact with the stopper stroke restricting portion 65. By being provided in the above-described manner, the adjustment stoppers 33 are configured such that they are movable relative to the clutch nut 30 and the guide tube 28 along the axial direction of the threaded shaft 27 and that their movable range is restricted with respect to the tubular support member 42, which is a member fixed to the cylinder body 20a.

The second clutch 35 to which the adjustment stoppers 33 are fixed is formed as a ring-shaped member or a cylindrical member having a short axial length, as described above, and is arranged around the threaded shaft 27 and the adjustment sleeve 36, which will be described below, and inside the guide tube 28. Further, the second clutch 35 is arranged so as to be capable of coming into contact, at its end in the forward movement direction X1, with the clutch nut 30 from the rear side, and is in contact, at its end in the backward movement direction X2, with the adjustment spring 34, which will be described below. Also, on an end surface of the second clutch 35 on the forward movement direction X1 side that opposes the clutch nut 30, teeth 35a are formed across the circumferential direction. Meanwhile, on an end surface of the clutch nut 30 on the backward movement direction X2 side that opposes the second clutch 35, teeth 30b are formed across the circumferential direction. The teeth 35a on the second clutch 35 side and the teeth 30b on the clutch nut 30 side are formed as teeth capable of engaging the second clutch 35 and the clutch nut 30.

The adjustment sleeve 36 is provided as a tubular member formed of resin and thus having flexibility, and is arranged around the threaded shaft 27. Also, the adjustment sleeve 36 is provided, on the outer circumference of its end on the forward movement direction X1 side, with an engaging portion 36a formed as an indented portion. Also, the clutch nut 30 is provided, on the inner circumference of its end on the backward movement direction X2 side, with an engaged portion 30c formed as an indented portion that interfits with the indented portion of the engaging portion 36a. The adjustment sleeve 36 and the clutch nut 30 are configured integrally by engagement of the engaging portion 36a on the adjustment sleeve 36 side with the engaged portion 30c on the clutch nut 30 side.

Note that the engaging portion 36a of the adjustment sleeve 36 is provided so as to engage with the engaged portion 30c formed on the inner circumference of the clutch nut 30. Also, the clearance formed between the inner circumference of the adjustment sleeve 36 and the top of the ridge of the thread 27a of the threaded shaft 27 is configured to have a smaller dimension in the diameter direction of the adjustment sleeve 36 than a dimension, in the diameter direction of the adjustment sleeve 36, of the indented portions of the engaging portion 36a and the engaged portion 30c that are fitted together (the length of overlap of the indented portion in the radial direction of the adjustment sleeve 36).

The adjustment spring 34 is provided as a coil-shaped spring arranged around the adjustment sleeve 36. Also, the adjustment spring 34 is arranged so as to be in contact with (or to be connected to), at one end, the end of the second clutch 35 on the backward movement direction X2 side, and to bias, at the other end, a spring receiver 37 that is attached to the end of the adjustment sleeve 36 on the backward movement direction X2 side and has a bearing. Thereby, the adjustment sleeve 36 is configured to be biased in the backward movement direction X2 by a second end of the adjustment spring 34 whose first end is in contact with the second clutch 35. Also, the adjustment spring 34 is configured to be capable of biasing, in the backward movement direction X2, the clutch nut 30 engaged and thus integrated with the adjustment sleeve 36.

Also, the spring receiver 37 is arranged between the outer circumference of the adjustment sleeve 36 and the inner circumference of the guide tube 28, and engages with a flange-shaped projection formed around the outer circumference of the end of the adjustment sleeve 36 on the backward movement direction X2 side, thereby being attached to the adjustment sleeve 36. Also, the spring receiver 37 is arranged such that the clearance formed between the outer circumference of the spring receiver 37 and the inner circumference of the guide tube 28 has a dimension in the diameter direction of the guide tube 28 that is substantially zero. The spring receiver 37 may be arranged such that the outer circumference of the spring receiver 37 and the inner circumference of the guide tube 28 are in sliding contact. Note that since the spring receiver 37 is provided with a bearing, the adjustment sleeve 36 is configured so as to be rotatable relative to the adjustment spring 34.

Operation of Brake Cylinder Device

Next, operations of the brake cylinder device 2 will be described with reference to FIGS. 3 and 13 to 15, which are perspective views of the brake cylinder device 2 and show the internal structure in a cutout cross-section. FIG. 3 is a diagram showing a state that corresponds to the cross-sectional views in FIGS. 4 and 5, which is a state in which compressed air is not being supplied to the pressure chamber 43, and compressed air is supplied to the parking brake release pressure chamber 60. In other words, the brake cylinder device 2 in the state shown in FIG. 3 is in a state in which braking force is not being generated.

Figure 13:
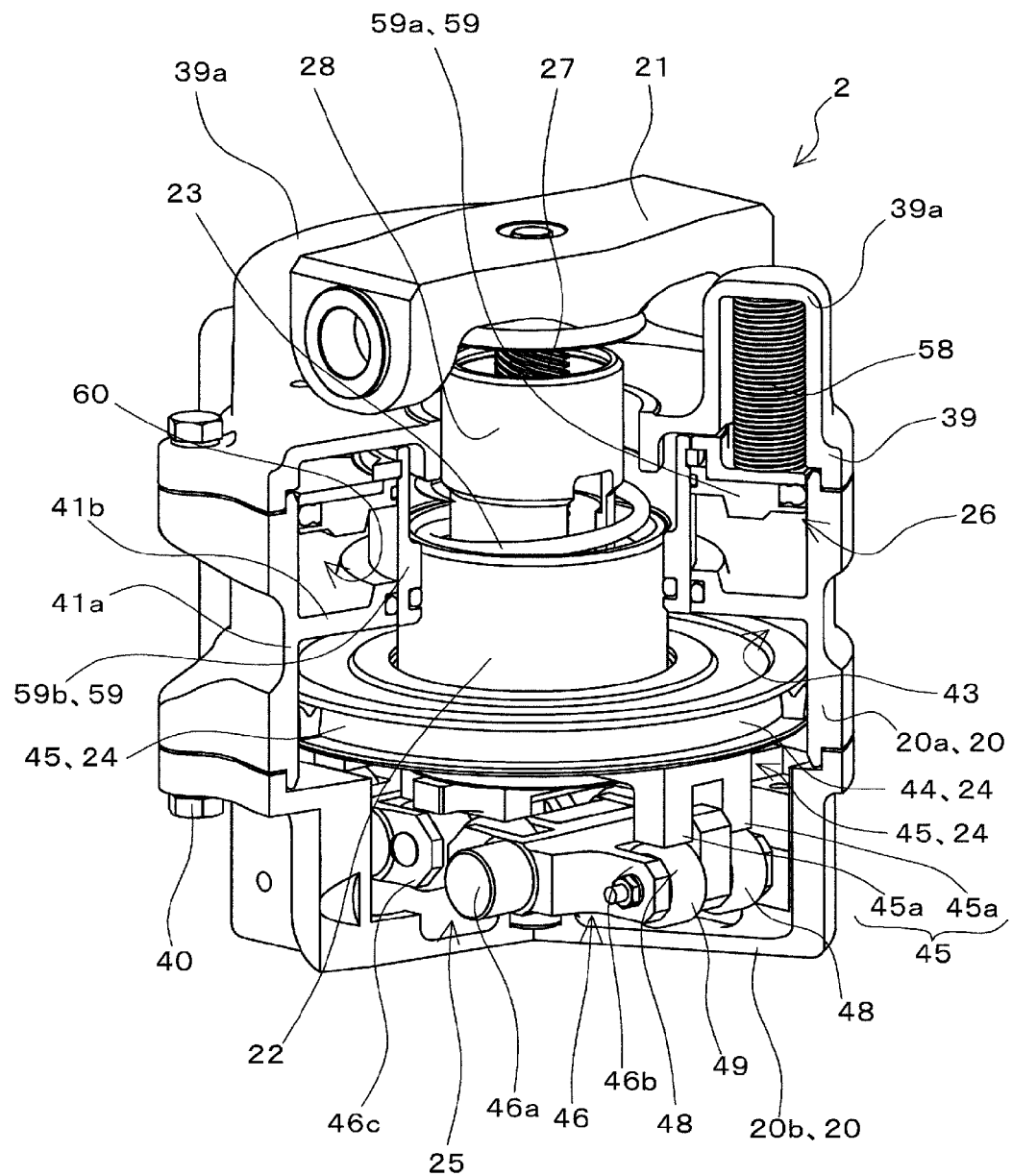
FIG. 13 is a perspective view for describing the operation of the brake cylinder device shown in FIG. 3, and shows the internal structure in a cutout cross-section.
Figure 14:
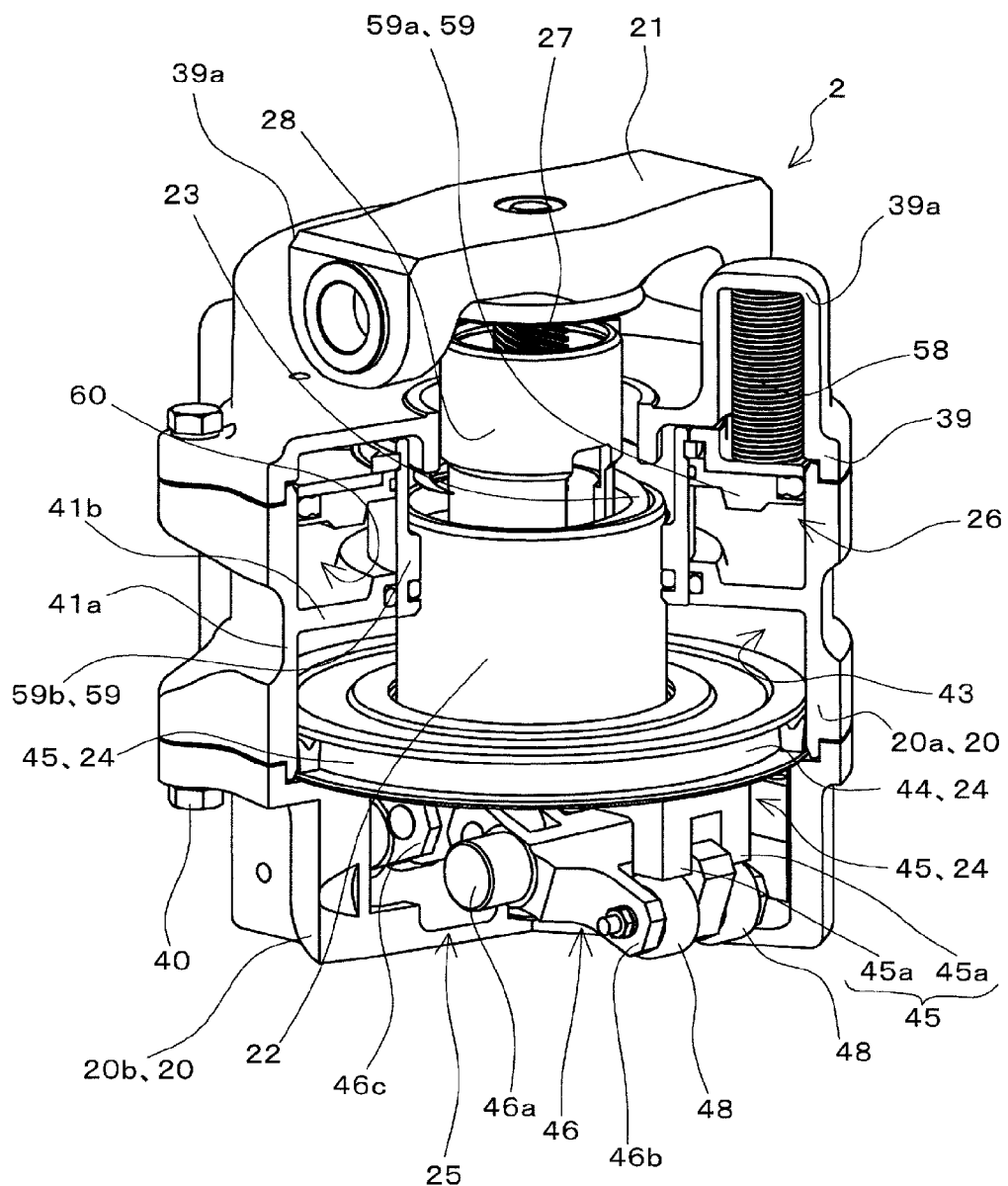
FIG. 14 is a perspective view for describing the operation of the brake cylinder device shown in FIG. 3, and shows the internal structure in a cutout cross-section.

When the supply of compressed air to the pressure chamber 43 starts from the above-described state shown in FIG. 3, there is a shift from the state showing in FIG. 3 to the state shown in FIG. 13, and then ultimately to the state shown in FIG. 14. Note that the state shown in FIG. 13 is a state in which the piston 24 has moved in the backward movement direction X2 through approximately half of all of the steps (full stroke). Also, the state shown in FIG. 14 is a state in which the piston 24 has moved in the backward movement direction X2 through all of the steps, and braking force is being output from the brake output portion 21.

As shown in FIGS. 3, 5, and 13, when compressed air is supplied to the pressure chamber 43, the piston 24 moves in the backward movement direction X2 in resistance to biasing force received from the rod biasing spring 23 via the rod 22 and the force amplifying mechanism 25. Also, the projecting portions 45 of the piston 24 press and bias the bearings 48, which are attached to the force point portions 46b of the swinging members 46 of the force amplifying mechanism 25, in the backward movement direction X2.

Accordingly, the swinging members 46 swing about the fulcrum portions 46a. Also, along with the swinging of the swinging members 46, the bearings 49 attached to the action point portions 46c of the swinging members 46 press and bias the drive transmission portion 22b of the rod 22 in the forward movement direction X1. The rod 22 thus moves in the forward movement direction X1.

Note that when the rod 22 moves in the forward movement direction X1, the guide tube 28 and the first clutch 32 move in the forward movement direction X1 along with the rod 22, and furthermore the clutch nut 30 in contact with the first clutch 32, the threaded shaft 27 threadably engaged with the clutch nut 30, and the brake output portion 21 connected to the threaded shaft 27 also move in the forward movement direction X1. The pair of brake pads (13, 13) press the brake disk 101 and necessary braking force is output until the brake output portion 21 moves a predetermined amount in the forward movement direction X1 along with the rod 22 and the piston 24 moves through all the steps in the backward movement direction X2 and reaches the stopped state shown in FIG. 14.

When the brake is to be released from the brake operating state shown in FIG. 14, operations opposite from those above are performed. Specifically, compressed air is discharged from the pressure chamber 43, the rod 22 starts to move in the backward movement direction X2 due to biasing force from the rod biasing spring 23, the bearing 49 is pressed in the backward movement direction X2 by the drive transmission portion 22b of the rod 22, and the swinging members 46 swing in the direction opposite to that in the braking operation. Accordingly, the bearings 48 press the projecting portions 45 of the piston 24 in the forward movement direction X1, and the piston 24 moves in the forward movement direction X1. Then, when the discharge of compressed air from the pressure chamber 43 is complete, the state returns to the state shown in FIG. 3. Note that when the rod 22 moves in the backward movement direction X2, the guide tube 28 and the front stopper 31 also move in the backward movement direction X2. Also, the clutch nut 30 in contact with the front stopper 31, the threaded shaft 27 threadably engaged with the clutch nut 30, and the brake output portion 21 connected to the threaded shaft 27 also move in the backward movement direction X2.

Figure 15:
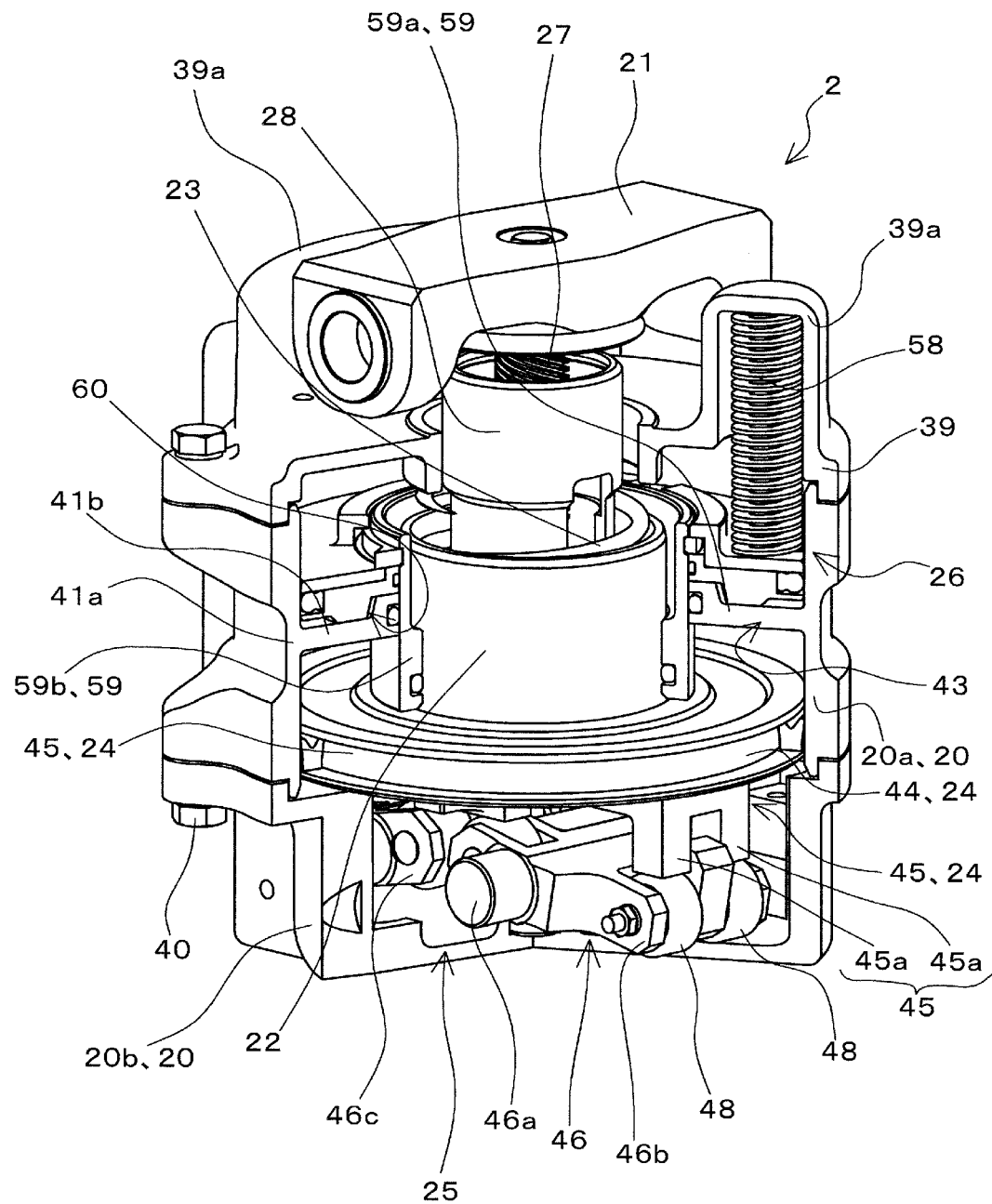
FIG. 15 is a perspective view for describing the operation of the brake cylinder device shown in FIG. 3, and shows the internal structure in a cutout cross-section.

Note that the braking operation and the brake releasing operation described above are operations during normal running, and the state in which compressed air is always supplied to the parking brake release pressure chamber 60 is maintained. In contrast, when the railroad vehicle is parked and the parking brake mechanism 26 is to be used, compressed air is discharged from the parking brake release pressure chamber 60. FIG. 15 shows a state in which the parking brake mechanism 26 operates and braking force is generated as a parking brake.

When compressed air is discharged from the parking brake release pressure chamber 60, the parking brake piston 59 is biased in the backward movement direction X2 by biasing force from the parking brake springs 58. Then, when the parking brake piston 59 moves in the backward movement direction X2, the piston 24 that is biased by the parking brake piston 59 also moves in the backward movement direction X2. When the piston 24 moves in the backward movement direction X2, the rod 22 moves in the forward movement direction X1 via the force amplifying mechanism 25, and the brake output portion 21 also moves in the forward movement direction X1, similarly to the above-described braking operation performed during normal running. Accordingly, braking force serving as a parking brake is generated.

Effects of Present Embodiment

As described above, according to the brake cylinder device 2, the rod 22 and the piston 24 are configured so as to perform a forward movement operation and a backward movement operation in a linear direction along the cylinder axial direction, and the piston 24 is arranged so as to surround the axis of the rod 22. For this reason, it is possible to efficiently use the arrangement space for the piston 24 and the rod 22 inside the cylinder body 20a, and in particular it is possible to significantly reduce the arrangement space for the piston 24 and the rod 22 in the cylinder axial direction. Furthermore, the force amplifying mechanism 25, which amplifies drive force from the piston 24 moving in the backward movement direction X2 via the swinging member 46 and then applies the amplified drive force to the rod 22 so as to move the rod 22 in the forward movement direction X1, can be arranged in the region ensured by the efficient use of the arrangement space for the piston 24 and the rod 22. Also, braking force is output from the brake output portion 21 that moves along with the rod 22 that is subjected to the amplified drive force. In this way, the efficient use of the arrangement space for the piston 24 and the rod 22 makes it possible to suppress an increase in the size of the brake cylinder device 2 and achieve compactness, and also to increase the braking force using the force amplifying mechanism 25.

Accordingly, with the present embodiment, it is possible to provide a small brake cylinder device 2 that can increase braking force output from the brake output portion 21 that moves along with the rod 22, while suppressing an increase in the device size.

Also, with the brake cylinder device 2, bearings (48, 49) are attached to the force point portions 46b and the action point portions 46c of the swinging members 46 provided as levers. This makes it possible to significantly reduce friction sliding resistance that occurs in the portions of the swinging members 46 that are biased by the piston 24 or the portions that bias the rod 22, and to improve the drive efficiency of the device.

Also, with the brake cylinder device 2, multiple swinging members 46 are arranged at symmetrical positions with respect to the central axis line P of the cylinder body 20a. For this reason, in the swinging member 46, the piston 24, the rod 22, and the cylinder 20 including the cylinder body 20a and the cylinder bottom portion 20b, load is distributed and supported so as to be more nearly uniform about the central axis line P of the cylinder body 20a. This makes it possible to efficiently suppress the occurrence of forcible rubbing between members in contact, and makes it possible to improve the drive efficiency of the device.

Also, with the brake cylinder device 2, the number of swinging members 46 that are disposed at symmetrical positions with respect to the central axis line P of the cylinder body 20a can be set to at least two, and it is possible to provide three or more (four in the present embodiment) of both the force point portions 46b and the action point portions 46c. This makes it possible to efficiently suppress the occurrence of forcible rubbing between members in contact, and makes it possible to both further reduce the size of the device structure and further improve the drive efficiency of the device.

Also, with the brake cylinder device 2, the swinging members 46 are held so as to be rotatably sandwiched between the first block portion 51 and the second block portion 52, the first block portion 51 is fixed to the cylinder bottom portion 20b, and the second block portion 52 is fixed to the cylinder body 20a, thus making it possible to very easily assemble the brake cylinder device 2 with the force amplifying mechanism 25 incorporated therein. This makes it possible to significantly reduce the work burden when assembling the brake cylinder device 2.

Also, with the brake cylinder device 2, the parking brake mechanism 26 includes the parking brake springs 58 that generate braking force for a parking brake, the parking brake piston 59 that biases the piston 24 due to being biased by the parking brake springs 58, and the parking brake release pressure chamber 60, and this parking brake mechanism 26 can be incorporated in the brake cylinder device 2. Also, since the parking brake piston 59 that moves parallel with the movement direction of the rod 22 is arranged so as to surround the axis of the rod 22, it is possible to efficiently use the arrangement space for the parking brake piston 59 as well, and in particular it is possible to significantly reduce the arrangement space for the parking brake piston 59 in the cylinder axial direction. Also, according to the present embodiment, even if a large amount of braking force is needed as braking force for the parking brake, the necessary braking force can be easily ensured by the multiple parking brake springs 58. Also, since the parking brake springs 58 are arranged in a line along the circumferential direction of the cylinder body 20a, it is possible to easily arrange the parking brake springs 58 in a compact space while avoiding interference with other portions such as the brake output portion 21. This makes it possible to reduce the dimensions of the brake cylinder device 2 in the axial direction and the diameter direction (i.e., achieve a shorter axis and compactness).

Also, with the brake cylinder device 2, the parking brake springs 58 are arranged outside the cylinder body 20a, thus making it possible to suppress an increase in the size of the cylinder body 20a. Also, since the parking brake springs 58 are arranged in a line along the circumferential direction outside the cylinder body 20a, the parking brake springs 58 can be compactly arranged in the space that is more than necessary outside the cylinder body 20a. This makes it possible to further reduce the size of the brake cylinder device 2. Note that the brake cylinder device 2 of the present embodiment is configured such that during the braking operation, the piston 24 and the parking brake piston 59 move in the backward movement direction X2, and the rod 22 moves in the forward movement direction X1, which is the opposite direction, thus making it possible to more easily realize a configuration in which the parking brake springs 58 are arranged outside the cylinder body 20a.

Also, with the brake cylinder device 2, the parking brake springs 58 are arranged along the diameter direction of the cylinder body 20a on the two lateral sides of the brake output portion 21. This makes it possible to compactly arrange the parking brake springs 58 with efficient use of space while avoiding interference with the brake output portion 21. Also, it is possible to effectively utilize dead space on the sides of the brake output portion 21 and to efficiently arrange the parking brake springs 58 partially along the circumference direction of the cylinder body 20a. This makes it possible to reduce the dimensions of the brake cylinder device 2 in the axial direction and the diameter direction (i.e., further achieve a shorter axis and compactness).

Also, with the brake cylinder device 2, during the braking operation, due to compressed air being supplied to the pressure chamber 43, force from the piston 24 resisting against the biasing force of the rod biasing spring 23 is transmitted via the force amplifying mechanism 25 to the rod 22 to cause it to move, and the brake output portion 21 moves in the forward movement direction X1 via the guide tube 28, the first clutch 32, the clutch nut 30, and the threaded shaft 27, thus outputting braking force. On the other hand, due to compressed air being discharged from the pressure chamber 43, the rod 22 moves in the backward movement direction X2 due to biasing force from the rod biasing spring 23, and the brake output portion 21 moves in the backward movement direction X2 via the guide tube 28, the front stopper 31, the clutch nut 30, and the threaded shaft 27, and thus the brake is released. Also, if the clearance to the brake operating position in the brake-released state has increased due to wear of the brake pad 13 or the like, this clearance is automatically adjusted by the clearance adjustment mechanism that is configured so as to include the clutch nut 30, the first clutch 32, the second clutch 35, the threaded shaft 27, the guide tube 28, the pusher spring 38, the front stopper 31, the adjustment stopper 33, the adjustment spring 34, and the like.

When performing clearance adjustment, first, during the braking operation, the range of movement of the adjustment stopper 33 is restricted such that force for biasing the clutch nut 30 in the backward movement direction X2 is accumulated in the adjustment spring 34 as accumulated force of the adjustment spring 34. Also, at this time, the contact between the clutch nut 30 and the second clutch 35 with the adjustment stopper 33 fixed thereto is canceled, and a clearance is formed between the second clutch 35 and the clutch nut 30. Also, during the brake releasing operation, when the guide tube 28 starts to move in the backward movement direction X2, the threaded shaft 27 and the brake output portion 21 do not move in the backward movement direction X2 due to the threaded shaft 27 being biased in the forward movement direction X1 by the pusher spring 29, and the clutch nut 30 is biased in the backward movement direction X2 by the accumulated force of the adjustment spring 34. At this time, the contact between the clutch nut 30 and the first clutch 32 is canceled, and the clutch nut 30 is not in contact with the front stopper 31, and furthermore the clutch nut 30 is not in contact with the second clutch 35 either, thus making it possible for the clutch nut 30 to rotate relative to the threaded shaft 27. Then, the clutch nut 30 rotates relative to the threaded shaft 27 so as to move in the backward movement direction X2 due to the accumulated force of the adjustment spring 34. Then, the clearance between the clutch nut 30 and the second clutch 35 disappears, the clutch nut 30 and the second clutch 35 are in contact with each other, the clutch nut 30 can no longer rotate, and as the guide tube 28 moves in the backward movement direction X2, the brake output portion 21 moves in the backward movement direction X2 along with the front stopper 31, the clutch nut 30, and the threaded shaft 27, and the brake is released. Thus, the clutch nut 30 moves relative to the threaded shaft 27 in the backward movement direction X2 in the middle of the brake releasing operation, and therefore, the brake releasing operation ends in a state in which the position of the threaded shaft 27 has moved further in the forward movement direction X1 than in the state before the brake releasing operation. That is, a transition is made to a state in which the threaded shaft 27 and the brake output portion 21 have moved to positions projecting with respect to the cylinder body 20a, as compared to the state before the braking operation. Consequently, the clearance up to the brake operating position in the brake-released state is automatically adjusted.

As described above, according to the present embodiment, the clearance adjustment mechanism is configured so as to include the clutch nut 30, the first clutch 32, the second clutch 35, the threaded shaft 27, the guide tube 28, the pusher spring 29, the front stopper 31, the adjustment stopper 33, and the adjustment spring 34. Accordingly, the clearance adjustment is not performed using elastic deformation of rubber or the like as with the brake cylinder device disclosed in Patent Document 2, and it is therefore possible to achieve a configuration that is less likely to be affected by the surrounding environment such as temperature and humidity at low cost.

Accordingly, with the present embodiment, it is possible to provide a brake cylinder device that includes a clearance adjustment mechanism for automatically adjusting a clearance up to a brake operating position in a brake-released state at low cost, wherein the brake cylinder device 2 is small and less likely to be affected by the surrounding environment such as temperature and humidity.

Note that with the brake cylinder device 2 of the present embodiment, in the state in which the automatic clearance adjustment operation by the clearance adjustment mechanism is not performed, the state in which the second clutch 35 and the clutch nut 30 are in contact with each other is maintained regardless of whether it is during the braking operation or when the brake is released, and the contact between the second clutch 35 and the clutch nut 30 is prevented from being released. In other words, in the state in which the clearance adjustment operation is not performed, the clutch nut 30 is biased in the backward movement direction X2 by the adjustment spring 34 in contact at the first end thereof with the second clutch 35, and thereby the state in which the second clutch 35 and the clutch nut 30 are in contact with each other is maintained. Accordingly, the clutch nut 30 is prevented from rotating with respect to the threaded shaft 27 at any time other than during the clearance adjustment operation, and the position of the clutch nut 30 with respect to the threaded shaft 27 is prevented from shifting due to vibration or the like.

Also, according to the present embodiment, it is possible to provide a small disk brake device 1 that can increase braking force while suppressing an increase in the device size.

Also, according to the disk brake device 1, the end of the parking brake spring 58 on the outer side in the vehicle width direction is arranged inward in the vehicle width direction relative to the portion 151b that is the most outward in the vehicle width direction in the swing center portion 151a of the brake lever 151 on the outer side in the vehicle width direction. This makes it possible to reliably prevent the parking brake springs 58 from interfering with the railroad vehicle or other devices disposed in the railroad vehicle.

Second Embodiment

Figure 16:
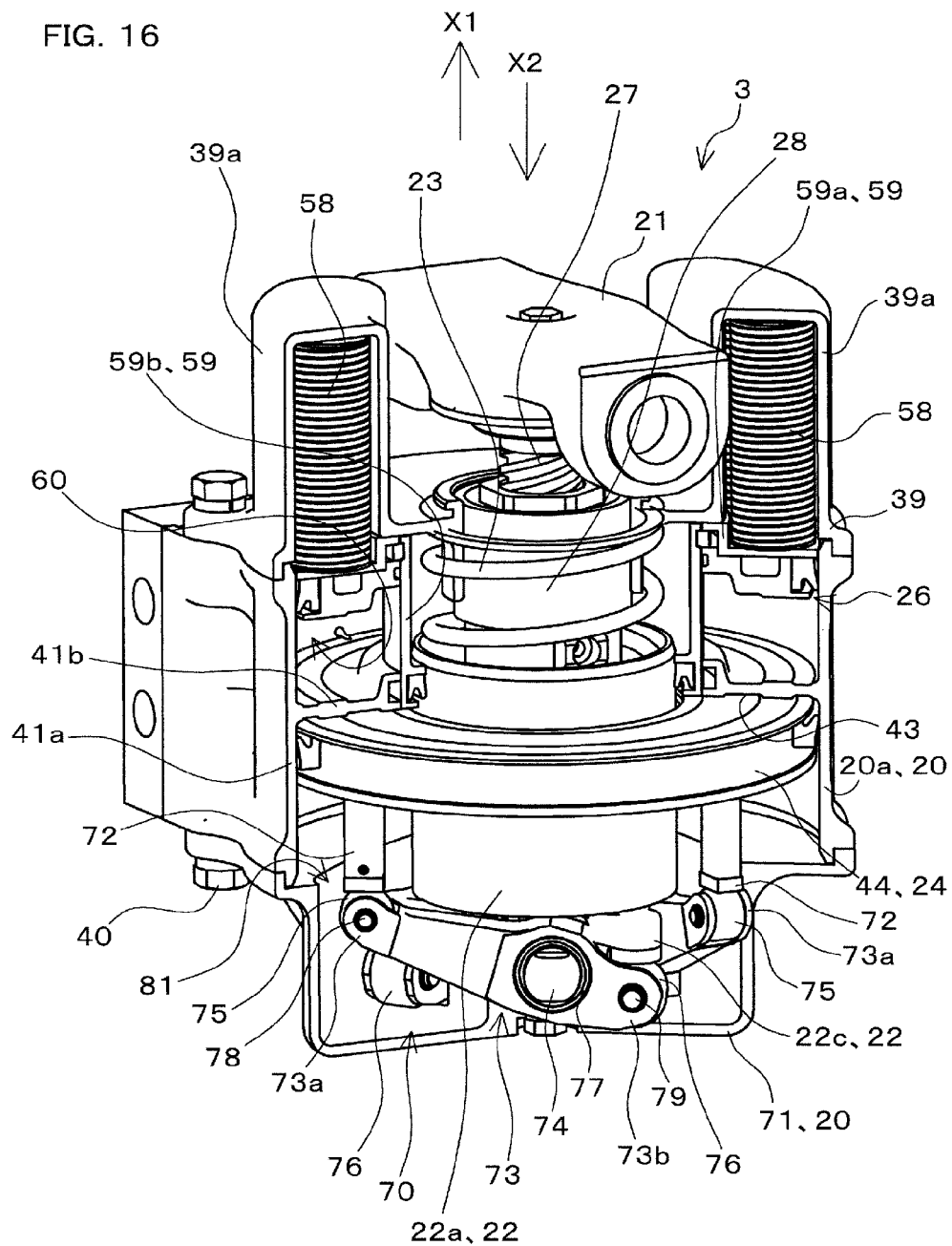
FIG. 16 is a perspective view of the brake cylinder device according to a second embodiment of the present invention, and shows the internal structure in a cutout cross-section.

Next, a second embodiment of the present invention will be described. FIG. 16 is a perspective view of a brake cylinder device 3 according to the second embodiment of the present invention, and shows the internal structure in a cutout cross-section. The disk brake device of the second embodiment of the present invention includes the brake cylinder device 3 shown in FIG. 16, and is configured similarly to the disk brake device 1 of the first embodiment shown in FIGS. 1 and 2. In other words, the disk brake device of the second embodiment is configured so as to include the brake cylinder device 3, the caliper body 11, the pair of back plates (12, 12), and the like.

Note that in the following description of the second embodiment, the elements configured similarly to the first embodiment are denoted by identical reference numerals in the drawings, and the description thereof has been omitted due to using the same reference numerals. The following description of the second embodiment focuses on elements that are different from the brake cylinder 2 of the first embodiment in the brake cylinder device 3.

Configuration of Brake Cylinder Device

The brake cylinder device 3 shown in FIG. 16 is configured similarly to the brake cylinder device 2 of the first embodiment. In other words, opposite ends of the brake cylinder device 3 in the brake operating direction are respectively connected to cylinder support pins 15b. This brake cylinder device 3 is configured so as to include a cylinder 20, a brake output portion 21, a rod 22, a rod biasing spring 23, a piston 24, a force amplifying mechanism 70, a parking brake mechanism 26, a threaded shaft 27, a guide tube 28, a pusher spring 29, a clutch nut 30, a front stopper 31, a first clutch 32, an adjustment stopper 33, an adjustment spring 34, a second clutch 35, an adjustment sleeve 36, a spring receiver 37, a pusher spring guide 38, a cover 39, and so on. Note that the brake cylinder device 3 differs from the brake cylinder device 2 with respect to a portion of the piston 24, a portion of the rod 22, the force amplifying mechanism 70, and a cylinder bottom portion 71 of the cylinder 20. Note that in view of clearly showing the configuration, diagonal hatching has been omitted in the cross-section in FIG. 16 (the same follows for FIGS. 25 and 26 as well).

Figure 17:
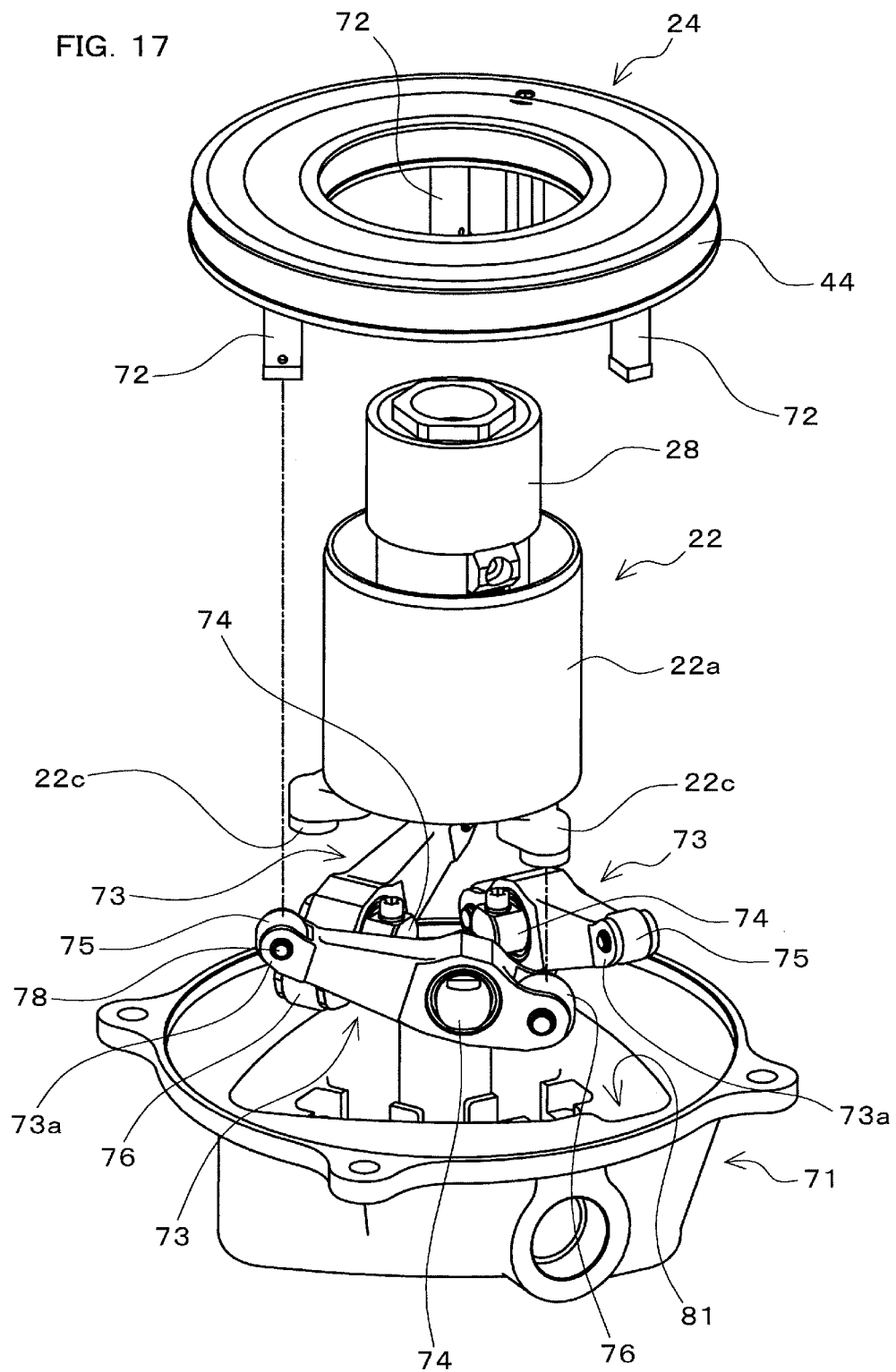
FIG. 17 is an exploded perspective view of a piston, a rod, a guide tube, a force amplifying mechanism, and a cylinder bottom portion in the brake cylinder device shown in FIG. 16.

FIG. 17 is a exploded perspective view showing the piston 24, the rod 22, the guide tube 28, the force amplifying mechanism 70, and the cylinder bottom portion 71. Also, FIG. 18 is an exploded perspective view showing the rod 22, the guide tube 28, the force amplifying mechanism 70, and the cylinder bottom portion 71, and shows a state as seen from a different angle than FIG. 17.

Figure 18:
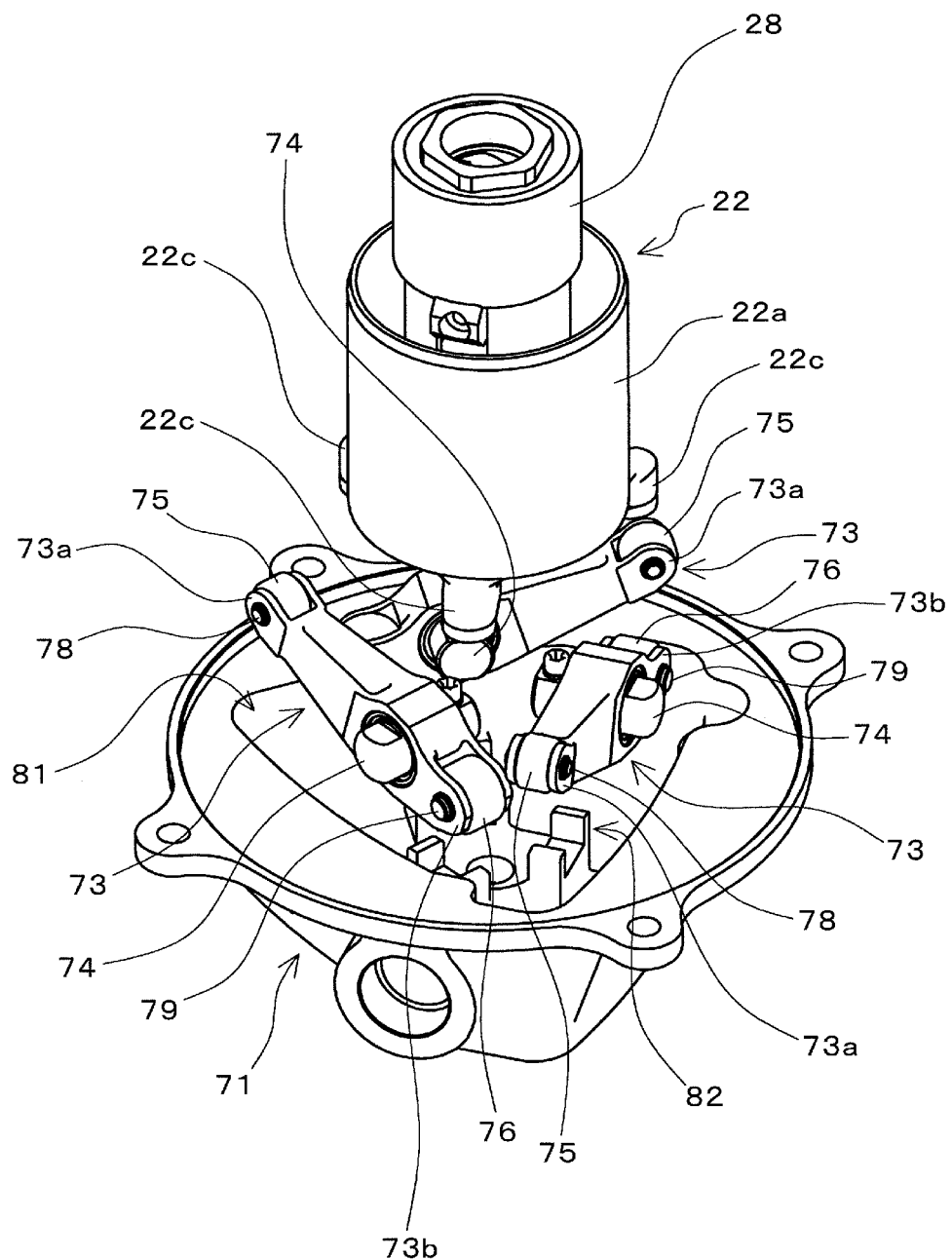
FIG. 18 is an exploded perspective view of the rod, the guide tube, the force amplifying mechanism, and the cylinder bottom portion shown in FIG. 17, and shows a state as seen from a different angle than FIG. 17.

Similarly to the first embodiment, the rod 22 shown in FIGS. 16 to 18 is arranged inside the cylinder body 20a, and is provided so as to be movable in the forward movement direction X1 and the backward movement direction X2. Also, the rod 22 is provided with the rod body portion 22a that is configured similarly to the first embodiment, and the drive transmission portion 22c fixed to the rod body portion 22a. The drive transmission portion 22c is provided in the rod 22 as a portion that is biased due to receiving drive force from the later-described force amplifying mechanism 70. Also, multiple drive transmission portions 22c are provided. Also, the drive transmission portions 22c are fixed to the end of the rod body portion 22a on the backward movement direction X2 side.

Note that the number of drive transmission portions 22c corresponds to the number of swinging members 73 of the later-described force amplifying mechanism 70, which is three in the present embodiment. Also, the drive transmission portions 22c are each provided with a leg-like portion formed so as to protrude toward the backward movement direction X2 side, which is the side opposite to the rod body portion 22a side. The drive transmission portions 22c are provided as portions that come into contact with the bearings 76 attached to the later-described swinging members 73, and are biased due to receiving drive force from action point portions 73b of the swinging members 73 via the bearings 76.

Similarly to the first embodiment, the piston 24 shown in FIGS. 16 to 18 is arranged so as to define the pressure chamber 43 and circumferentially surround the axis of the rod 22 in the cylinder body 20a, and is provided so as to be movable along a linear direction that is parallel to the movement direction of the rod 22. Also, due to compressed air being supplied to the pressure chamber 43, the piston 24 moves in the backward movement direction X2 relative to the cylinder body 20a in resistance to biasing force from the rod biasing spring 23 applied via the later-described force amplifying mechanism 70.

The piston 24 is provided with a disk-like portion 44 configured similarly to the first embodiment, and multiple projecting portions 72. The number of projecting portions 72 corresponds to the number of swinging members 73 of the later-described force amplifying mechanism 70, which is three in the present embodiment. Each projecting portion 72 is formed as a portion that projects from the disk-like portion 44 toward the backward movement direction X2 side, parallel to the cylinder axial direction. Also, the projecting portions 72 are provided on the piston 24 as portions that transmit drive force from the piston 24 to the force amplifying mechanism 70 and bias the swinging members 73.

Various shapes may be selected for the projecting portions 72 that protrude from the disk-like portion 44. For example, it is possible to implement projecting portions 72 that protrude in various shapes such as protrusions, blocks, or columns. The present embodiment illustrates an aspect in which the projecting portions 72, which come into contact with the bearings 75 attached to the force point portions 73a of the later-described swinging members 73, protrude in the shape of columns from the disk-like portion 44 toward the backward movement direction X2 parallel with the cylinder axial direction.

Figure 19:
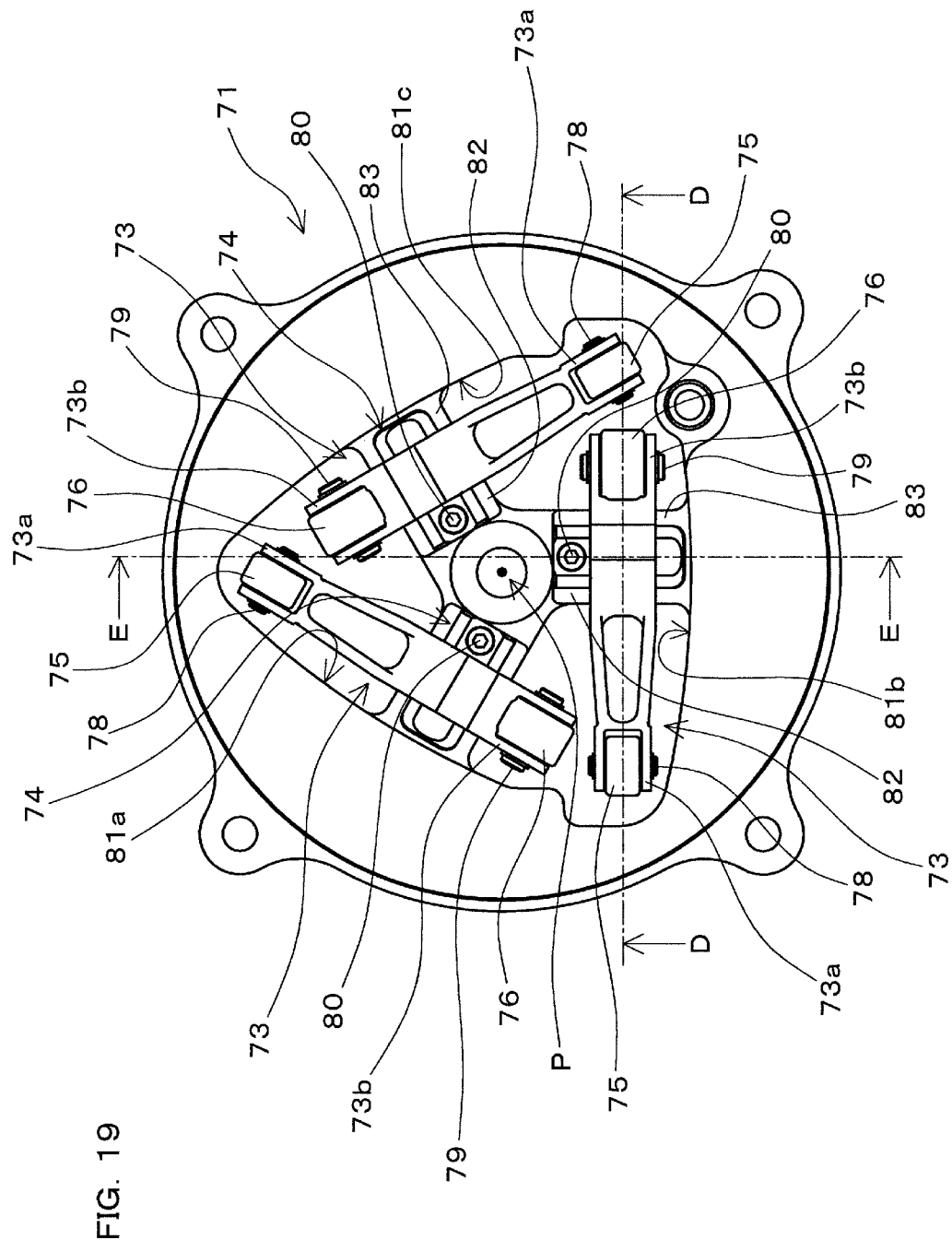
FIG. 19 is a diagram showing the cylinder bottom portion and the force amplifying mechanism in the brake cylinder device shown in FIG. 16.

FIG. 19 is a diagram showing the force amplifying mechanism 70 and the cylinder bottom portion 71 of the cylinder 20.

Figure 20:
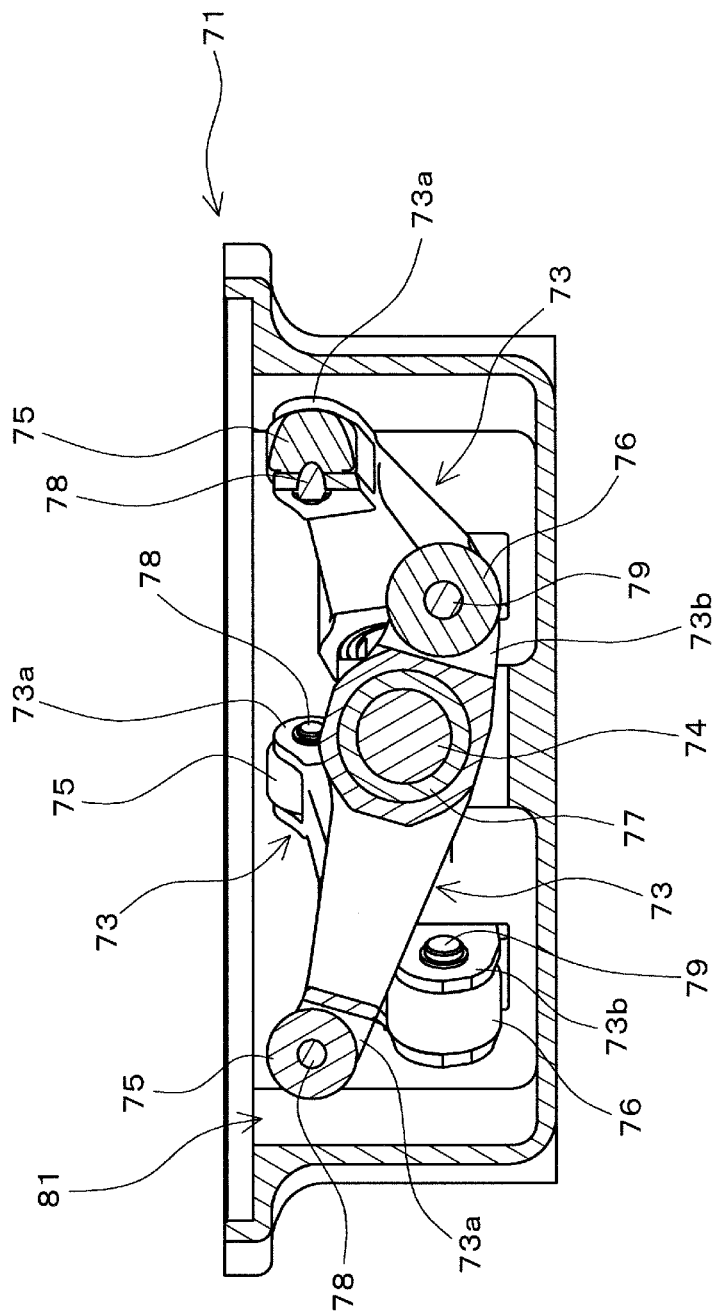
FIG. 20 is a cross-sectional view as seen from the positions of the arrows along line D-D in FIG. 19.
Figure 21:
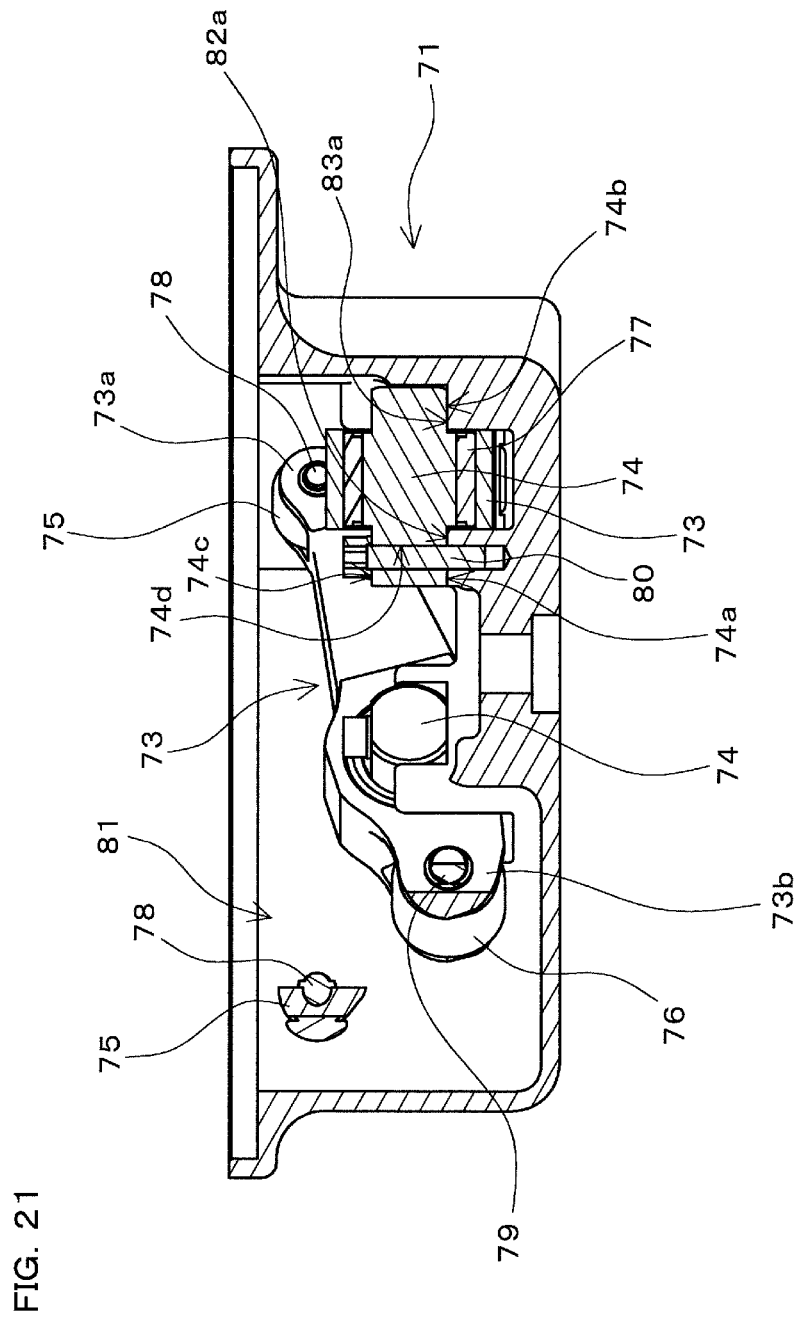
FIG. 21 is a cross-sectional view as seen from the positions of the arrows along line E-E in FIG. 19.

Note that FIG. 19 is a diagram showing the force amplifying mechanism 70 and the cylinder bottom portion 71 from the cylinder axial direction. FIG. 20 is a cross-sectional view as seen from the positions of the arrows along line D-D in FIG. 19. FIG. 21 is a cross-sectional view as seen from the positions of the arrows along line E-E in FIG. 19. The force amplifying mechanism 70 shown in FIGS. 16 to 21 is provided as a mechanism that, when the piston 24 moves in the backward movement direction X2, moves the rod 22 in the forward movement direction X1, and amplifies the drive force from the piston 24 and applies it to the rod 22. Also, the force amplifying mechanism 70 is configured so as to include the swinging members 73, fulcrum shaft members 74, bearings 75, bearings 76, bushes 77, and the like.

The swinging members 73 are provided as members that swing due to being biased by the piston 24 moving in the backward movement direction X2, and move the rod 22 by biasing it in the forward movement direction X1. Due to the provision of these swinging members 73, the force amplifying mechanism 70 is configured so as to convert drive force in a linear direction generated by the piston 24 into drive force in a linear direction in the parallel opposite direction.

Multiple swinging members 73 are disposed, and three of them are disposed in the present embodiment. The three swinging members 73 are disposed on the inner side of the cylinder bottom portion 71 that is fixed to the end of the cylinder body 20a on the backward movement direction X2 side.

Furthermore, the three swinging members 73 are disposed at rotationally symmetrical positions centered about the central axis line P of the cylinder body 20a. In the present embodiment, the three swinging members 73 are disposed at rotationally symmetrical positions that are threefold symmetrical. In other words, the three swinging members 73 are disposed with angular intervals of 120° in the circumferential direction centered about the central axis line P. Note that similarly to the first embodiment, the central axis line P is configured as a line that passes through the central position of the cylinder body 20a in the diameter direction. In FIG. 19, the position of the central axis line P is indicated by the point P illustrated with a small black circle.

Figure 22:
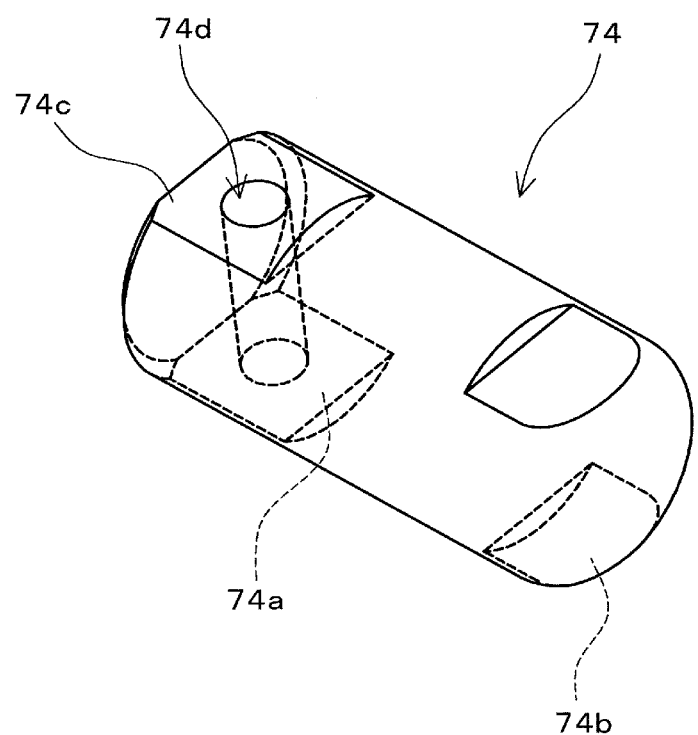
FIG. 22 is a perspective view of a fulcrum shaft member in the force amplifying mechanism shown in FIG. 19.

FIG. 22 is a perspective view of one fulcrum shaft member 74. Three fulcrum shaft members 74 are provided in correspondence with the swinging members 73. Each fulcrum shaft member 74 is formed as a circular columnar member, and flat faces for support to the cylinder bottom portion 71 are formed on side faces at the two ends. Also, the three fulcrum shaft members 74 are disposed with angular intervals of 120° in the circumferential direction centered about the central axis line P on the inner side of the cylinder bottom portion 71. Furthermore, the three fulcrum shaft members 74 are disposed on the inner side of the cylinder bottom portion 71 such that their lengthwise direction extending along the circular column shape extends along radial directions centered about the central axis line P.

Also, the fulcrum shaft members 74 configure fulcrum shafts of the swinging members 73 provided as levers, and are provided as members that swingably support the swinging members 73. Also, the swinging members 73 are attached so as to be able to rotate relative to the fulcrum shaft members 74.

Specifically, through holes are formed in the swinging members 73 in intermediate portions in the lengthwise direction, and bushes 77, which are cylindrical sliding members, are fitted into the through holes. Also, the fulcrum shaft members 74 are shaped as circular columns having flat faces in portions of the side faces, and are inserted into through holes on the inner sides of the bushes 77. The fulcrum shaft members 74 are inserted into the bushes 77 in a state in which the outer circumference of the fulcrum shaft members 74 can slide at least in the circumferential direction relative to the inner circumference of the bushes 77. Accordingly, the swinging members 73 are attached so as to be rotatable relative to the fulcrum shaft members 74, and are supported so as to be able to rotate about the fulcrum shaft members 74.

Also, the swinging members 73 are formed such that the width dimension is the greatest in the portion attached to the fulcrum shaft members 74, and are formed so as to have a portion in which the width dimension gradually decreases toward the two end portions in the lengthwise direction. Also, the swinging members 73 are provided with force point portions 73a at one end in the lengthwise direction, and action point portions 73b at the other end in the lengthwise direction. In other words, the swinging members 73 are provided with a force point portion 73a, a fulcrum shaft member 74, and an action point portion 73b that are arranged in a line in the stated order along the lengthwise direction.

Also, the swinging members 73 are formed such that their lengthwise direction extends in a straight line. Also, the swinging members 73 are disposed on the cylinder bottom portion 71 such that their lengthwise direction extends along the direction perpendicular to the fulcrum shaft members 74 that extend in radial directions centered about the position of the central axis line P. Furthermore, in the swinging members 73, the distance from the fulcrum shaft member 74 to the force point portion 73a is set larger than the distance from the fulcrum shaft member 74 to the action point portion 73b. For this reason, with respect to the radial direction centered about the position of the central axis line P, the action point portion 73b is arranged farther inward in the radial direction than the force point portion 73a is.

The force point portion 73a of each swinging member 73 is provided as a portion that is biased by the piston 24. Also, the force point portion 73a is configured to include two-branched projecting portions. A bearing 75 is arranged between the pair of projecting portions of the force point portion 73a. The force point portion 73a is configured so as to receive drive force from the piston 24 transmitted via the bearing 75.

The action point portion 73b of each swinging member 73 is provided as a portion that biases the rod 22. The action point portion 73b is provided on the end of the swinging member 73 that is opposite to the force point portion 73a side. Also, the action point portion 73b is configured to include a pair of projecting portions that project in two branches. The bearing 76 is arranged between the pair of projecting portions of the action point portion 73b. Also, the action point portion 73b is configured so as to transmit drive force to the rod 22 via the bearing 76.

The bearings 75 and the bearings 76 are attached to the swinging members 73 and are provided so as to be able to rotate relative to the swinging members 73. Also, the bearings 75 are attached to the swinging members 73 in the force point portions 73a. Rotation shafts 78 are disposed so as to pass through the pair of projecting portions of the force point portions 73a. Also, the bearings 75 are attached to the swinging members 73 via the rotation shafts 78 such that the rotation shafts 78 are inserted inside the force point portions 73a.

Also, the bearings 75 attached to the swinging members 73 are arranged so as to come into contact with the projecting portions 72 of the piston 24. Specifically, the ends of the projecting portions 72 on the tip side protruding from the disk-like portion 44 come into contact with the bearings 75 disposed at the force point portions 73a. The outer wheels of the bearings 75 are biased by the projecting portions 72, and the inner wheels are held to the rotation shafts 78. Then, when the outer wheels of the bearings 75 are biased by the projecting portions 72, the inner wheels of the bearings 75 undergo relative rotation relative to the outer wheels, and the swinging members 73 swing about the fulcrum shaft members 74. Note that the structure of the bearing 75 is illustrated schematically in the cross-sectional view of the bearing 75 in FIGS. 20 and 21, and the outer wheel and the inner wheel are not illustrated.

Also, the bearings 76 are attached to the swinging members 73 in the action point portions 73b. Rotation shafts 79 are disposed so as to pass through the pair of projecting portions of the action point portions 73b. Also, the bearings 76 are attached to the swinging members 73 via the rotation shafts 79 such that the rotation shafts 79 are inserted inside the action point portions 73b.

Also, the bearings 76 attached to the swinging members 73 are arranged so as to come into contact with the drive transmission portions 22c of the rod 22. Specifically, the ends of the drive transmission portions 22c on the tip side protruding from the rod body portion 22a come into contact with the bearings 76 disposed in the action point portions 73b. The outer wheels of the bearings 76 are biased by the drive transmission portions 22c, and the inner wheels are held to the rotation shafts 79. Note that the structure of the bearing 76 is illustrated schematically in the cross-sectional view of the bearing 76 in FIG. 20, and the outer wheel and the inner wheel are not illustrated.

When the swinging members 73 swing due to being biased by the piston 24, the drive transmission portions 22c are biased by the bearings 76 attached to the action point portions 73b of the swinging members 73. The outer wheels of the bearings 76 bias the drive transmission portions 22c, and the inner wheels are held to the rotation shafts 79. Also, when the outer wheels of the bearings 76 bias the drive transmission portions 22c, the inner wheels of the bearings 76 undergo relative rotation relative to the outer wheels. Accordingly, the swinging members 73 perform a smooth swinging operation about the fulcrum shaft members 74.

Note that the above-described force amplifying mechanism 70 is configured so as to include the swinging members 73 provided as levers. Also, the distance from the force point portion 73a to the fulcrum shaft member 74 is set larger than the distance from the fulcrum shaft member 74 to the action point portion 73b. Accordingly, the force amplifying mechanism 70 is configured so as to be able to amplify the drive force generated by the piston 24 and output it from the rod 22.

Next, the fulcrum shaft members 74 and the cylinder bottom portion 71 will be described in further detail. The two ends of the fulcrum shaft member 74 shown in FIGS. 16 to 22 are supported to the cylinder bottom portion 71 that is fixed to the end of the cylinder body 20a on the backward movement direction X2 side. Also, a supported face 74a, which is a flat face for being supported to the cylinder bottom portion 71, is formed on the side face of one end of the fulcrum shaft member 74 (see FIGS. 21 and 22). The supported face 74a is formed so as to extend parallel to the lengthwise direction of the fulcrum shaft member 74.

Also, a supported face 74b, which is a flat face for being supported to the cylinder bottom portion 71, is formed on the side face of the other end of the fulcrum shaft member 74 (see FIGS. 21 and 22). The supported face 74b is formed so as to extend parallel to the lengthwise direction of the fulcrum shaft member 74. Also, the supported face 74b and the supported face 74a are arranged in the same virtual plane that extends parallel to the lengthwise direction of the fulcrum shaft member 74. In other words, in this configuration, the virtual plane in which the supported face 74b is arranged in the same plane as the virtual plane in which the supported face 74a is arranged.

Also, a bolt contact face 74c is formed on the one end of the fulcrum shaft member 74 in addition to the supported face 74a. The bolt contact face 74c is formed in a portion of the side face of the fulcrum shaft member 74 that is, with respect to the direction perpendicular to the lengthwise direction of the fulcrum shaft member 74, on the side opposite to the portion where the supported face 74a is formed. The bolt contact face 74c and the supported face 74a are formed so as to extend parallel to each other. This bolt contact face 74c is configured as a face that comes into contact with the bolt head portion of a fixing bolt 80 for fixing the fulcrum shaft member 74 to the cylinder bottom portion 71 (see FIGS. 19, 21 and 22).

Also, a bolt insertion hole 74d is formed in the other one of the fulcrum shaft member 74. The bolt insertion hole 74d is provided as a hole for insertion of the fixing bolt 80. Also, the bolt insertion hole 74d is formed as a hole that passes through the fulcrum shaft member 74 from the bolt contact face 74c to the supported face 74a. Furthermore, the bolt insertion hole 74d is formed so as to extend along a direction perpendicular to the bolt contact face 74c and the supported face 74a, that is to say a direction perpendicular to the lengthwise direction of the fulcrum shaft member 74 (see FIG. 22).

Figure 23:
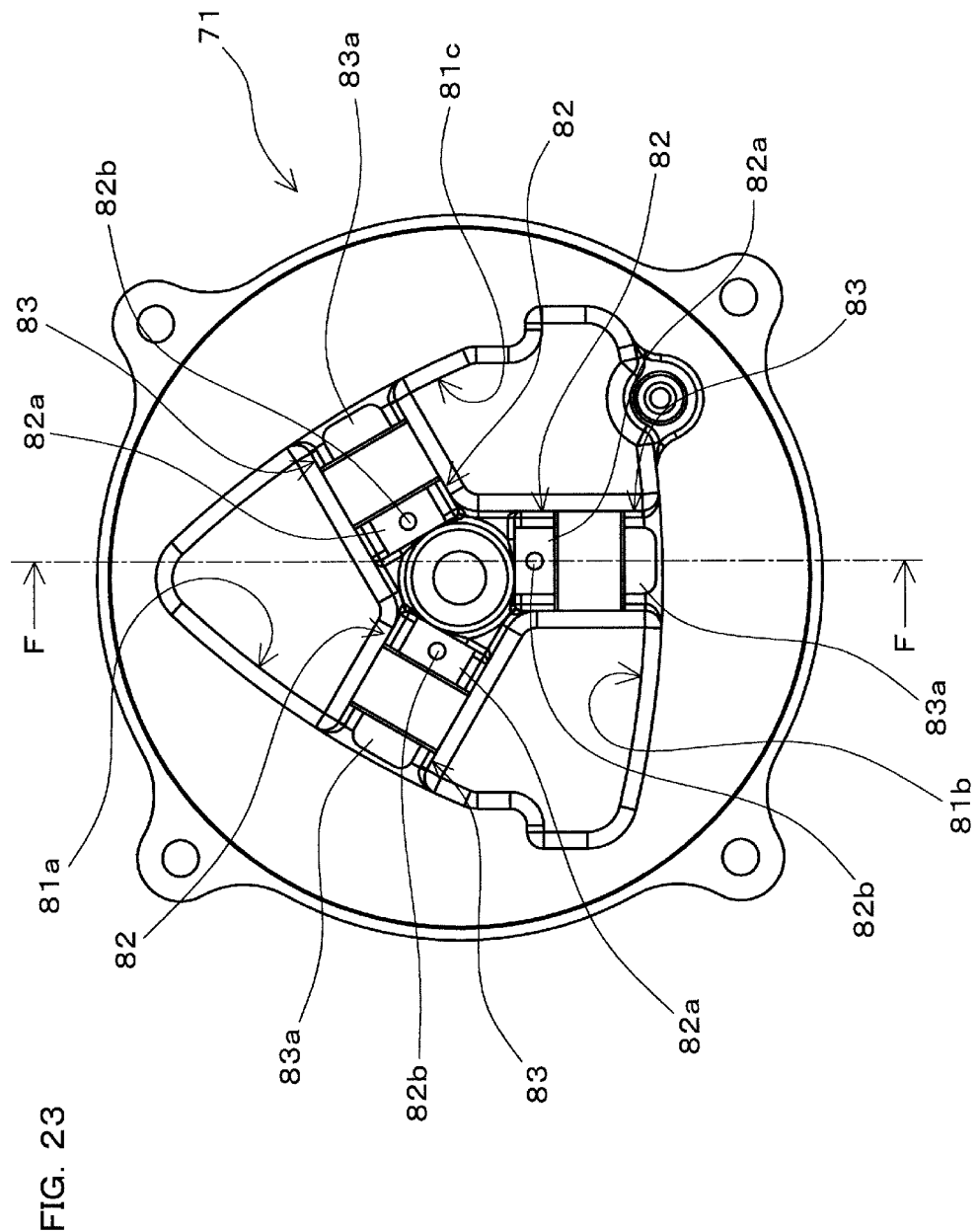
FIG. 23 is a diagram showing the cylinder bottom portion shown in FIG. 19.
Figure 24:
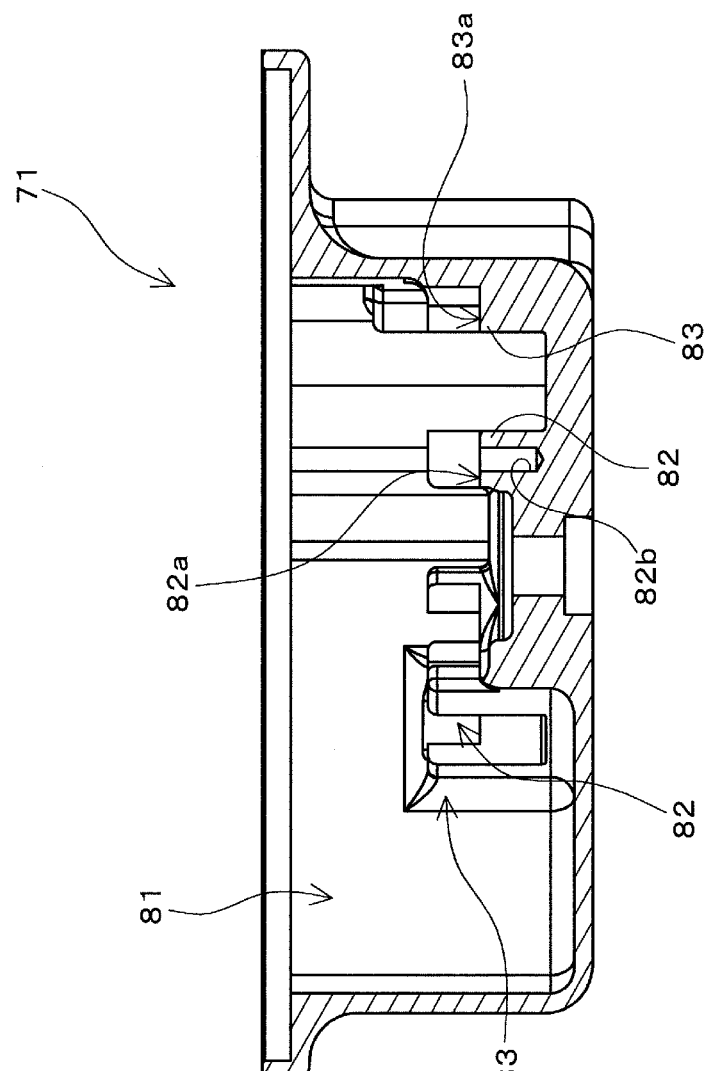
FIG. 24 is a cross-sectional view as seen from the positions of the arrows along line F-F in FIG. 23.

FIG. 23 is a diagram showing only the cylinder bottom portion 71. FIG. 23 is a diagram showing the cylinder bottom portion 71 from the cylinder axial direction. Also, FIG. 24 is a cross-sectional view as seen from the positions of the arrows along line F-F in FIG. 23. The cylinder bottom portion 71 shown in FIGS. 16 to 21, 23, and 24 is formed such that one end is open, and the other end has a bottom so as to have a cavity-like space inside. This cylinder bottom portion 71 is fixed to the end of the cylinder body 20a on the backward movement direction X2 side. Note that the open-side end of the cylinder bottom portion 71 is fixed to the end of the cylinder body 20a using multiple bolts 40. Also, in the present embodiment, the end of the cylinder bottom portion 71 of the cylinder 20 is connected to one of the brake levers 15 by a cylinder support pin 15b.

Also, a recessed region 81 serving as a cavity-like space is provided on the inner side of the cylinder bottom portion 71. The recessed region 81 is provided as a region surrounded by an inner wall having three inner wall faces (81a, 81b, 81c) formed so as to respectively extend in a curved manner or linearly along three sides of a triangle in a cross-section perpendicular to the cylinder axial direction. The three inner wall faces (81a, 81b, 81c) are arranged such that their central positions are at angular intervals of 120° in the circumferential direction centered about the position of the central axis line P. Also, the three inner wall faces (81a, 81b, 81c) are formed so as to extend along a direction perpendicular to the radial direction centered about the position of the central axis line P, and extend in a curved manner along an arc with a curvature radius according to which they bulge slightly outward in the radial direction.

Note that although the present embodiment illustrates an aspect in which the inner wall faces (81a, 81b, 81c) are formed so as to extend in a curved manner along the three sides of a triangle in a cross-section perpendicular to the cylinder axial direction, this need not be the case. For example, an aspect may be implemented in which the inner wall faces (81a, 81b, 81c) are formed so as to extend in linearly along the three sides of a triangle in a cross-section perpendicular to the cylinder axial direction.

Also, the cylinder bottom portion 71 is configured such that the three fulcrum shaft members 74 are supported inside the recessed region 81. Specifically, the cylinder bottom portion 71 is provided with three central support portions 82 and three outer circumferential support portions 83 as portions for supporting the three fulcrum shaft members 74. In this configuration, the combination of one central support portion 82 and one outer circumferential support portion 83 supports one fulcrum shaft member 74. The respective combinations of one central support portion 82 and one outer circumferential support portion 83 are disposed with angular intervals of 120° in the circumferential direction centered about the position of the central axis line P on the inner side of the cylinder bottom portion 71.

The central support portions 82 are each configured as a portion provided so as to rise up on the central side toward the cylinder body 20a on the inner side of the cylinder bottom portion 71. On the other hand, the outer circumferential support portions 83 are each configured as a portion provided so as to rise up on the outer circumferential side toward the cylinder body 20a on the inner side of the cylinder bottom portion 71. In other words, with respect to the radial direction centered about the position of the central axis line P on the inner side of the cylinder bottom portion 71, the central support portions 82 are arranged on the central side, and the outer circumferential support portions 83 are arranged on the outer side.

Also, ends of the fulcrum shaft members 74 on one side are supported to the central support portions 82, and ends of the fulcrum shaft members 74 on the other side are supported to the outer circumferential support portions 83. Also, the combinations of one central support portion 82 and one outer circumferential support portion 83 are respectively arranged on the three inner wall faces (81a, 81b, 81c).

The three inner wall faces (81a, 81b, 81c) and the central side support portions 82 and the outer circumferential support portions 83, which support the fulcrum shaft members 74 that swingably support the swinging members 73, are arranged as described above. Accordingly, the three swinging members 73 are arranged so as to respectively extend along the three inner wall faces (81a, 18b, 81c) inside the recessed region 81.

The central support portions 82 and the outer circumferential support portions 83 will be described in more detail below. A flat support face 82a that extends in a direction perpendicular to the direction of the central axis line P is formed on each of the central support portions 82 (see FIGS. 21, 23, and 24). The support face 82a is provided as a face that comes into contact with the supported face 74a provided on the one end of the fulcrum shaft member 74.

Also, the central support portion 82 is provided with a pair of support wall portions that extend so as to protrude toward the cylinder body 20a side perpendicular to the support face 82a on the two sides of the support face 82a. One end of the fulcrum shaft member 74 is fitted into the groove-like region surrounded by the pair of support wall portions and the support face 82a. Furthermore, a threaded hole 82b that is open at the support face 82a is provided in the central support portion 82. The threaded hole 82b is provided as a threaded hole that is provided with a internally threaded portion that is threadably engaged to the externally threaded portion at the tip of the fixing bolt 80.

When the fulcrum shaft member 74 is to be attached to the central support portion 82, first one end of the fulcrum shaft member 74 is fitted in between the pair of support wall portions of the central support portion 82. Then the supported face 74a on the one end of the fulcrum shaft member 74 is supported due to coming into contact with the support face 82a of the central support portion 82.

In the above-described state, the fixing bolt 80 is attached to the central support portion 82 so as to pass through the bolt insertion hole 74d in the fulcrum shaft member 74 and be threadably engaged with the threaded hole 82d in the central support portion 82. Then the bolt head portion of the fixing bolt 80 comes into contact with the bolt contact face 74c of the fulcrum shaft member 74, and the fulcrum shaft member 74 is fixed by being fastened to the central support portion 82 by the fixing bolt 80.

Also, a flat support face 83a that extends in a direction perpendicular to the direction of the central axis line P is formed on each of the outer circumferential support portions 83 (see FIGS. 21, 23, and 24). The support face 83a is provided as a face that comes into contact with the supported face 74b provided on the other end of the fulcrum shaft member 74.

Also, the outer circumferential support portion 83 is provided with a pair of support wall portions that extend so as to protrude toward the cylinder body 20a side perpendicular to the support face 83a on the two sides of the support face 83a. The other end of the fulcrum shaft member 74 is fitted into the groove-like region surrounded by the pair of support wall portions and the support face 83a.

When the fulcrum shaft member 74 is to be attached to the outer circumferential support portion 83, first the other end of the fulcrum shaft member 74 is fitted in between the pair of support wall portions of the central support portion 83. Then the supported face 74b on the other end of the fulcrum shaft member 74 is supported due to coming into contact with the support face 83a of the outer circumferential support portion 83.

Also, the fulcrum shaft member 74 is fitted into the groove-shaped regions of the central support portions 82 and the outer circumferential support portions 83 at substantially the same timing, for example. In other words, when the one end of the fulcrum shaft member 74 is fitted into the central support portion 82, the other end of the fulcrum shaft member 74 is also fitted into the outer circumferential support portion 83.

Note that although the present embodiment describes the example of an aspect in which only one end of the fulcrum shaft member 74 is fixed to the cylinder bottom portion 71 by the fixing bolt 80, and both ends of the fulcrum shaft member 74 are supported to the cylinder bottom portion 71, this need not be the case. An aspect may be implemented in which only the other end of the fulcrum shaft member 74 is fixed to the cylinder bottom portion 71 by the fixing bolt 80, and both ends of the fulcrum shaft member 74 are supported to the cylinder bottom portion 71. Also, an aspect may be implemented in which both of the ends of the fulcrum shaft member 74 are fixed to the cylinder bottom portion 71 by the fixing bolt 80, and both ends of the fulcrum shaft member 74 are supported to the cylinder bottom portion 71.

Operation of Brake Cylinder Device

Next, operations of the brake cylinder device 3 will be described with reference to FIGS. 16, 25, 26, and the like, which are perspective views of the brake cylinder device 3 and show the internal structure in a cutout cross-section. FIG. 16 shows a state in which compressed air is not supplied to the pressure chamber 43, and compressed air is supplied to the parking brake release pressure chamber 60. In other words, the brake cylinder device 3 in the state shown in FIG. 16 is in a state in which braking force is not being generated.

Figure 25:
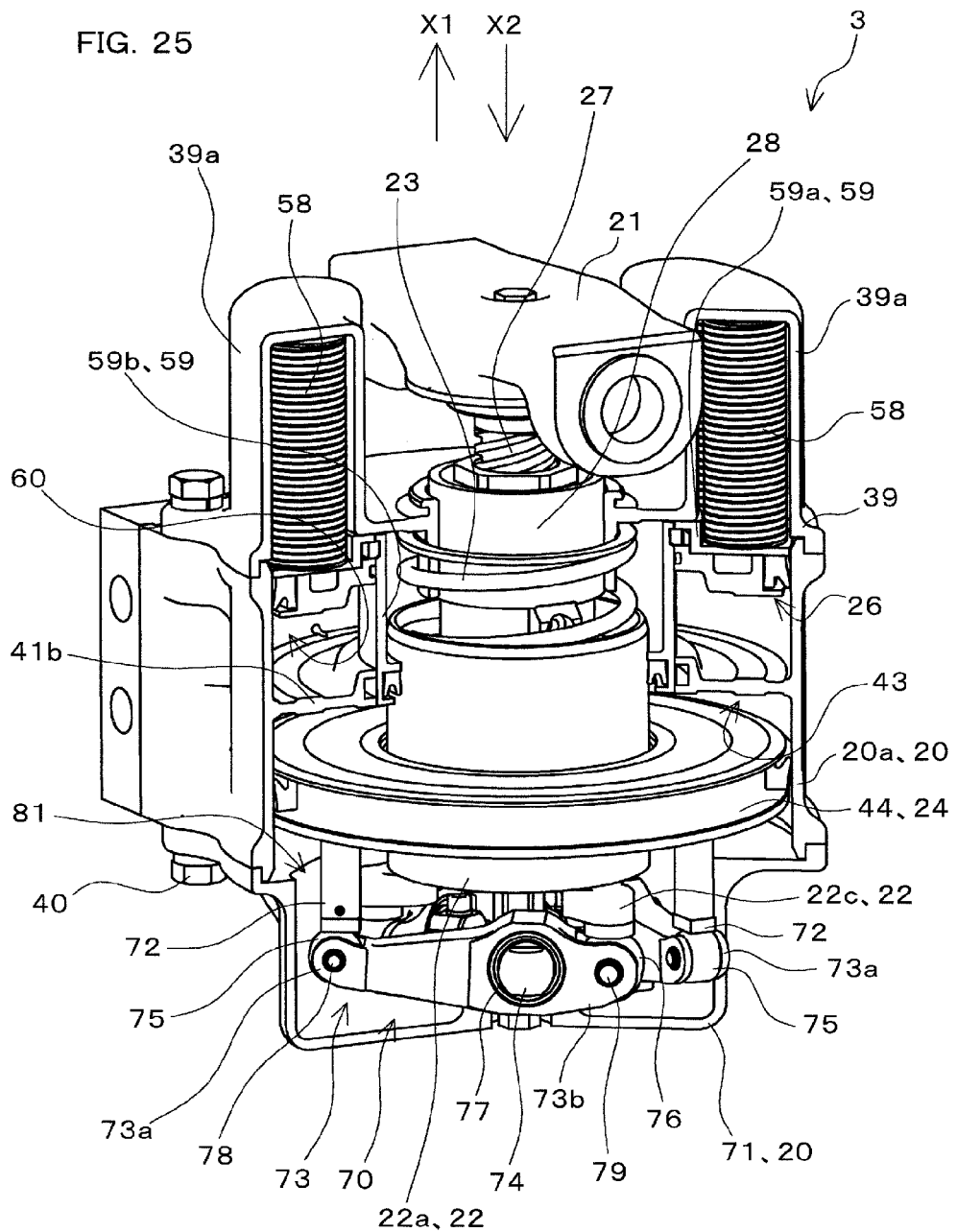
FIG. 25 is a perspective view for describing the operation of the brake cylinder device shown in FIG. 16, and shows the internal structure in a cutout cross-section.
Figure 26:
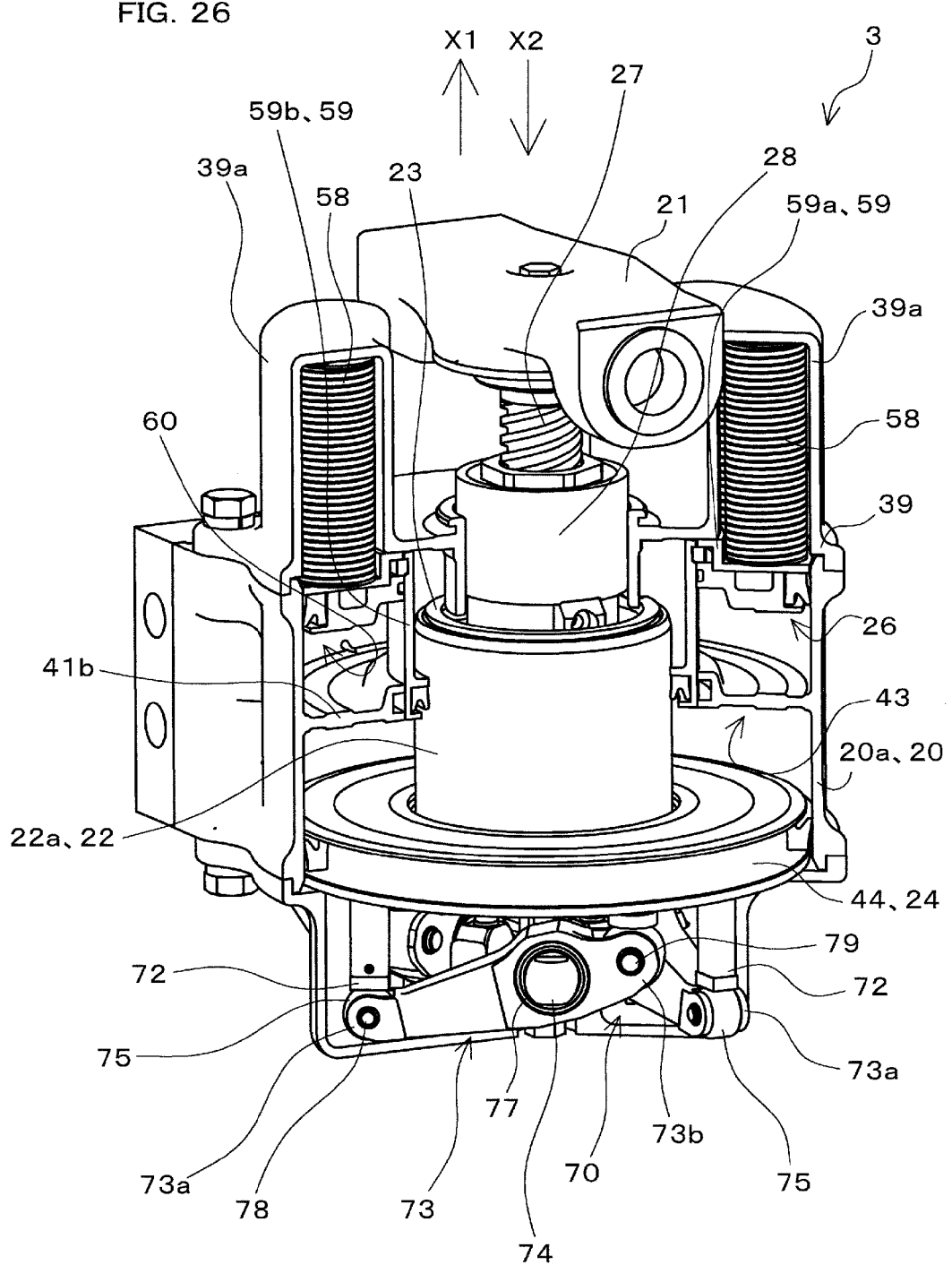
FIG. 26 is a perspective view for describing the operation of the brake cylinder device shown in FIG. 16, and shows the internal structure in a cutout cross-section.

When the supply of compressed air to the pressure chamber 43 starts from the above-described state shown in FIG. 16, there is a shift from the state showing in FIG. 16 to the state shown in FIG. 25, and then ultimately to the state shown in FIG. 26. Note that the state shown in FIG. 25 is a state in which the piston 24 has moved in the backward movement direction X2 through approximately half of all of the steps (full stroke). Also, the state shown in FIG. 26 is a state in which the piston 24 has moved in the backward movement direction X2 through all of the steps, and braking force is being output from the brake output portion 21. Note that unlike FIGS. 16 and 25, FIG. 26 shows a cutout cross-section of the rod biasing spring 23.

As shown in FIG. 16, when compressed air is supplied to the pressure chamber 43, the piston 24 moves in the backward movement direction X2 in resistance to biasing force received from the rod biasing spring 23 via the rod 22 and the force amplifying mechanism 70. Also, the projecting portions 72 of the piston 24 press and bias the bearings 75, which are attached to the force point portions 73a of the swinging members 73 of the force amplifying mechanism 70, in the backward movement direction X2.

Accordingly, the swinging members 73 swing about the fulcrum shaft members 74. Also, along with the swinging of the swinging members 73, the bearings 76 attached to the action point portions 73b of the swinging members 73 press and bias the drive transmission portion 22c of the rod 22 in the forward movement direction X1. The rod 22 thus moves in the forward movement direction X1.

Note that when the rod 22 moves in the forward movement direction X1, drive force is transmitted similarly to the brake cylinder device 2 of the first embodiment, and the brake output portion 21 connected to the threaded shaft 27 also moves in the forward movement direction X1. The pair of brake pads (13, 13) press the brake disk 101 and necessary braking force is output until the brake output portion 21 moves a predetermined amount in the forward movement direction X1 along with the rod 22 and the piston 24 moves through all the steps in the backward movement direction X2 and reaches the stopped state shown in FIG. 26.

When the brake is to be released from the brake operating state shown in FIG. 26, operations opposite from those above are performed. Specifically, compressed air is discharged from the pressure chamber 43, and the rod 22 starts to move in the backward movement direction X2 due to biasing force from the rod biasing spring 23. Then the bearing 76 is pressed in the backward movement direction X2 by the drive transmission portion 22c of the rod 22, and the swinging members 73 swing in the direction opposite to that in the braking operation. Accordingly, the bearings 75 press the projecting portions 72 of the piston 24 in the forward movement direction X1, and the piston 24 moves in the forward movement direction X1. Then, when the discharge of compressed air from the pressure chamber 43 is complete, the state returns to the state shown in FIG. 16. When the rod 22 moves in the backward movement direction X2, similarly to the brake cylinder device 2 of the first embodiment, the brake output portion 21 connected to the threaded shaft 27 also moves in the backward movement direction X2.

Note that the braking operation and the brake releasing operation described above are operations during normal running, and the state in which compressed air is always supplied to the parking brake release pressure chamber 60 is maintained. The operations in the case where the railroad vehicle is parked and the parking brake mechanism 26 is used are similar to the first embodiment, and a description will not be given for them.

Effects of Present Embodiment

Effects similar to those of the first embodiment can be obtained by the present embodiment described above. In other words, with the present embodiment, it is possible to provide a small brake cylinder device 3 that can increase braking force output from the brake output portion 21 that moves along with the rod 22, while suppressing an increase in the device size. Also, according to the present embodiment, it is possible to provide a small disk brake device that can increase braking force while suppressing an increase in the device size.

Also, with the brake cylinder device 3, multiple swinging members 73 are disposed at rotationally symmetrical positions centered about the central axis line P of the cylinder body 20a. For this reason, in the swinging member 73, the piston 24, the rod 22, and the cylinder 20 including the cylinder body 20a, load is distributed and supported so as to be more nearly uniform about the central axis line P of the cylinder body 20a. This makes it possible to efficiently suppress the occurrence of forcible rubbing between members in contact, and makes it possible to improve the drive efficiency of the device.

Also, with the brake cylinder device 3, multiple swinging members 73 are disposed at rotationally symmetrical positions centered about the central axis line P of the cylinder body 20a, thus making it possible to stably support load with a three-point support structure that corresponds to a truss structure. Furthermore, since it is possible to stably support load with a three-point support structure that corresponds to a truss structure, the number of swinging members 73 that are necessary can be minimized. This makes it possible to efficiently suppress the occurrence of forcible rubbing between members in contact, and makes it possible to reduce the manufacturing cost by reducing the number of swinging members 73 that are provided. This also makes it possible to both further reduce the size of the device structure and further improve the drive efficiency of the device.

Also, with the brake cylinder device 3, the three inner wall faces (81a, 81b, 81c) that define the recessed region 81 of the cylinder bottom portion 71 are formed so as to extend along three sides in a triangular shape. Also, the swinging members 73 are disposed so as to extend along the inner wall faces (81a, 81b, 81c). This makes it possible to reduce the size of the structure of the cylinder bottom portion 71 for accommodating the three swinging members 73 that are to be disposed rotationally symmetrically, reduce the amount of material necessary for manufacturing the cylinder bottom portion 71, and reduce the manufacturing cost.

Also, according to the brake cylinder device 3, the two ends of the fulcrum shaft member 74 to which the swinging member 73 is rotatably attached are supported to portions rising up on the central side and outer circumferential side of the inner side of the cylinder bottom portion 71 (central support portion 82, outer circumferential support portion 83). Accordingly, the swinging members 73 are disposed on the inner side of the cylinder bottom portion 71 in a state of being stably supported at both ends so as to be swingable. Accordingly, with the present embodiment, it is possible to very easily assemble the brake cylinder device 3 with the force amplifying mechanism 70 incorporated therein. This makes it possible to significantly reduce the work burden when assembling the brake cylinder device 3. Also, since the fulcrum shaft member 74 to which the swinging members 73 are rotatably attached is configured so as to be fixed to the cylinder bottom portion 71, the number of parts of the force amplifying mechanism 70 can be reduced, and the manufacturing cost can be reduced.

Although embodiments of the present invention have been described thus far, the present invention is not limited to the above-described embodiment, and various modifications may be made within the scope recited in the claims. For example, the following modifications are possible.

(1) Although the above embodiments have been described taking the example of a configuration in which compressed air is used as the pressure fluid for operating the brake cylinder device, the present invention is not limited thereto, and the brake cylinder device may be operated with other pressure fluids (e.g., pressure oil).

(2) Although the above embodiments have been described taking the example of an aspect in which bearings are attached to the swinging members, this need not be the case. An aspect may be implemented in which the swinging members come into contact with the piston or the rod without the intervention of bearings. Also, the bearings need only be attached to the swinging members at least either a force point portion or an action point portion. In other words, there is no limitation to an aspect in which the bearings are attached to both the force point portions and the action point portions of the swinging member, and an aspect may be implemented in which the bearing are attached to only either the force point portions or the action point portions of the swinging members.

(3) Although the above embodiments have been described taking the example of an aspect in which two or three swinging members are provided, this need not be the case. Aspects may be implemented in which one swinging member is provided, or four or more swinging members are provided.

(4) Although the first embodiment has been described taking the example of an aspect in which four force point portions and action point portions are provided in the two swinging members, this need not be the case. An aspect may be implemented in which the two swinging members are provided with a total of three or five or more force point portions. Also, an aspect may be implemented in which the two swinging members are provided with a total of three or five or more action point portions.

(5) Although the above embodiments have been described taking the example of an aspect in which the range of movement of the adjustment stopper with respect to members fixed to the cylinder body is restricted, this need not be the case, and an aspect is possible in which the range of movement of the adjustment stopper with respect to the cylinder body is restricted. Also, although the above embodiments have been described taking the example of an aspect in which one end side of the adjustment spring is in contact with or connected to the second clutch, this need not be the case, and an aspect is possible in which one end side of the adjustment spring is in contact with or connected to the adjustment stopper. Note that the shape and the arrangement of the adjustment spring, the adjustment stopper, the front stopper, the adjustment sleeve, and the spring receiver are not limited to the examples described in the embodiments, and modifications may be made. Also, modifications may be made to the shape of the clutch nut, the first clutch, and the second clutch.

(6) Although the above embodiments have been described taking the example of a configuration in which only the front stopper is fixed to the inner circumference of the guide tube by threaded coupling, this need not be the case, and the first clutch may also be fixed to the inner circumference of the guide tube by threaded coupling. Further, the front stopper may be fixed to the inner circumference of the guide tube by press fitting. Also, although the above embodiments have been described taking the example of a configuration in which the teeth capable of engaging the second clutch with the clutch nut are formed on both the surface of the second clutch that opposes the clutch nut and the surface of the clutch nut that opposes the second clutch, this need not be the case, and it is also possible to adopt a configuration in which the teeth are formed on one of the mutually opposing surfaces.

INDUSTRIAL APPLICABILITY

The present invention is broadly applicable to a brake cylinder device that moves a rod by operating using pressure fluid, and outputs braking force from a brake output portion that moves along with the rod, and also to a disk brake device that includes this brake cylinder device.

DESCRIPTIONS OF REFERENCE NUMERALS

2 Brake cylinder device
20a Cylinder body
21 Brake output portion
22 Rod
23 Rod biasing spring
24 Piston
25 Force amplifying mechanism
43 Pressure chamber
46 Swinging member

The invention claimed is:

1. A brake cylinder device that moves a rod by operating using a pressure fluid, and outputs braking force from a brake output portion that moves along with the rod, the brake cylinder device comprising:
   a cylinder body having a hollow interior;
   the rod that is arranged inside the cylinder body and provided so as to be movable in a forward movement direction of moving forward from the cylinder body and in a backward movement direction of moving backward in a direction opposite to the forward movement direction, both of which are linear directions along a cylinder axial direction;
   a rod biasing spring capable of biasing the rod in the backward movement direction;
   a piston that is arranged in the cylinder body so as to define a pressure chamber and circumferentially surround an axis of the rod, is provided so as to be movable along a linear direction that is parallel to the movement direction of the rod, and moves in the backward movement direction relative to the cylinder body in resistance to biasing force from the rod biasing spring due to pressure fluid being supplied to the pressure chamber;
   a force amplifying mechanism that, when the piston moves in the backward movement direction, moves the rod in the forward movement direction, amplifies drive force from the piston, and applies the amplified drive force to the rod; and
   the brake output portion that is provided so as to be capable of moving along with the rod and can output braking force due to the rod moving in the forward movement direction,
   wherein the force amplifying mechanism includes a swinging member that swings due to being biased by the piston moving in the backward movement direction, so as to bias and move the rod in the forward movement direction.

2. The brake cylinder device according to claim 1,
   wherein the swinging member is provided as a lever that is swingably supported at a fulcrum portion,
   the force amplifying mechanism further includes a bearing that is attached to the swinging member and is rotatable relative to the swinging member, and
   the bearing is attached to the swinging member at at least one of a force point portion of the swinging member that is biased by the piston and an action point portion of the swinging member that biases the rod.

3. The brake cylinder device according to claim 1, wherein a plurality of the swinging members are disposed, and the plurality of swinging members are disposed at rotationally symmetrical positions centered about a central axis line of the cylinder body that passes through a central position in a diameter direction of the cylinder body.

4. The brake cylinder device according to claim 3, wherein three of the swinging members are disposed, and the three swinging members are disposed with angular intervals of 120° in a circumferential direction centered about the central axis line.

5. The brake cylinder device according to claim 4, wherein the three swinging members are disposed on an inner side of a cylinder bottom portion that is fixed to an end of the cylinder body on the backward movement direction side, the inner side of the cylinder bottom portion is provided with a recessed region that is surrounded by an inner wall that has three inner wall faces formed so as to respectively extend in a curved manner or linearly along three sides of a triangle in a cross-section perpendicular to the cylinder axial direction, and the three swinging members are disposed so as to respectively extend along the three inner wall faces inside the recessed region.

6. The brake cylinder device according to claim 1, wherein the force amplifying mechanism further comprises a fulcrum shaft member that configures a fulcrum shaft of the swinging member provided as a lever, and is a member to which the swinging member is rotatably attached and that swingably supports the swinging member, two ends of the fulcrum shaft member are respectively supported to a cylinder bottom portion that is fixed to an end of the cylinder body on the backward movement direction side, and one end of the fulcrum shaft member is supported to a portion provided so as to rise up toward the cylinder body side on a central side of the inner side of the cylinder bottom portion, and another end of the fulcrum shaft member is supported to a portion provided so as to rise up toward the cylinder body side on an outer circumferential side on the inner side of the cylinder bottom portion.

7. The brake cylinder device according to claim 1, wherein a plurality of the swinging members are disposed, and the plurality of swinging members are disposed at symmetrical positions with respect to a central axis line of the cylinder body that passes through a central position in a diameter direction of the cylinder body.

8. The brake cylinder device according to claim 7, wherein two of the swinging members are disposed, and the two swinging members are provided with a total of three or more of at least one of a force point portion that is biased by the piston and an action point portion that biases the rod.

9. The brake cylinder device according to claim 1, wherein the force amplifying mechanism further includes a support portion that swingably supports the swinging member at a fulcrum portion of the swinging member provided as a lever, the support portion includes a first block portion and a second block portion that are configured so as to be divided in the cylinder axial direction, and are integrally combined so as to rotatably hold the fulcrum portion, the first block portion is fixed to a cylinder bottom portion that is fixed to an end of the cylinder body on the backward movement direction side, and the second block portion is fixed to the cylinder body on an end side of the cylinder body on the backward movement direction side.

10. The brake cylinder device according to claim 1, further comprising:

a parking brake mechanism used when parking a vehicle equipped with the brake cylinder device, the parking brake mechanism comprising:

a plurality of parking brake springs arranged so as to be in a line along a circumferential direction of the cylinder body; and a parking brake piston that is arranged inside the cylinder body so as to define a second pressure chamber for parking brake release that is different from the pressure chamber and circumferentially surround an axis of the rod, is provided so as to be movable along a direction parallel to the movement direction of the rod, and biases the piston by moving in the backward movement direction relative to the cylinder body due to biasing force from the parking brake springs when pressure fluid is discharged from the second pressure chamber.

11. The brake cylinder device according to claim 10, wherein the plurality of parking brake springs are arranged outside the cylinder body.

12. The brake cylinder device according to claim 10, wherein the plurality of parking brake springs are arranged on two lateral sides of the brake output portion, and are aligned in a direction parallel to a diameter direction of the cylinder body.

13. The brake cylinder device according to claim 1, further comprising:

a threaded shaft that is connected to the brake output portion and has a thread formed on an outer circumference;

a guide tube that is attached to the rod and has the threaded shaft arranged inside;

a pusher spring arranged so as to be able to bias the threaded shaft in the forward movement direction relative to the cylinder body or a portion fixed to the cylinder body;

a clutch nut that is threadably engaged to a tip side of the threaded shaft arranged on the brake output portion side relative to the cylinder body;

a front stopper that is arranged so as to be capable of coming into contact with the clutch nut from a front side that is the brake output portion side so as to restrict movement of the clutch nut relative to the guide tube, and is capable of biasing the clutch nut and the threaded shaft in the backward movement direction along with movement of the guide tube in the backward movement direction;

a first clutch arranged so as to be capable of coming into contact with the clutch nut with a predetermined interval from the front stopper from a rear side that is a side opposite to the brake output portion side with respect to the clutch nut;

an adjustment stopper that is arranged so as to be movable relative to the clutch nut and the guide tube along an axial direction of the threaded shaft, and whose movable range is restricted with respect to the cylinder body or a member fixed to the cylinder body;

a second clutch to which the adjustment stopper is fixed, and that is arranged so as to be able to come into contact with the clutch nut from the rear side; and an adjustment spring that, at one end side, is in contact with or connected to the adjustment stopper or the second clutch, and is capable of biasing the clutch nut in the backward movement direction.

14. A disk brake device comprising:

the brake cylinder device according to claim 1, and a caliper body that is equipped with the brake cylinder device and is attached so as to be displaceable relative to a vehicle in an axle direction, wherein operation of the brake cylinder device causes a disk on an axle side to be sandwiched by a pair of brake pads attached to the caliper body, thereby generating braking force.

15. The disk brake device according to claim 14, wherein the caliper body comprises a pair of brake levers that are swingably disposed and respectively support the brake pads, the brake cylinder device further comprises a parking brake mechanism used when parking a vehicle that is equipped with the brake cylinder device, the parking brake mechanism comprises:

a plurality of parking brake springs arranged so as to be in a line along a circumferential direction of the cylinder body; and a parking brake piston that is arranged inside the cylinder body so as to define a second pressure chamber for parking brake release that is different from the pressure chamber and circumferentially surround an axis of the rod, is provided so as to be movable along a direction parallel to the movement direction of the rod, and biases the piston by moving in the backward movement direction relative to the cylinder body due to biasing force from the parking brake springs when pressure fluid is discharged from the second pressure chamber, the plurality of parking brake springs are arranged outside the cylinder body, and an end of the parking brake spring arranged on an outer side in a vehicle width direction that is a width direction of the vehicle is arranged inward in the vehicle width direction relative to a portion located most outward in the vehicle width direction in a swing center portion of, among the pair of brake levers, the brake lever arranged on the outer side in the vehicle width direction.

\* \* \* \* \*